US007090712B2

(12) United States Patent
Gillingham et al.

(10) Patent No.: US 7,090,712 B2
(45) Date of Patent: *Aug. 15, 2006

(54) AIR FILTRATION ARRANGEMENTS HAVING FLUTED MEDIA CONSTRUCTION AND METHODS

(75) Inventors: Gary R. Gillingham, Prior Lake, MN (US); Mark A. Gogins, Roseville, MN (US); Thomas M. Weik, Deephaven, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/110,625

(22) Filed: Apr. 20, 2005

(65) Prior Publication Data

US 2005/0183405 A1 Aug. 25, 2005

Related U.S. Application Data

(63) Continuation of application No. 10/741,788, filed on Dec. 19, 2003, now Pat. No. 6,974,490, which is a continuation of application No. 09/871,590, filed on May 31, 2001, now Pat. No. 6,673,136.

(60) Provisional application No. 60/230,138, filed on Sep. 5, 2000.

(51) Int. Cl.
*B01D 46/02* (2006.01)
*B01D 39/16* (2006.01)

(52) U.S. Cl. .......................... 55/486; 55/302; 55/487; 55/495; 55/498; 55/502; 55/503; 55/521; 55/527; 55/528

(58) Field of Classification Search ................. 55/482, 55/486, 487, 385.1, 385.3, 302, 495, 498, 55/502, 503, 521, 527, 528, 520; 95/273, 95/279, 280, 286; 442/36; 96/380
See application file for complete search history.

(56) References Cited

U.S. PATENT DOCUMENTS

| 567,399 | A | 9/1896 | Laws |
| 2,599,604 | A | 6/1952 | Bauer et al. |
| 2,835,341 | A | 5/1958 | Parker, Jr. |

(Continued)

FOREIGN PATENT DOCUMENTS

DE 299 07 699 U1 9/1999

(Continued)

OTHER PUBLICATIONS

Adanur, S. et al., "Recovery and Reuse of Waste PVC Coated Fabrics. Part I: Experimental Procedures and Separation of Fabric Components", *Jour. of Coated Fabrics*, vol. 28, pp. 37-55 (Jul. 1998).

(Continued)

*Primary Examiner*—Jason M. Greene
(74) *Attorney, Agent, or Firm*—Merchant & Gould P.C.

(57) ABSTRACT

Filter arrangements include a barrier media in the form of fluted media treated with a deposit of fine fibers. The media is particularly advantageous in high temperature (greater than 140 to 240° F.) systems. Such systems may include engine systems, gas turbine systems, and fuel cell systems. Filter arrangements may take the form of media packs having a circular cross-section or a racetrack shaped cross-section, or media packs formed in a panel configuration.

31 Claims, 35 Drawing Sheets

U.S. PATENT DOCUMENTS

| | | |
|---|---|---|
| 2,980,204 A | 4/1961 | Jordan |
| 3,025,963 A | 3/1962 | Bauer |
| 3,102,793 A | 9/1963 | Alban |
| 3,209,917 A | 10/1965 | Yelinek |
| 3,236,679 A | 2/1966 | Spiller et al. |
| 3,251,475 A | 5/1966 | Till et al. |
| 3,258,900 A | 7/1966 | Harms |
| 3,360,598 A | 12/1967 | Earnhart |
| 3,565,979 A | 2/1971 | Palmer |
| 3,570,675 A | 3/1971 | Pall et al. |
| 3,689,608 A | 9/1972 | Hollberg et al. |
| 3,731,352 A | 5/1973 | Okamoto et al. |
| 3,739,055 A | 6/1973 | Ueda et al. |
| 3,745,748 A | 7/1973 | Goldfield et al. |
| 3,755,527 A | 8/1973 | Keller et al. |
| 3,772,136 A | 11/1973 | Workman |
| 3,825,380 A | 7/1974 | Harding et al. |
| 3,839,529 A | 10/1974 | Serres et al. |
| 3,851,023 A | 11/1974 | Brethauer et al. |
| 3,888,610 A | 6/1975 | Brackmann et al. |
| 3,994,258 A | 11/1976 | Simm |
| 4,011,067 A | 3/1977 | Carey, Jr. |
| 4,020,230 A | 4/1977 | Mahoney et al. |
| 4,143,196 A | 3/1979 | Simm et al. |
| 4,148,595 A | 4/1979 | Bednarz |
| 4,210,615 A | 7/1980 | Engler et al. |
| 4,215,682 A | 8/1980 | Kubik et al. |
| 4,223,101 A | 9/1980 | Fine et al. |
| 4,230,650 A | 10/1980 | Guignard |
| 4,278,623 A | 7/1981 | Niegisch |
| 4,290,987 A | 9/1981 | Soehngen et al. |
| 4,323,525 A | 4/1982 | Bornat |
| 4,340,479 A | 7/1982 | Pall |
| 4,370,290 A | 1/1983 | Makino et al. |
| 4,443,237 A | 4/1984 | Ulvestad |
| 4,468,428 A | 8/1984 | Early et al. |
| 4,469,606 A | 9/1984 | Reid et al. |
| 4,650,506 A | 3/1987 | Barris et al. |
| 4,689,186 A | 8/1987 | Bornat |
| 4,698,078 A | 10/1987 | Mavros |
| 4,804,707 A | 2/1989 | Okamoto et al. |
| 4,824,451 A | 4/1989 | Vogt et al. |
| 4,826,519 A | 5/1989 | Miyagi et al. |
| 4,842,505 A | 6/1989 | Annis et al. |
| 4,842,924 A | 6/1989 | Farris et al. |
| 4,849,474 A | 7/1989 | Gallucci |
| 4,874,399 A | 10/1989 | Reed et al. |
| 4,900,671 A | 2/1990 | Pokora et al. |
| 4,915,886 A | 4/1990 | Repetti et al. |
| 4,925,561 A | 5/1990 | Ishii et al. |
| 4,929,502 A | 5/1990 | Giglia |
| 4,992,515 A | 2/1991 | Ballard |
| 5,013,617 A | 5/1991 | Scheffler |
| 5,082,476 A | 1/1992 | Kahlbaugh et al. |
| 5,104,537 A | 4/1992 | Stifelman et al. |
| 5,156,925 A | 10/1992 | Lapp |
| 5,166,246 A | 11/1992 | Gallucci et al. |
| 5,188,376 A | 2/1993 | Ueda et al. |
| 5,189,092 A | 2/1993 | Kowlow |
| 5,203,201 A | 4/1993 | Gogins |
| 5,221,586 A | 6/1993 | Morimoto et al. |
| 5,238,735 A | 8/1993 | Nagou et al. |
| 5,273,565 A | 12/1993 | Milligan et al. |
| 5,324,558 A | 6/1994 | Muto et al. |
| 5,331,037 A | 7/1994 | Kowlow |
| 5,364,456 A | 11/1994 | Kahlbaugh et al. |
| 5,372,617 A | 12/1994 | Kerrebrock et al. |
| 5,411,576 A | 5/1995 | Jones et al. |
| 5,472,481 A | 12/1995 | Jones et al. |
| 5,496,507 A | 3/1996 | Angadjivand et al. |
| 5,632,791 A | 5/1997 | Oussoren et al. |
| 5,672,399 A | 9/1997 | Kahlbaugh et al. |
| 5,772,883 A | 6/1998 | Rothman et al. |
| D396,098 S | 7/1998 | Gillingham et al. |
| 5,792,247 A | 8/1998 | Gillingham et al. |
| 5,820,646 A | 10/1998 | Gillingham et al. |
| 5,837,393 A | 11/1998 | Okamoto |
| 5,843,442 A | 12/1998 | Soule et al. |
| 5,853,442 A | 12/1998 | Glen et al. |
| 5,863,701 A | 1/1999 | Mertesdorf |
| 5,895,510 A | 4/1999 | Butler et al. |
| 5,895,574 A | 4/1999 | Friedmann et al. |
| 5,897,676 A | 4/1999 | Engel et al. |
| 5,902,364 A | 5/1999 | Tokar et al. |
| 5,908,598 A | 6/1999 | Rousseau et al. |
| 5,919,847 A | 7/1999 | Rousseau et al. |
| 5,938,804 A | 8/1999 | Engel et al. |
| 5,954,849 A | 9/1999 | Berkhoel et al. |
| 5,961,696 A | 10/1999 | Gombos |
| 5,968,635 A | 10/1999 | Rousseau et al. |
| 5,976,208 A | 11/1999 | Rousseau et al. |
| 5,993,580 A | 11/1999 | Nakayama et al. |
| 6,002,017 A | 12/1999 | Rousseau et al. |
| 6,013,385 A | 1/2000 | DuBose |
| 6,048,661 A | 4/2000 | Nishi et al. |
| D425,189 S | 5/2000 | Gillingham et al. |
| 6,057,051 A | 5/2000 | Uchida et al. |
| 6,063,862 A | 5/2000 | Idemura et al. |
| 6,068,799 A | 5/2000 | Rousseau et al. |
| 6,090,173 A | 7/2000 | Johnson et al. |
| 6,110,249 A | 8/2000 | Medcalf et al. |
| 6,123,751 A | 9/2000 | Nelson et al. |
| 6,152,996 A | 11/2000 | Linnersten et al. |
| 6,177,192 B1 | 1/2001 | Asano et al. |
| 6,190,432 B1 | 2/2001 | Gieseke et al. |
| 6,210,469 B1 | 4/2001 | Tokar |
| 6,235,195 B1 | 5/2001 | Tokar |
| 6,265,333 B1 | 7/2001 | Dzenis et al. |
| 6,348,085 B1 | 2/2002 | Tokar et al. |
| 6,350,291 B1 | 2/2002 | Gieseke et al. |
| 6,354,296 B1 | 3/2002 | Baumann |
| 6,391,807 B1 | 5/2002 | Jariwala et al. |
| 6,395,046 B1 | 5/2002 | Emig et al. |
| 6,673,136 B1 * | 1/2004 | Gillingham et al. .......... 55/487 |
| 2002/0073850 A1 | 6/2002 | Tokar et al. |
| 2002/0100262 A1 | 8/2002 | Gieseke et al. |

FOREIGN PATENT DOCUMENTS

| | | |
|---|---|---|
| EP | 0 351 046 A2 | 1/1990 |
| EP | 0 489 395 A1 | 6/1992 |
| EP | 0 811 412 A1 | 12/1997 |
| EP | 1 048 335 A1 | 11/2000 |
| GB | 703823 | 2/1954 |
| GB | 745030 | 2/1959 |
| GB | 969327 | 8/1960 |
| GB | 2 103 106 A | 2/1983 |
| JP | 1-171615 | 7/1989 |
| JP | 05195322 A2 | 8/1993 |
| JP | 05239778 A2 | 9/1993 |
| JP | 06057530 A2 | 3/1994 |
| JP | 06057531 A2 | 3/1994 |
| JP | 06264301 A2 | 9/1994 |
| WO | WO 94/18364 | 8/1994 |
| WO | WO 99/16532 | 4/1999 |
| WO | WO 00/01737 | 1/2000 |

OTHER PUBLICATIONS

Angelo, R. et al., " Preparation and Characterization of Selectively Isotopically Labeled Nylon 66 Polymers", *Macromolecules*, vol. 22, pp. 117-121 (1989).

Basutkar, P. et al., "Synthesis and Characterization of Phenylated Aromatic Poly(amide-amides)s", *Jour. of Applied Polymer Science*, vol. 68, pp. 1523-1530 (1998).

Baumgarten, P., "Electrostatic Spinning of Acrylic Microfibers", *Jour. of Colloid and Interface Science*, vol. 36, No. 1, 9 pages (May 1971).

Benavente, J. et al., "Electrical Properties of Modified Aromatic Polyamide Membranes", *Separation Science and Technology*, vol. 32, No. 13, pp. 2189-2199 (1997).

Bognitzki, M. et al., "Polymer, Metal and Hybrid Nano- and Mesotubes by Coating of Degradable Polymer Template Fibers (Turf-process)", Philipps-University Marburg, Department of Chemistry, Mainz, Germany, pp. 45 and 46, date unknown.

Bognitzki, M. et al., "Submicrometer Shaped Polylactide Fibers by Electrospinning", Philipps-University Marburg, Department of Chemistry, Mainz, Germany, pp. 115 and 116, date unknown.

Chun, I. et al., " Carbon Nanofibers from Polyacrylonitrile and Mesophase Pitch", *Jour. of Advanced Materials*, vol. 31, No. 1, pp. 36-41 (Jan. 1999).

Deitzel, J. et al., "Generation of Polymer Nanofibers Through Electrospinning", *Army Research Labm Aberdeen Proving Ground*, MD 21005-5066, ARL-TR-1898, pp. 1-36 (Jun. 1999).

Dhawan, S. et al., Conducting Fabrics as a Shield Against Electromagnetic Interference (EMI), *Jour. of Coated Fabrics*, vol. 28, pp. 29-36 (Jul. 1998).

Donaldson® Brochure, Ultra-Web® "Premium Quality-High Efficiency Filters", 4 pages (1994).

Donaldson® Brochure Gas Turbine Systems, "Composite-Filer™ System Improves Static Air Filter System Performance", 3 pages (1996).

Donaldson Brochure, "Donaldson® High Purity Products, High Efficiency Cleanroom Filters", 4 pages (1997).

Donaldson Brochure, Donaldson® Gas Turbine Systems, DZ2000™ Panel Filters with Spider-Web® Filter Media, 4 pages (1997).

Donaldson® Brochure, "Donaldson® GDS™ Filter System Maximum Air Inlet Filtration in a Static System for Large Gas Turbines", 4 pages (1998).

Donaldson® Brochure, "Replacement Filters for GE/S&S Turbines, Evaluating & Selecting Filter Elements for LM Series Turbines", 6 pages (1999).

Donaldson Brochure, Eon™ Fine Fiber Technology by Donaldson, 6 pages (1999).

Donaldson® Brochure, Tech Topics, "Do Spider-Web Replacement Filters Really 'Cost ' Extra? Analysis Shows How Savings from High Performance Far Outweigh a Premium Price", 2 pages (Jul. 1999).

Donaldson® Brochure, "Filtration Solutions for Gas Turbines, Technological Innovation Combined with Global Manufacturing & Distribution", 4 pages (2000).

Donaldson® Brochure, "GDX Self-Cleaning Filter System", 4 pages (2000).

Donaldson® Brochure, Filtration Solutions for Gas Turbines, Generators, and Compressors, "DZ2000 Air Filter Media, The Longer Life, Higher Value Filter Media for Gas Turbine Inlet Air Filter Systems", 4 pages (Dec. 2000).

Doshi, J., "The Electrospinning Process and Applications of Electrospun Fibers", *UMI Dissertation Services*, University of Akron, pp. 1-170, including sections (Aug. 1994).

Fang, X., "Application of Electrospinning for Polymers", *UMI Dissertation Services*, University of Akron, pp. 1-168, including sections (Aug. 1997).

Gibson, P. et al., "Electrospinning Technology: Direct Application of Tailorable Ultrathin Membranes", Jour. of Coated Fabrics, vol. 28, pp. 63-72 (Jul. 1998).

Giessmann, A. et al., "Multipurpose Production Line for the Coated Textile Industry", *Jour. of Coated Fabrics*, vol. 28, pp. 56-62 (Jul. 1998).

Huang, M. et al., "The Modification of Nylon 6 by a Phenol-Formaldehyde Resin", *Jour. of Applied Polymer Science*, vol. 48, pp. 563-572 (1993).

Huang, T. "Modification of Nylon 6 by Phenol-Containing Polymers", *Jour. of Applied Polymer Science*, vol. 73, pp. 295-300 (1999).

Huang, R. et al., "Crosslinked Blended Poly(vinyl alcohol)/N-Methylol Nylon-6 Membranes for the Pervaporation Separation of Ethanol-Water Mixtures", *Jour. of Applied Polymer Science*, vol. 70, pp. 317-327 (1998).

Kim, J. et al., "Polybenzimidazole Nanofiber Produced by Electrospinning", *Polymer Engineering And Science*, vol. 39, No. 5, pp. 849-854 (May 1999).

Kirichenko, V. et al., "Acceleration of a Free Jet of Low-conducting Liquid in an Electric Field", *Sov. Phys. Dokl.*, vol. 35, No. 12, pp. 1018-1020 (Dec. 1990).

Kirichenko, V. et al., "Charge Transfer due to the Electrohydrodynamic Atomization of a Liquid", *Sov. Phys. Dokl.*, vol. 33, No. 8, pp. 564-566 (Aug. 1988).

Kirichenko, V. et al., "Domains of Existence of Free, Stationary Liquid Jets in a Strong External Electric Field", *Sov. Phys. Dokl.*, vol. 32, No. 7, pp. 544-547 (Jul. 1987).

Kirichenko, V. et al., "Gas Flow and Filtration Through Permeable Channel Walls", *Phys. Dokl.*, vol. 38 No. 4, pp. 139-141 (Apr. 1993).

Kirichenko, V. et al., "Shape of a Free, Stationary Liquid Jet in a Strong Uniform Electric Field", *Sov. Phys. Dokl*, vol. 32, No. 7, pp. 546-547 (Jul. 1987).

Kirichenko, V. et al., "Specific Charge of the Liquid in Electrohydrodynamic Atomization and Microfilament Forming Processes", *Sov. Phys. Dokl*, vol. 35, No. 12, pp. 1015-1020 (Dec. 1990).

Kirichenko, V. et al., "Transverse Splitting of a Liquid Jet in a Strong Electric Field", *Sov. Phys. Dokl.*, vol 33, No. 9, pp. 653-654 (Sep. 1988).

Mahajan, S. et al., "Fibrillation Behavior of Oriented Tapes of Polyethylene and Its Blends. IV", *Jour. of Applied Polymer Science*, vol. 60, pp. 1551-1560 (1996).

Marijnissen, J., "Electrosprays with Applications in Aerosol Technology and Material Synthesis", 1994 International Aerosol Conference Tutorial Sessions, Los Angeles, California, pp. 1-67 (Aug. 29, 1994).

Maslowski, E. et al., "New Processes for Fiber-Like PE Structures", *Fiber World*, pp. 12-14 (Mar. 1987).

Moore, J. et al., The Effects of Battlefield Contaminants on PEMFC Performance, *Jour. of Power Sources*, vol. 85, pp. 254-260 (2000).

National Textile Center, "Electrostatic Spinning and Properties of Ultrafine Fibers", http://www.ntcresearch.org/currently/year8/M98-DO1.htm, last updated May 19, 1999, pp. 1-4.

Ohzawa, Y. et al., "Studies on Dry Spinning. I. Fundmental Equations", *Jour. of Applied Polymer Science*, vol. 13, pp. 257-283 (1969).

Ohzawa, Y. et al., "Studies on Dry Spinning. II. Numerical Solutions for Some Polymer-Solvent Systems Based on the Assumption that Drying is Controlled by Boundary-Layer Mass Transfer", *Jour. of Applied Polymer Science*, vol. 14, pp. 1879-1899 (1970).

Petryanov, I. et al., "Adhesion of Finely Dispersed Particles to the Surface of Coating Materials", *Translated from Doklady Akademii Nauk SSSR*, vol. 288, No. 5, pp. 515-551, Original Article submitted Jul. 3, 1985.

Sakamoto, S. et al., "Study of the Factors Affecting PEFC Life Characteristic", *Ecology and Energy Systems Research Center, SANYO Electric Co., Ltd.*, Tochigi, Japan, pp. 141-144; date unknown.

SBCCOM-Natick Public Affairs, "Army Teams with Universities to Develop Electrospun Membranes and Fabrics for Soldier Protection", http://www.Natick.army.mil/pao/1998/98-26.htm, last updated 0/27/00, pp. 1-2.

Shambaugh, R., "A Macroscopic View of the Melt-Blowing Process for Producing Microfibers", *Ind. Eng. Chem. Res.*, vol. 27, No. 12, pp. 2363-2372 (1988).

Shepelev, A. et al., "Polymeric Fiber Materials for Fine Cleaning of Gases", *J. Aerosol Sci., Suppl. I*, vol. 26, pp. 5919-5920, (1995).

Shieh, J. et al., "Preparation of N-Methylol Nylon-6 Membranes for Pervaporation of Ethanol-Water Mixtures", *Department of Chemical Engineering*, University of Waterloo, Ontario N2L 3GI, Canada, pp. 855-863 (Received Jun. 24, 1996).

Sioen, J., "The Coating Company of the Future", *Jour. of Coated Fabrics*, vol. 28, pp. 73-79 (Jul. 1998).

Smith, J., "Cellulose Acetate Fibrets: a Fibrillated Pulp with High Surface Area", *Tappi Journal*, pp. 185-193 (Dec. 1988).

Smith, R. et al., "Phase Behavior and Reaction of Nylon 6/6 in Water at High Temperatures and Pressures", *Jour. of Applied Polymer Science*, vol. 76, pp. 1062-1073 (2000).

"Survey of Soluble Polyamide Patents", RT-2488-R, pp. 1-6 (Oct. 14, 1954).

Taylor, G., Viscosity And Molecular Weight of Nylon, "The Relation of the Viscosity of Nylon Solutions in Formic Acid to Molecular Weight as Determined by End-Group Measurements", *Contribution From The Chemical Department, Experimental Station, E.I. Du Pont De Nemours & Company*, pp. 635-637 (Mar. 1947).

Wadsworth, L. et al., "Development of Highly Breathable and Effective Blood/Viral Barrier Laminates of Microporous Films, Staple Fibers and Nonwovens", *Jour. of Coated Fabrics*, vol. 28, pp. 12-28 (Jul. 1998).

Wang, F. et al. "Hydrogen Bonding in Polyamide Toughened Novolac Type Phenolic Resin", *Jour. of Applied Polymer Science*, vol. 74, pp. 2283-2289 (1999).

Wang, H. et al., "Synthesis and Properties of Nylon 6 Modified with Various Aromatic Polyamides", *Jour. of Applied Polymer Science*, vol. 68, pp. 1031-1043 (1998).

Wente, V., "Superfine Thermoplastic Fibers", *Industrial And Bio_Chemistry*, Naval Research Laboratory, Washington 25, D.C., vol. 48, No. 8, pp. 1342-1346 (Aug. 1986).

Declaration of Doug Crofoot with Exhibits A and B, dated Sep. 10, 2001.

\* cited by examiner

AIR FILTRATION ARRANGEMENTS HAVING FLUTED MEDIA CONSTRUCTION AND METHODS

This application is a continuation of application Ser. No. 10/741,788, filed Dec. 19, 2003, now U.S. Pat. No. 6,974,490, which application is a continuation of application Ser. No. 09/871,590, filed May 31, 2001, now U.S. Pat. No. 6,673,136, which application claims priority under 35 U.S.C. § 119(e) to U.S provisional application Ser. No. 60/230,138, filed on Sep. 5, 2000, which applications are incorporated by reference herein.

FIELD OF THE INVENTION

The invention relates to a filter arrangement and filtration method. More specifically, it concerns an arrangement for filtering particulate material from a gas flow stream, for example, an air stream. The invention also concerns a method for achieving the desirable removal of particulate material from such a gas flow stream.

The present invention is an on-going development of Donaldson Company Inc., of Minneapolis, Minn., the assignee of the present invention. The disclosure concerns continuing technology development related, in part, to the subjects characterized in U.S. patents: U.S. Pat. No. B2 4,720,292; Des 416,308; U.S. Pat. Nos. 5,613,992; 4,020,783; and 5,112,372. Each of the patents identified in the previous sentence is also owned by Donaldson, Inc., of Minneapolis, Minn.; and, the complete disclosure of each is incorporated herein by reference.

The invention also relates to filters comprising a substrate having a fine fiber layer made of polymer materials that can be manufactured with improved environmental stability to heat, humidity, reactive materials and mechanical stress. Such materials can be used in the formation of fine fibers such as microfibers and nanofiber materials with improved stability and strength. As the size of fiber is reduced the survivability of the materials is increasingly more of a problem. Such fine fibers are useful in a variety of applications. In one application, filter structures can be prepared using this fine fiber technology. The invention relates to polymers, polymeric composition, fiber, filters, filter constructions, and methods of filtering. Applications of the invention particularly concern filtering of particles from fluid streams, for example from air streams and liquid (e.g. non-aqueous and aqueous) streams. The techniques described concern structures having one or more layers of fine fibers in the filter media. The compositions and fiber sizes are selected for a combination of properties and survivability.

BACKGROUND OF THE INVENTION

Gas streams often carry particulate material therein. In many instances, it is desirable to remove some or all of the particulate material from a gas flow stream. For example, air intake streams to engines for motorized vehicles or power generation equipment, gas streams directed to gas turbines, and air streams to various combustion furnaces, often include particulate material therein. The particulate material, should it reach the internal workings of the various mechanisms involved, can cause substantial damage thereto. Removal of the particulate material from the gas flow upstream of the engine, turbine, furnace or other equipment involved is often needed.

The invention relates to polymeric compositions with improved properties that can be used in a variety of applications including the formation of fibers, microfibers, nanofibers, fiber webs, fibrous mats, permeable structures such as membranes, coatings or films. The polymeric materials of the invention are compositions that have physical properties that permit the polymeric material, in a variety of physical shapes or forms, to have resistance to the degradative effects of humidity, heat, air flow, chemicals and mechanical stress or impact.

In making fine fiber filter media, a variety of materials have been used including fiberglass, metal, ceramics and a range of polymeric compositions. A variety of fiber forming methods or techniques have been used for the manufacture of small diameter micro- and nanofibers. One method involves passing the material through a fine capillary or opening either as a melted material or in a solution that is subsequently evaporated. Fibers can also be formed by using "spinnerets" typical for the manufacture of synthetic fiber such as nylon. Electrostatic spinning is also known. Such techniques involve the use of a hypodermic needle, nozzle, capillary or movable emitter. These structures provide liquid solutions of the polymer that are then attracted to a collection zone by a high voltage electrostatic field. As the materials are pulled from the emitter and accelerate through the electrostatic zone, the fiber becomes very thin and can be formed in a fiber structure by solvent evaporation.

As more demanding applications are envisioned for filtration media, significantly improved materials are required to withstand the rigors of high temperature 100° F. to 250° F., often 140° F. to 240° F. and up to 300° F., high humidity 10% to 90% up to 100% RH, high flow rates of both gas and liquid, and filtering micron and submicron particulates (ranging from about 0.01 to over 10 microns) and removing both abrasive and non-abrasive and reactive and non-reactive particulate from the fluid stream.

Accordingly, a substantial need exists for polymeric materials, micro- and nanofiber materials and filter structures that provide improved properties for filtering streams with higher temperatures, higher humidities, high flow rates and said micron and submicron particulate materials.

A variety of air filter or gas filter arrangements have been developed for particulate removal. However, in general, continued improvements are sought.

SUMMARY OF THE INVENTION

Herein, general techniques for the design and application of air cleaner arrangements are provided. The techniques include preferred filter element design, as well as the preferred methods of application and filtering.

In general, the preferred applications concern utilization, within an air filter, of Z-shaped media, including a composite of a substrate and fine fibers, to advantage.

The filter media includes at least a micro- or nanofiber web layer in combination with a substrate material in a mechanically stable filter structure. These layers together provide excellent filtering, high particle capture, and efficiency at minimum flow restriction when a fluid such as a gas or liquid passes through the filter media. The substrate can be positioned in the fluid stream upstream, downstream or in an internal layer. The fiber can be positioned on the upstream, the down stream or both sides of a filter substrate, regardless of filter geometry. The fiber is generally placed on the upstream side. However is certain applications downstream placement can be useful. In certain applications, double sided structure is useful. A variety of industries have directed substantial attention in recent years to the use of filtration media for filtration, i.e. the removal of unwanted particles from a fluid such as gas or liquid. The common filtration process removes particulate from fluids including an air stream or other gaseous stream or from a liquid stream such as a hydraulic fluid, lubricant oil, fuel, water stream or other fluids. Such filtration processes require the mechanical strength, chemical and physical stability of the microfiber and the substrate materials. The filter media can be exposed to a broad range of temperature conditions, humidity, mechanical vibration and shock and both reactive and non-reactive, abrasive or non-abrasive particulates entrained in the fluid flow. When in normal operation, the filter is generally exposed to air at or near ambient conditions or at slightly elevated temperature. The filter can be exposed to higher temperature when the engine is operated abnormally or when the engine is shut down after extended service. If the engine is not in operation, air does not pass through the filter. The filter rapidly reaches under hood temperature. Further, the filtration media often require the self-cleaning ability of exposing the filter media to a reverse pressure pulse (a short reversal of fluid flow to remove surface coating of particulate) or other cleaning mechanism that can remove entrained particulate from the surface of the filter media. Such reverse cleaning can result in substantially improved (i.e.) reduced pressure drop after the pulse cleaning. Particle capture efficiency typically is not improved after pulse cleaning, however pulse cleaning will reduce pressure drop, saving energy for filtration operation. Such filters can be removed for service and cleaned in aqueous or non-aqueous cleaning compositions. Such media are often manufactured by spinning fine fiber and then forming an interlocking web of microfiber on a porous substrate. In the spinning process the fiber can form physical bonds between fibers to interlock the fiber mat into a integrated layer. Such a material can then be fabricated into the desired filter format such as cartridges, flat disks, canisters, panels, bags and pouches. Within such structures, the media can be substantially pleated, rolled or otherwise positioned on support structures.

The filter arrangements described herein can be utilized in a wide variety of applications including, for example, dust collection, air compressors, on-road and off-road engines, gas turbine systems, power generators such as fuel cells and others.

DETAILED DESCRIPTION OF THE INVENTION

Figure 1:
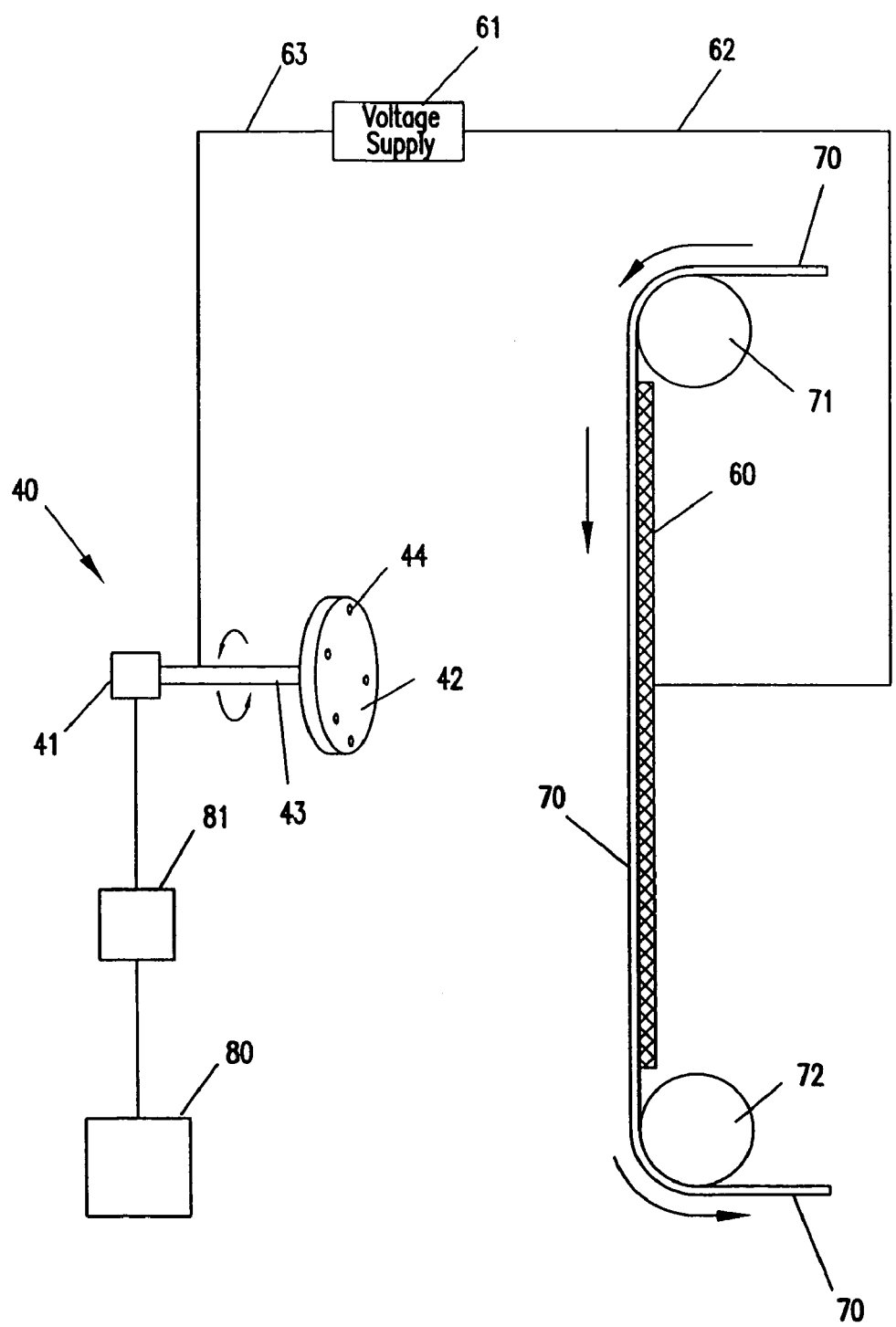
FIG. 1 depicts a typical electrostatic emitter driven apparatus for production of the fine fibers of the invention.

A. Micro Fiber or Fine Fiber Polymer Materials

The invention provides an improved polymeric material. This polymer has improved physical and chemical stability. The polymer fine fiber (microfiber and nanofiber) can be fashioned into useful product formats. The fiber can have a diameter of about 0.001 to 10 microns, about 0.005 to 5 microns, about 0.01 to 0.5 micron. Nanofiber is a fiber with diameter less than 200 nanometer or 0.2 micron. Microfiber is a fiber with diameter larger than 0.2 micron, but not larger than 10 microns.

This fine fiber can be made in the form of an improved multi-layer microfiltration media structure. The fine fiber layers of the invention comprise a random distribution of fine fibers which can be bonded to form an interlocking net. Filtration performance is obtained largely as a result of the fine fiber barrier to the passage of particulate. Structural properties of stiffness, strength, pleatability are provided by the substrate to which the fine fiber adhered. The fine fiber interlocking networks have as important characteristics, fine fibers in the form of microfibers or nanofibers and relatively small spaces between the fibers. Such interfiber spaces in the layer typically range, between fibers, of about 0.01 to about 25 microns or often about 0.1 to about 10 microns. The filter products comprise a fine fiber layer on a choice of appropriate substrate such as a synthetic layer, a natural layer or a mixed natural/synthetic substrate. The fine fiber adds less than 5 microns, often less than 3 microns of thickness. The fine fiber in certain applications adds about 1 to 10 or 1 to 5 fine fiber diameters in thickness to the overall fine fiber plus substrate filter media. In service, the filters can stop incident particulate from passing to the substrate or through the fine fiber layer and can attain substantial surface loadings of trapped particles. The particles comprising dust or other incident particulates rapidly form a dust cake on the fine fiber surface and maintains high initial and overall efficiency of particulate removal. Even with relatively fine contaminants having a particle size of about 0.01 to about 1 micron, the filter media comprising the fine fiber has a very high dust capacity.

The polymer materials as disclosed herein have substantially improved resistance to the undesirable effects of heat, humidity, high flow rates, reverse pulse cleaning, operational abrasion, submicron particulates, cleaning of filters in use and other demanding conditions. The improved microfiber and nanofiber performance is a result of the improved character of the polymeric materials forming the microfiber or nanofiber. Further, the filter media of the invention using the improved polymeric materials of the invention provides a number of advantageous features including higher efficiency, lower flow restriction, high durability (stress related or environmentally related) in the presence of abrasive particulates and a smooth outer surface free of loose fibers or fibrils. The overall structure of the filter materials provides an overall thinner media allowing improved media area per unit volume, reduced velocity through the media, improved media efficiency and reduced flow restrictions.

The polymer can be an additive polymer, a condensation polymer or mixtures or blends thereof. A preferred mode of the invention is a polymer blend comprising a first polymer and a second, but different polymer (differing in polymer type, molecular weight or physical property) that is conditioned or treated at elevated temperature. The polymer blend can be reacted and formed into a single chemical specie or can be physically combined into a blended composition by an annealing process. Annealing implies a physical change, like crystallinity, stress relaxation or orientation. Preferred materials are chemically reacted into a single polymeric specie such that a Differential Scanning Calorimeter analysis reveals a single polymeric material. Such a material, when combined with a preferred additive material, can form a surface coating of the additive on the microfiber that provides oleophobicity, hydrophobicity or other associated improved stability when contacted with high temperature, high humidity and difficult operating conditions. The fine fiber of the class of materials can have a diameter of 0.001 micron to 10 microns. Useful sizes include 0.001 to 2 microns, 0.005 to 5 microns, 0.01 to 5 microns, depending on bonding, substrate and application. Such microfibers can have a smooth surface comprising a discrete layer of the additive material or an outer coating of the additive material that is partly solubilized or alloyed in the polymer surface, or both. Preferred materials for use in the blended polymeric systems include nylon 6; nylon 66; nylon 6-10; nylon (6-66-610) copolymers and other linear generally aliphatic nylon compositions. A preferred nylon copolymer resin (SVP-651) was analyzed for molecular weight by the end group titration. (J. E. Walz and G. B. Taylor, determination of the molecular weight of nylon, Anal. Chem. Vol. 19, Number 7, pp 448–450 (1947). A number average molecular weight ($M_n$) was between 21,500 and 24,800. The composition was estimated by the phase diagram of melt temperature of three component nylon, nylon 6 about 45%, nylon 66 about 20% and nylon 610 about 25%. (Page 286, Nylon Plastics Handbook, Melvin Kohan ed. Hanser Publisher, New York (1995)).

Reported physical properties of SVP 651 resin are:

| Property | ASTM Method | Units | Typical Value |
|---|---|---|---|
| Specific Gravity | D-792 | — | 1.08 |
| Water Absorption (24 hr immersion) | D-570 | % | 2.5 |
| Hardness | D-240 | Shore D | 65 |
| Melting Point | DSC | ° C. (° F.) | 154 (309) |
| Tensile Strength @ Yield | D-638 | MPa (kpsi) | 50 (7.3) |
| Elongation at Break | D-638 | % | 350 |
| Flexural Modulus | D-790 | MPa (kpsi) | 180 (26) |
| Volume Resistivity | D-257 | ohm-cm | $10^{12}$ |

A polyvinylalcohol having a hydrolysis degree of from 87 to 99.9+% can be used in such polymer systems. These are preferably cross linked. And they are most preferably crosslinked and combined with substantial quantities of the oleophobic and hydrophobic additive materials.

Another preferred mode of the invention involves a single polymeric material combined with an additive composition to improve fiber lifetime or operational properties. The preferred polymers useful in this aspect of the invention include nylon polymers, polyvinylidene chloride polymers, polyvinylidene fluoride polymers, polyvinylalcohol polymers and, in particular, those listed materials when combined with strongly oleophobic and hydrophobic additives that can result in a microfiber or nanofiber with the additive materials formed in a coating on the fine fiber surface. Again, blends of similar polymers such as a blend of similar nylons, similar polyvinylchloride polymers, blends of polyvinylidene chloride polymers are useful in this invention. Further, polymeric blends or alloys of differing polymers are also contemplated by the invention. In this regard, compatible mixtures of polymers are useful in forming the microfiber materials of the invention. Additive composition such a fluoro-surfactant, a nonionic surfactant, low molecular weight resins (e.g.) tertiary butylphenol resin having a molecular weight of less than about 3000 can be used. The resin is characterized by oligomeric bonding between phenol nuclei in the absence of methylene bridging groups. The positions of the hydroxyl and the tertiary butyl group can be randomly positioned around the rings. Bonding between phenolic nuclei always occurs next to hydroxyl group, not randomly. Similarly, the polymeric material can be combined with an alcohol soluble non-linear polymerized resin formed from bis-phenol A. Such material is similar to the tertiary butylphenol resin described above in that it is formed using oligomeric bonds that directly connect aromatic ring to aromatic ring in the absence of any bridging groups such as alkylene or methylene groups.

Preferred polymer systems of the invention have adhering characteristic such that when contacted with a cellulosic substrate adheres to the substrate with sufficient strength such that it is securely bonded to the substrate and can resist the delaminating effects of a reverse pulse cleaning technique and other mechanical stresses. In such a mode, the polymer material must stay attached to the substrate while undergoing a pulse clean input that is substantially equal to the typical filtration conditions except in a reverse direction across the filter structure. Such adhesion can arise from solvent effects of fiber formation as the fiber is contacted with the substrate or the post treatment of the fiber on the substrate with heat or pressure. However, polymer characteristics appear to play an important role in determining adhesion, such as specific chemical interactions like hydrogen bonding, contact between polymer and substrate occurring above or below Tg, and the polymer formulation including additives. Polymers plasticized with solvent or steam at the time of adhesion can have increased adhesion.

An important aspect of the invention is the utility of such microfiber or nanofiber materials formed into a filter structure. In such a structure, the fine fiber materials of the invention are formed on and adhered to a filter substrate. Natural fiber and synthetic fiber substrates, like spun bonded fabrics, non-woven fabrics of synthetic fiber and non-wovens made from the blends of cellulosics, synthetic and glass fibers, non-woven and woven glass fabrics, plastic screen like materials both extruded and hole punched, UF and MF membranes of organic polymers can be used. Sheet-like substrate or cellulosic non-woven web can then be formed into a filter structure that is placed in a fluid stream including an air stream or liquid stream for the purpose of removing suspended or entrained particulate from that stream. The shape and structure of the filter material is up to the design engineer. One important parameter of the filter elements after formation is its resistance to the effects of heat, humidity or both. One aspect of the filter media of the invention is a test of the ability of the filter media to survive immersion in warm water for a significant period of time. The immersion test can provide valuable information regarding the ability of the fine fiber to survive hot humid conditions and to survive the cleaning of the filter element in aqueous solutions that can contain substantial proportions of strong cleaning surfactants and strong alkalinity materials. Preferably, the fine fiber materials of the invention can survive immersion in hot water while retaining at least 30%, preferably 50% of the fine fiber formed on the surface of the substrate. Retention of at least 30%, preferably 50% of the fine fiber can maintain substantial fiber efficiency without loss of filtration capacity or increased back pressure. Most preferably retaining at least 75%. The thickness of the typical fine fiber filtration layer ranges from about 1 to 100 times the fiber diameter with a basis weight ranging from about 0.01 to 240 micrograms-cm$^{-2}$.

Fluid streams such as air and gas streams often carry particulate material therein. The removal of some or all of the particulate material from the fluid stream is needed. For example, air intake streams to the cabins of motorized vehicles, air in computer disk drives, HVAC air, aircraft cabin ventilation, clean room ventilation and applications using filter bags, barrier fabrics, woven materials, air to engines for motorized vehicles, or to power generation equipment; gas streams directed to gas turbines; and, air streams to various combustion furnaces, often include particulate material therein. In the case of cabin air filters it is desirable to remove the particulate matter for comfort of the passengers and/or for aesthetics. With respect to air and gas intake streams to engines, gas turbines and combustion furnaces, it is desirable to remove the particulate material because particulate can cause substantial damage to the internal workings to the various mechanisms involved. In other instances, production gases or off gases from industrial processes or engines may contain particulate material therein. Before such gases can be, or should be, discharged through various downstream equipment to the atmosphere, it may be desirable to obtain a substantial removal of particulate material from those streams.

A general understanding of some of the basic principles and problems of air filter design can be understood by consideration of the following types of filter media: surface loading media; and, depth media. Each of these types of media has been well studied, and each has been widely utilized. Certain principles relating to them are described, for example, in U.S. Pat. Nos. 5,082,476; 5,238,474; and 5,364,456. The complete disclosures of these three patents are incorporated herein by reference.

The "lifetime" of a filter is typically defined according to a selected limiting pressure drop across the filter. The pressure buildup across the filter defines the lifetime at a defined level for that application or design. Since this buildup of pressure is a result of load, for systems of equal efficiency a longer life is typically directly associated with higher capacity. Efficiency is the propensity of the media to trap, rather than pass, particulates. It should be apparent that typically the more efficient a filter media is at removing particulates from a gas flow stream, in general the more rapidly the filter media will approach the "lifetime" pressure differential (assuming other variables to be held constant).

DETAILED DESCRIPTION OF CERTAIN DRAWINGS

The microfiber or nanofiber of the unit can be formed by the electrostatic spinning process. A suitable apparatus for forming the fiber is illustrated in FIG. 1. This apparatus includes a reservoir 80 in which the fine fiber forming polymer solution is contained, a pump 81 and a rotary type emitting device or emitter 40 to which the polymeric solution is pumped. The emitter 40 generally consists of a rotating union 41, a rotating portion 42 including a plurality of offset holes 44 and a shaft 43 connecting the forward facing portion and the rotating union. The rotating union 41 provides for introduction of the polymer solution to the forward facing portion 42 through the hollow shaft 43. The holes 44 are spaced around the periphery of the forward facing portion 42. Alternatively, the rotating portion 42 can be immersed into a reservoir of polymer fed by reservoir 80 and pump 81. The rotating portion 42 then obtains polymer solution from the reservoir and as it rotates in the electrostatic field, a droplet of the solution is accelerated by the electrostatic field toward the collecting media 70 as discussed below.

Facing the emitter 40, but spaced apart therefrom, is a substantially planar grid 60 upon which the collecting media 70 (i.e. substrate or combined substrate is positioned. Air can be drawn through the grid. The collecting media 70 is passed around rollers 71 and 72 which are positioned adjacent opposite ends of grid 60. A high voltage electrostatic potential is maintained between emitter 40 and grid 60 by means of a suitable electrostatic voltage source 61 and connections 62 and 63 which connect respectively to the grid 60 and emitter 40.

In use, the polymer solution is pumped to the rotating union 41 or reservoir from reservoir 80. The forward facing portion 42 rotates while liquid exits from holes 44, or is picked up from a reservoir, and moves from the outer edge of the emitter toward collecting media 70 positioned on grid 60. Specifically, the electrostatic potential between grid 60 and the emitter 40 imparts a charge to the material which cause liquid to be emitted therefrom as thin fibers which are drawn toward grid 60 where they arrive and are collected on substrate 12 or an efficiency layer 14. In the case of the polymer in solution, solvent is evaporated off the fibers during their flight to the grid 60; therefore, the fibers arrive at the substrate 12 or efficiency layer 14. The fine fibers bond to the substrate fibers first encountered at the grid 60. Electrostatic field strength is selected to ensure that the polymer material as it is accelerated from the emitter to the collecting media 70, the acceleration is sufficient to render the material into a very thin microfiber or nanofiber structure. Increasing or slowing the advance rate of the collecting media can deposit more or less emitted fibers on the forming media, thereby allowing control of the thickness of each layer deposited thereon. The rotating portion 42 can have a variety of beneficial positions. The rotating portion 42 can be placed in a plane of rotation such that the plane is perpendicular to the surface of the collecting media 70 or positioned at any arbitrary angle. The rotating media can be positioned parallel to or slightly offset from parallel orientation.

Figure 2:
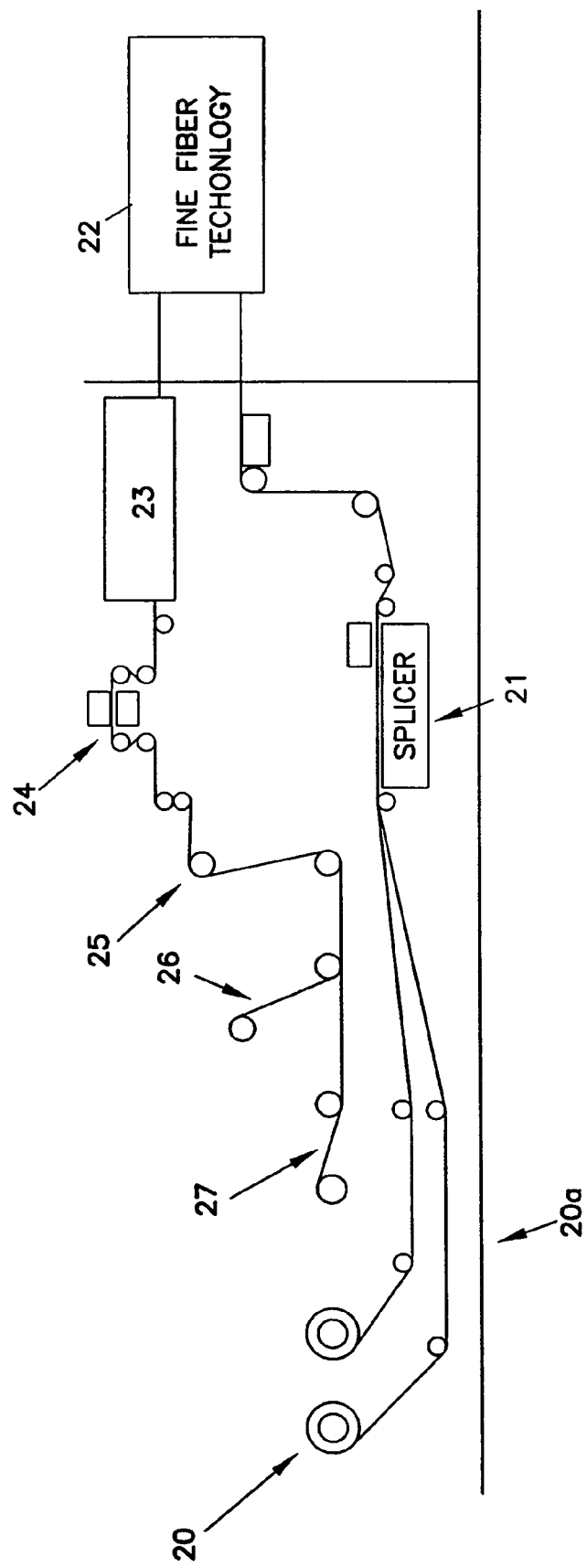
FIG. 2 shows the apparatus used to introduce fine fiber onto filter substrate into the fine fiber forming technology shown in FIG. 1.

FIG. 2 is a general schematic diagram of a process and apparatus for forming a layer of fine fiber on a sheet-like substrate or media. In FIG. 2, the sheet-like substrate is unwound at station 20. The sheet-like substrate 20a is then directed to a splicing station 21 wherein multiple lengths of the substrate can be spliced for continuous operation. The continuous length of sheet-like substrate is directed to a fine fiber technology station 22 comprising the spinning technology of FIG. 1 wherein a spinning device forms the fine fiber and lays the fine fiber in a filtering layer on the sheet-like substrate. After the fine fiber layer is formed on the sheet-like substrate in the formation zone 22, the fine fiber layer and substrate are directed to a heat treatment station 23 for appropriate processing. The sheet-like substrate and fine fiber layer is then tested in an efficiency monitor 24 and nipped if necessary at a nip station 25. The sheet-like substrate and fiber layer is then steered to the appropriate winding station to be wound onto the appropriate spindle for further processing 26 and 27.

Figure 3B:
FIG. 3 is a depiction of the typical internal structure of a support material and a separate depiction of the fine fiber material of the invention compared to small, i.e. 2 and 5 micron particulate materials.
Figure 3A:
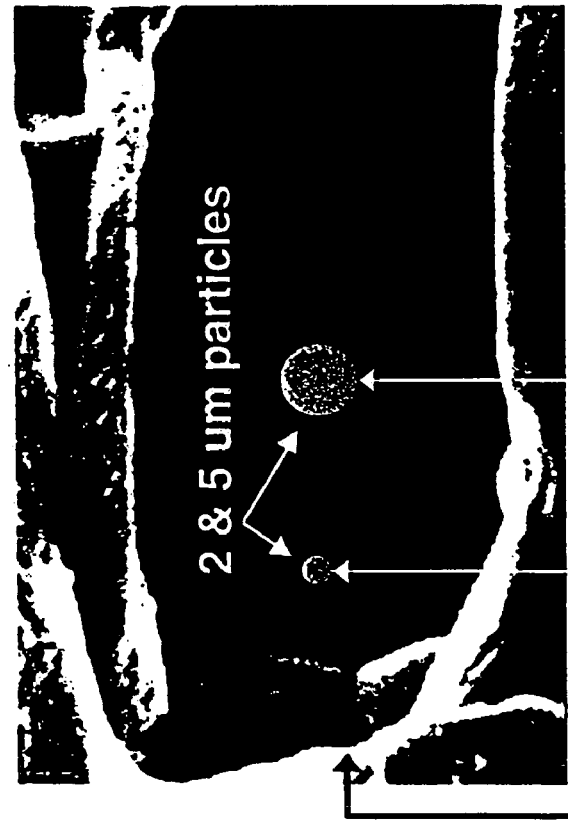

FIG. 3 is a scanning electromicrograph image showing the relationship of typical dust particles having a diameter of about 2 and about 5 microns with respect to the sizes of pores in typical cellulose media and in the typical fine fiber structures. In FIG. 3a, the 2 micron particle 31 and the 5 micron particle 32 is shown in a cellulosic media 33 with pore sizes that are shown to be quite a bit larger than the typical particle diameters. In sharp contrast, in FIG. 3B, the 2 micron particle 31 appears to be approximately equal to or greater than the typical openings between the fibers in the fiber web 35 while the 5 micron particle 32 appears to be larger than any of the openings in the fine fiber web 35.

The foregoing general description of the various aspects of the polymeric materials of the invention, the fine fiber materials of the invention including both microfibers and nanofibers and the construction of useful filter structures from the fine fiber materials of the invention provides an understanding of the general technological principles of the operation of the invention. The following specific exemplary materials are examples of materials that can be used in the formation of the fine fiber materials of the invention and the following materials disclose a best mode. The following exemplary materials were manufactured with the following characteristics and process conditions in mind. Electrospinning small diameter fiber less than 10 micron is obtained using an electrostatic force from a strong electric field acting as a pulling force to stretch a polymer jet into a very fine filament. A polymer melt can be used in the electrospinning process, however, fibers smaller than 1 micron are best made from polymer solution. As the polymer mass is drawn down to smaller diameter, solvent evaporates and contributes to the reduction of fiber size. Choice of solvent is critical for several reasons. If solvent dries too quickly, then fibers tends to be flat and large in diameter. If the solvent dries too slowly, solvent will redissolve the formed fibers. Therefore matching drying rate and fiber formation is critical. At high production rates, large quantities of exhaust air flow helps to prevent a flammable atmosphere, and to reduce the risk of fire. A solvent that is not combustible is helpful. In a production environment the processing equipment will require occasional cleaning. Safe low toxicity solvents minimize worker exposure to hazardous chemicals. Electrostatic spinning can be done at a flow rate of 1.5 ml/min per emitter, a target distance of 8 inches, an emitter voltage of 88 kV, an emitter rpm of 200 and a relative humidity of 45%.

The choice of polymer system is important for a given application. For pulse cleaning application, an extremely thin layer of microfiber can help to minimize pressure loss and provide an outer surface for particle capture and release. A thin layer of fibers of less than 2-micron diameter, preferably less than 0.3-micron diameter is preferred. Good adhesion between microfiber or nanofiber and substrates upon which the microfibers or nanofibers are deposited is important. When filters are made of composites of substrate and thin layer of micro- and nanofibers, such composite makes an excellent filter medium for self-cleaning application. Cleaning the surface by back pulsing repeatedly rejuvenates the filter medium. As a great force is exerted on the surface, fine fiber with poor adhesion to substrates can delaminate upon a back pulse that passes from the interior of a filter through a substrate to the micro fiber. Therefore, good cohesion between micro fibers and adhesion between substrate fibers and electrospun fibers is critical for successful use.

Products that meet the above requirements can be obtained using fibers made from different polymer materials. Small fibers with good adhesion properties can be made from such polymers like polyvinylidene chloride, poly vinyl alcohol and polymers and copolymers comprising various nylons such as nylon 6, nylon 4,6; nylon 6,6; nylon 6,10 and copolymers thereof. Excellent fibers can be made from PVDF, but to make sufficiently small fiber diameters requires chlorinated solvents. Nylon 6, Nylon 66 and Nylon 6,10 can be electrospun. But, solvents such as formic acid, m-cresol, tri-fluoro ethanol, hexafluoro isopropanol are either difficult to handle or very expensive. Preferred solvents include water, ethanol, isopropanol, acetone and N-methyl pyrrolidone due to their low toxicity. Polymers compatible with such solvent systems have been extensively evaluated. We have found that fibers made from PVC, PVDC, polystyrene, polyacrylonitrile, PMMA, PVDF require additional adhesion means to attain structural properties. We also found that when polymers are dissolved in water, ethanol, isopropanol, acetone, methanol and mixtures thereof and successfully made into fibers, they have excellent adhesion to the substrate, thereby making an excellent filter medium for self-cleaning application. Self-cleaning via back air pulse or twist is useful when filer medium is used for very high dust concentration. Fibers from alcohol soluble polyamides and poly(vinyl alcohol)s have been used successfully in such applications. Examples of alcohol soluble polyamides include Macromelt 6238, 6239, and 6900 from Henkel, Elvamide 8061 and 8063 from duPont and SVP 637 and 651 from Shakespeare Monofilament Company. Another group of alcohol soluble polyamide is type 8 nylon, alkoxy alkyl modifies nylon 66 (Ref. Page 447, Nylon Plastics handbook, Melvin Kohan ed. Hanser Publisher, New York, 1995). Examples of poly(vinyl alcohol) include PVA-217, 224 from Kuraray, Japan and Vinol 540 from Air Products and Chemical Company.

We have found that filters can be exposed to extremes in environmental conditions. Filters in Saudi Arabian desert can be exposed to temperature as high as 150° F. or higher. Filters installed in Indonesia or Gulf Coast of US can be exposed high humidity above 90% RH and high temperature of 100° F. Or, they can be exposed to rain. We have found that filters used under the hood of mobile equipment like cars, trucks, buses, tractors, and construction equipment can be exposed to high temperature (+200° F.), high relative humidity and other chemical environment. We have developed test methods to evaluate survivability of microfiber systems under harsh conditions. Soaking the filter media samples in hot water (140° F.) for 5 minutes or exposure to high humidity, high temperature and air flow.

B. General Principles Relating to Air Cleaner Design

Herein, the term "air cleaner" will be used in reference to a system which functions to remove particulate material from an air flow stream. The term "air filter" references a system in which removal is conducted by passage of the air, carrying particulate therein, through filter media. The term "filter media" or "media" refers to a material or collection of material through which the air passes, with a concomitant deposition of the particles in or on the media. The term "surface loading media" or "barrier media" refers to a system in which as the air passes through the media, the particulate material is primarily deposited on the surface of the media, forming a filter cake, as opposed to into or through the depth of the media.

Herein the term "filter element" is generally meant to refer to a portion of the air cleaner which includes the filter media therein. In general, a filter element will be designed as a removable and replaceable, i.e. serviceable, portion of the air cleaner. That is, the filter media will be carried by the filter element and be separable from the remainder portion of the air cleaner so that periodically the air cleaner can be rejuvenated by removing a loaded or partially loaded filter element and replacing it with a new, or cleaned, filter element. Preferably, the air cleaner is designed so that the removal and replacement can be conducted by hand. By the term "loaded" or variants thereof in this context, reference is meant to an air cleaner which has been on-line a sufficient period of time to contain a significant amount of trapped particles or particulates thereon. In many instances, during normal operation, a filter element will increase in weight, due to particulate loading therein, of two or three times (or more) its original weight.

In general, specifications for the performance of an air cleaner system are, generated by the preferences of the original equipment manufacturer (OEM) for the engine involved and/or the OEM of the truck or other equipment involved. While a wide variety of specifications may be involved, some of the major ones are the following:

1. Engine air intake need (rated flow)
2. Initial Restriction
3. Initial efficiency
4. Average or overall operating restriction
5. Overall efficiency
6. Filter service life The engine air intake need is a function of the engine size, i.e. displacement and rpm at maximum, full or "rated" load. In general, it is the product of displacement and rated rpm, modified by the volumetric efficiency, a factor which reflects turbo efficiency, duct efficiency, etc. In general, it is a measurement of the volume of air, per unit time, required by the engine or other system involved, during rated operation or full load. While air intake need will vary depending upon rpm, the air intake requirement is defined at a rated rpm, often at 1800 rpm or 2100 rpm for many typical truck engines. Herein this will be characterized as the "rated air flow" or by similar terms. In general, principles characterized herein can be applied to air cleaner arrangements used with systems specified for operation over a wide range of ratings or demands, including, for example, ones in the range of about 3 cubic feet/min. (cfm) up to 10,000 cfm often 50 to 500 cfm. Such equipment includes, for example: small utility engines (motorcycles, lawn mowers, etc.), automotive engines, pickup trucks and sport utility vehicle engines, engines for small trucks and delivery vehicles, buses, over-the-highway trucks, agricultural equipment (for example tractors), construction equipment, mining equipment, marine engines, a variety of generator engines, and, in some instances, gas turbines and air compressors.

Air cleaner overall efficiency is generally a reflection of the amount of "filterable" solids which pass into the air cleaner during use, and which are retained by the air cleaner. It is typically represented as the percentage of solids passing into the air cleaner which are retained by the air cleaner in normal use, on a weight basis. It is evaluated and reported for many systems by using SAE standards, which techniques are generally characterized in U.S. Pat. No. 5,423,892 at Column 25, line 60–Column 26, line 59; Column 27, lines 1–40. A typical standard used is SAE J726, incorporated herein by reference.

With respect to efficiency, engine manufacturer and/or equipment manufacturer specifications will vary, in many instances, with efficiency demands (based on either SAE J726 or field testing) for overall operation often being set at 99.5% or higher, typically at 99.8% or higher. With typical vehicle engines having air flow demands of 500 cfm or above, specifications of 99.8% overall average, or higher, are not uncommon.

Initial efficiency is the measurable efficiency of the filter when it is first put on line. As explained in U.S. Pat. No. 5,423,892 at Column 27, lines 1–40, especially with conventional pleated paper (barrier type or surface-loading) filters, initial efficiency is generally substantially lower than the overall average efficiency during use. This is because the "dust cake" or contaminant build-up on the surface of such a filter during operation, increases the efficiency of the filter. Initial efficiency is also often specified by the engine manufacturer and/or the vehicle manufacturer. With typical vehicle engines having air flow demands of 500 cfm or above, specifications of 98% or above (typically 98.5% or above) are common.

Restriction is the pressure differential across an air cleaner or air cleaner system during operation. Contributors to the restriction include: the filter media through which the air is directed; duct size through which the air is directed; and, structural features against which or around which the air is directed as it flows through the air cleaner and into the engine. With respect to air cleaners, initial restriction limits are often part of the specifications and demands of the engine manufacturer and/or equipment manufacturer. This initial restriction would be the pressure differential measured across the air cleaner when the system is put on line with a clean air filter therein and before significant loading occurs. Typically, the specifications for any given system have a maximum initial restriction requirement.

In general, engine and equipment manufacturers design equipment with specifications for air cleaner efficiency up to a maximum restriction. As reported in U.S. Pat. No. 5,423,892, at Column 2, lines 19–29; and, column 6, line 47, column 7, line 3, the limiting restriction: for typical truck engines is a pressure drop of about 20–30 inches of water, often about 25 inches of water; for automotive internal combustion engines is about 20–25 inches of water; for gas turbines, is typically about 5 inches of water; and, for industrial ventilation systems, is typically about 3 inches of water.

In general, some of the principal variables of concern in air cleaner design in order to develop systems to meet the types of specifications characterized in the previous section, are the following:

1. filter media type, geometry and efficiency;
2. air cleaner shape and structure; and
3. filter element size.

For example, conventional cellulose fiber media or similar media is generally a "barrier" filter. An example is paper media. In general, the operation of such media is through surface loading, i.e., when air is directed through the media, the surface of the media acts as a barrier or sieve, preventing passage of particulate material therethrough. In time, a dust cake builds on the surface of the media, increasing media efficiency. In general, the "tightness" or "porosity" of the fiber construction determines the efficiency, especially the initial efficiency, of the system. In time, the filter cake will effect (increase) the efficiency.

In general, such media is often defined or specified by its permeability. The permeability test for media is generally characterized in U.S. Pat. No. 5,672,399 at Col. 19, lines 27–39. In general, it is the media face velocity (air) required to induce a 0.50 inch water restriction across a flat sheet of the referenced material, media or composite. Permeability, as used herein, is assessed by a Frazier Perm Test, according to ASTM D737 incorporated herein by reference, for example using a Frazier Perm Tester available from Frazier Precision Instrument Co., Inc., Gaithersburg, Md., or by some analogous test.

The permeability of cellulose fiber media used in many types of engine filters for trucks having rated air flows of 50 cfm or more manufactured by Donaldson Company, is media having a permeability of less than about 15 fpm, typically around 13 fpm. In general, in the engine filtration market, for such equipment, a variety of barrier media (pleated media) having permeability values of less than about 25 fpm, and typically somewhere within the range of 10–25 fpm, have been widely utilized by various element manufacturers.

With respect to efficiency, principles vary with respect to the type of media involved. For example, cellulose fiber or similar barrier media is generally varied, with respect to efficiency, by varying overall general porosity or permeability.

C. Typical System; Engine Air Intake

Figure 21:
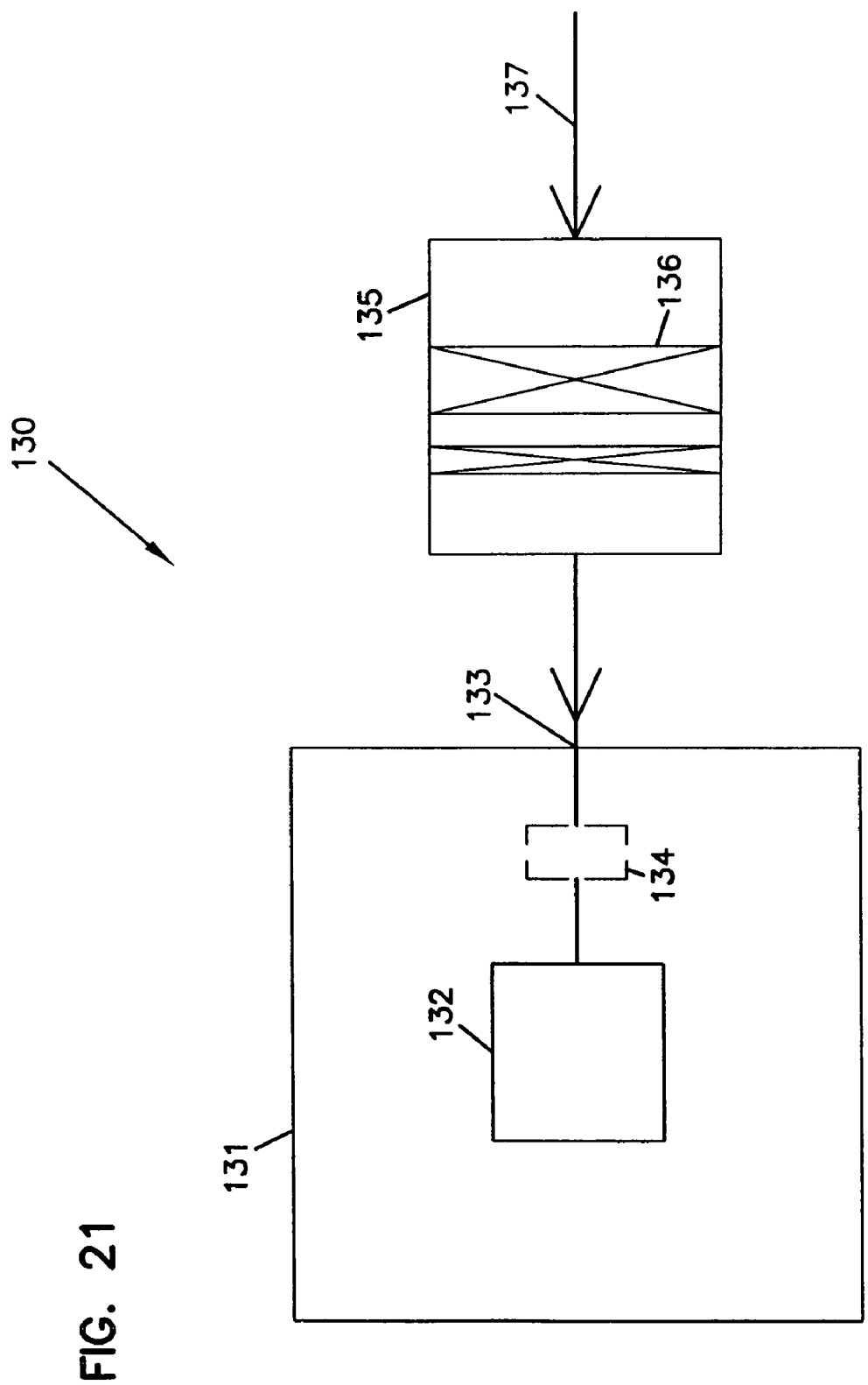
FIG. 21 is a schematic view of an engine system in which air cleaners according to the present disclose may be utilized.

In FIG. 21, a schematic view of a system is shown generally at 130. System 130 is one example type of system in which air cleaner arrangements and constructions described herein is usable. In FIG. 21, equipment 131, such as a vehicle, having an engine 132 with some defined rated air flow demand, for example, at least 370 cfm, is shown schematically. Equipment 131 may comprise a bus, an over the highway truck, an off-road vehicle, a tractor, or marine application such as a power boat. Engine 132 powers equipment 131, through use of an air, fuel mixture. In FIG. 21, air flow is shown drawn into engine 132 at an intake region 133. An optional turbo 134 is shown in phantom, as optionally boosting the air intake into the engine 132. An air cleaner 135 having a media pack 136 is upstream of the engine 132 and turbo 134. In general, in operation, air is drawn in at arrow 137 into the air cleaner 135 and through media pack 136. There, particles and contaminants are removed from the air. The cleaned air flows at arrow 137 into the intake 133. From there, the air flows into engine 132, to power vehicle 131.

In engine systems, during operation of the engine, the temperature, under the hood, typically is at least 120° F., and often is in the range of 140° F.–220° F. or more depending on operating conditions. The temperature may adversely affect the operating efficiency of the filter element. Regulations on emissions can increase the restriction on the engine exhaust, causing further increased temperatures. As explained below, constructing the filter media in the form of a composite of a barrier media and at least a single layer, and in some instances, multiple layers of "fine fiber" can improve the performance (the operating efficiency, in particular) of the filter element over prior art filter elements that are not constructed from such media composites.

D. Example Air Cleaners

Figure 22:
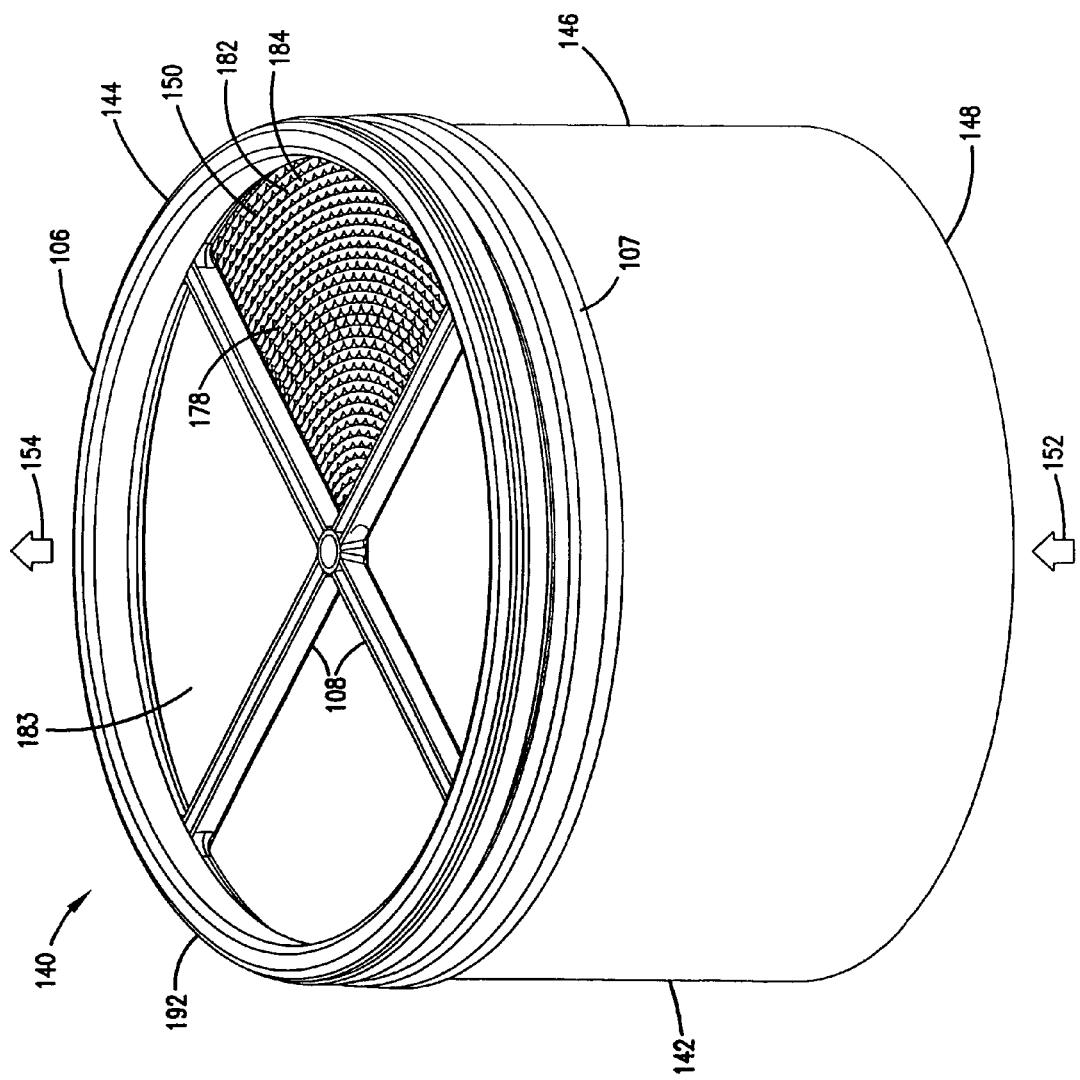
FIG. 22 is a schematic, perspective view of one embodiment of a filter element that may be utilized in the system depicted in FIG. 21.
Figure 24:
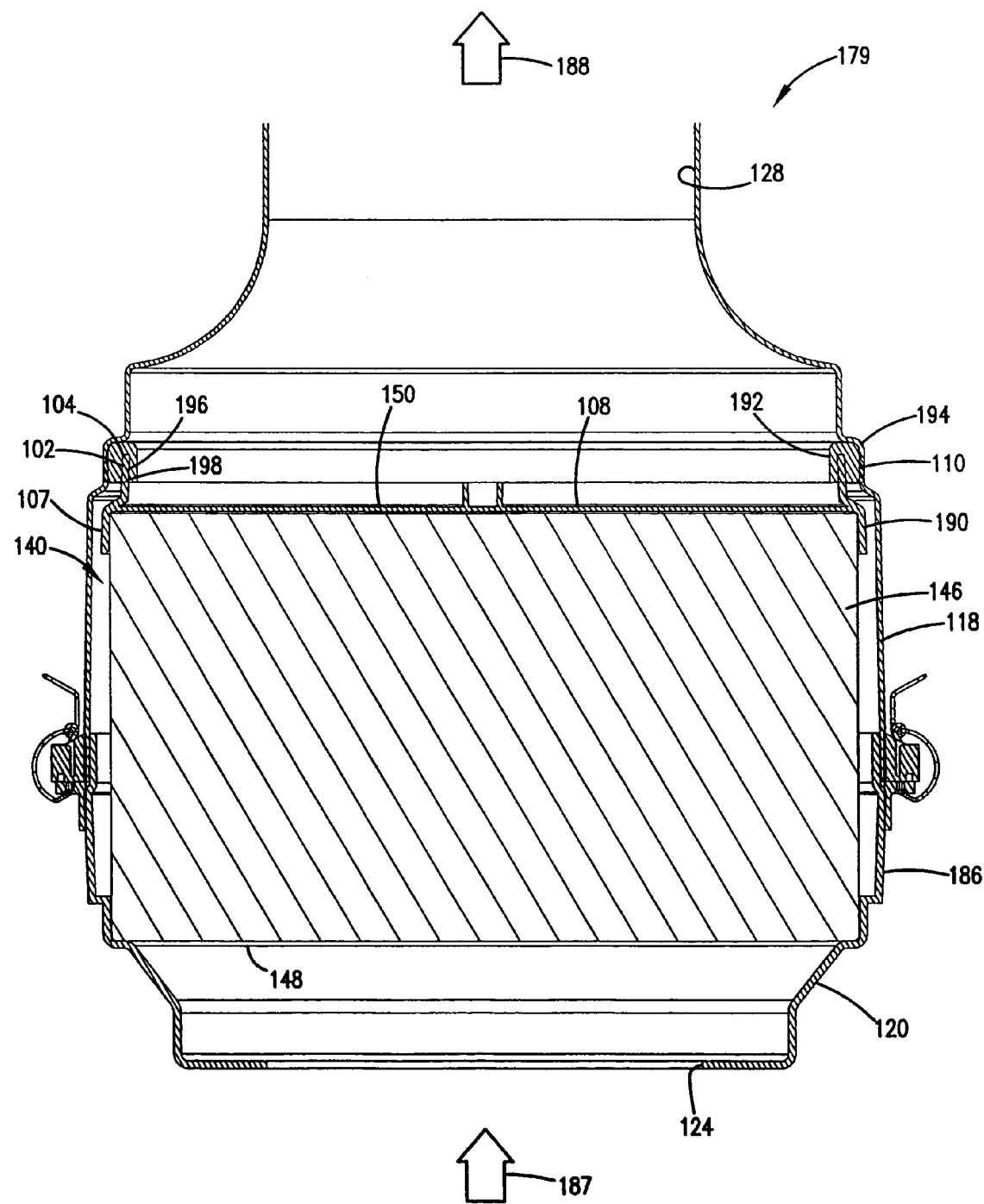
FIG. 24 is a schematic, cross-sectional view of the filter element depicted in FIG. 22 installed within a housing.

Attention is directed to FIG. 22. FIG. 22 is a perspective view of a first embodiment of a media pack 140. The preferred media pack 140 depicted includes filter media 142 and a sealing system 144. In preferred constructions, the filter media 142 is designed to remove particulates from a fluid, such as air, passing through the filter media 142, while the sealing system 144 is designed to seal the media pack 140 against a sidewall of a housing or duct, as shown in FIG. 24.

This media pack 140 of FIGS. 22–25 is generally described in U.S. Pat. No. 6,190,432, which is incorporated by reference herein.

In certain preferred arrangements, the filter media 142 will be configured for straight-through flow. By "straight-through flow," it is meant that the filter media 142 is configured in a construction 146 with a first flow face 148 (corresponding to an inlet end, in the illustrated embodiment) and an opposite, second flow face 150 (corresponding to an outlet end, in the illustrated embodiment), with fluid flow entering in one direction 152 through the first flow face 148 and exiting in the same direction 154 from the second flow face 150. When used with an inline-flow housing, in general, the fluid will enter through the inlet of the housing in one direction, enter the filter construction 146 through the first flow face 148 in the same direction, exit the filter construction 146 in the same direction from the second flow face 150, and exit the housing through the housing outlet also in the same direction.

In FIG. 22, the first flow face 148 and the second flow face 150 are depicted as planar and as parallel. In other embodiments, the first flow face 148 and the second flow face 150 can be non-planar, for example, frusto-conical. Further, the first flow face 148 and second flow face 150 need not be parallel to each other.

Generally, the filter construction 146 will be a wound construction. That is, the construction 146 will typically include a layer of filter media that is turned completely or repeatedly about a center point. Typically, the wound construction will be a coil, in that a layer of filter media will be rolled a series of turns around a center point. In arrangements where a wound, coiled construction is used, the filter construction 146 will be a roll of filter media, typically permeable fluted filter media.

Figure 23:
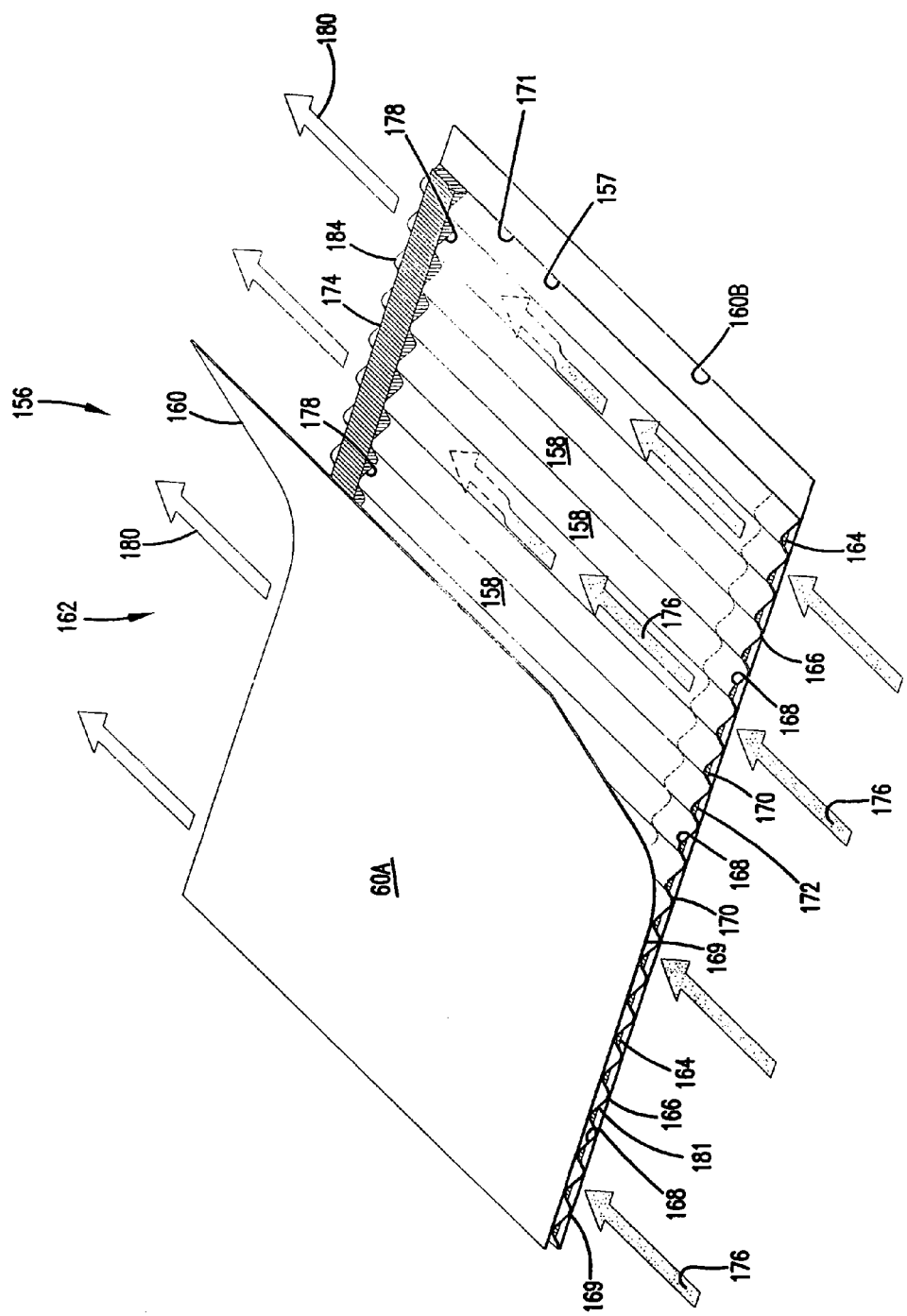
FIG. 23 is a schematic, perspective view of a portion of filter media (Z-media) useable in the arrangement of FIG. 22.

Attention is now directed to FIG. 23. FIG. 23 is schematic, perspective view demonstrating the principles of operation of certain preferred media usable in the filter constructions herein. In FIG. 23, a fluted construction of Z-media is generally designated at 156. Preferably, the fluted construction 156 includes: a layer 157 of corrugations having a plurality of flutes 158 and a face sheet 160. The FIG. 22 embodiment shows two sections of the face sheet 160, at 160A (depicted on top of the corrugated layer 157) and at 160B (depicted below the corrugated layer 157). Typically, the preferred media construction 162 used in arrangements described herein will include the corrugated layer 157 secured to the bottom face sheet 160B. When using this media construction 162 in a rolled construction, it typically will be wound around itself, such that the bottom face sheet 160B will cover the top of the corrugated layer 157. The face sheet 160 covering the top of the corrugated layer is depicted as 160A. It should be understood that the face sheet 160A and 160B are the same sheet 160.

When using this type of media construction 162, the flute chambers 158 preferably form alternating peaks 164 and troughs 166. The troughs 166 and peaks 164 divide the flutes into an upper row and lower row. In the particular configuration shown in FIG. 23, the upper flutes form flute chambers 168 closed at the downstream end 178, while flute chambers 170 having their upstream end 181 closed form the lower row of flutes. The fluted chambers 170 are closed by a first end bead 172 that fills a portion of the upstream end 181 of the flute between the fluting sheet 171 and the second facing sheet 160B. Similarly, a second end bead 174 closes the downstream end 178 of alternating flutes 168.

When using media constructed in the form of media construction 162, during use, unfiltered fluid, such as air, enters the flute chambers 168 as indicated by the shaded arrows 176. The flute chambers 168 have their upstream ends 169 open. The unfiltered fluid flow is not permitted to pass through the downstream ends 178 of the flute chambers 168 because their downstream ends 178 are closed by the second end bead 174. Therefore, the fluid is forced to proceed through the fluting sheet 171 or face sheets 160. As the unfiltered fluid passes through the fluting sheet 171 or face sheets 160, the fluid is cleaned or filtered. The cleaned fluid is indicated by the unshaded arrow 180. The fluid then passes through the flute chambers 170 (which have their upstream ends 181 closed) to flow through the open downstream end 184 out the fluted construction 156. With the configuration shown, the unfiltered fluid can flow through the fluted sheet 171, the upper facing sheet 160A, or lower facing sheet 160B, and into a flute chamber 170.

Typically, the media construction 162 will be prepared and then wound to form a rolled construction 146 of filter media. When this type of media is selected for use, the media construction 162 prepared includes the sheet of corrugations 157 secured with the end bead 172 to the bottom face sheet 160B (as shown in FIG. 23, but without the top face sheet 160A).

Attention is again directed to FIG. 22. In FIG. 22, the second flow face 150 is shown schematically. There is a portion at 182 in which the flutes including the open ends 184 and closed ends 178 are depicted. It should be understood that this section 182 is representative of the entire flow face 50. For the sake of clarity and simplicity, the flutes are not depicted in the other remaining portions 183 of the flow face 150. Top and bottom plan views, as well as side elevational views of a media pack 140 usable in the systems and arrangements described herein are depicted in copending and commonly assigned U.S. patent application Ser. No. 29/101,193, filed Feb. 26, 1999, and entitled, "Filter Element Having Sealing System," herein incorporated by reference.

Turning now to FIG. 24, the filter construction 146 is shown installed in a housing 186 (which can be part of an air intake duct into an engine or turbo of an air cleaner 179). In the arrangement shown, air flows into the housing 186 at 187, through the filter construction 146, and out of the housing 186 at 188. When media constructions such as filter constructions 46 of the type shown are used in a duct or housing 186, the sealing system 144 will be needed to ensure that air flows through the media construction 146, rather than bypass it.

The particular sealing system 144 depicted includes a frame construction 190 and a seal member 192. When this type of sealing system 144 is used, the frame construction 190 provides a support structure or backing against which the seal member 192 can be compressed against to form a radial seal 194 with the duct or housing 186.

Still in reference to FIG. 24, in the particular embodiment shown, the frame construction 190 includes a rigid projection 196 that projects or extends from at least a portion of one of the first and second flow faces 148, 150 of the filter construction 146. The rigid projection 196, in the particular arrangement shown in FIG. 24, extends axially from the second flow face 150 of the filter construction 146.

The projection 196 shown has a pair of opposite sides 198, 102 joined by an end tip 104. In preferred arrangements, one of the first and second sides 198, 102 will provide a support or backing to the seal member 192 such that seal 194 can be formed between and against the selected side 198 or 102 and the appropriate surface of the housing or duct. When this type of construction is used, the projection 196 will be a continuous member forming a closed hoop structure 106 (FIG. 22).

When this type of construction is used, a housing or duct may circumscribe the projection 196 and hoop structure 106 including the seal member 192 to form seal 194 between and against the outer side 102 of the projection 196 and an inner surface 110 of the housing or duct.

In the particular embodiment shown in FIG. 24, the seal member 192 engages the end tip 104 of the projection 196 as well, such that the seal member 192 covers the projection 196 from the exterior side 102, over the end tip 104, and to the interior side 198.

Referring now to FIGS. 22 and 24, the frame 190 has a band, skirt, or depending lip 107 that is used to secure the frame 190 to the media construction 146. The depending lip 107 depends or extends down a first distance from cross braces 108.

During use of frames 190 of the type depicted herein, inward forces are exerted around the circumference of the frame 190. Cross braces 108 support the frame 190. By the term "support," it is meant that the cross braces 108 prevent the frame 190 from radially collapsing under the forces exerted around the circumference of the frame 190.

The tip portion 104 provides support for the compressible seal member 192. The compressible seal member 192 is preferably constructed and arranged to be sufficiently compressible to be compressed between the tip portion 104 of the frame 190 and sidewall 110 of a housing or duct. When sufficiently compressed between the tip portion 104 and the sidewall 110, radial seal 194 is formed between the media pack 140 and the sidewall 110.

Figure 25:
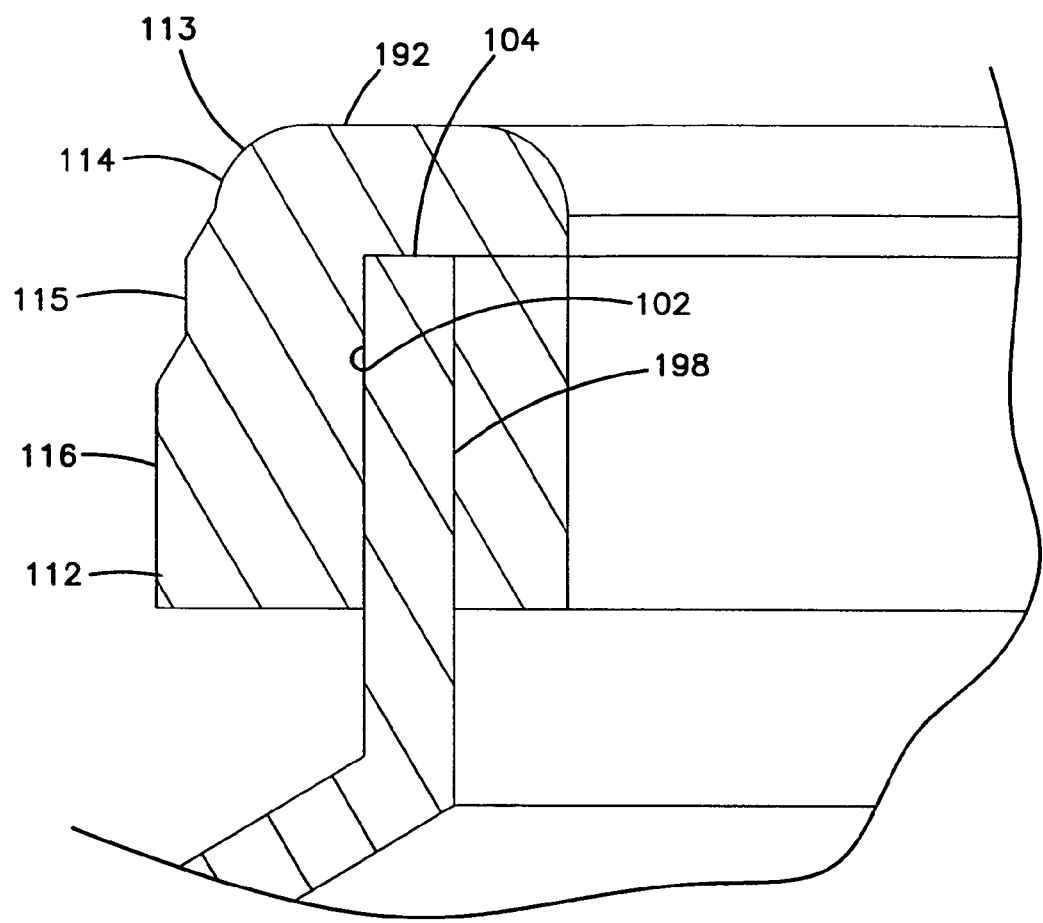
FIG. 25 is a fragmented, enlarged, schematic view of one embodiment of a compressible seal member utilized in a sealing system for the filter element of FIG. 22.

One preferred configuration for seal member 192 is shown in FIG. 25. The tip portion 104 of the frame 190 defines a wall or support structure between and against which radial seal 194 may be formed by the compressible seal member 192. The compression of the compressible seal member 192 at the sealing system 144 is preferably sufficient to form a radial seal under insertion pressures of no greater than 80 lbs., typically, no greater than 50 lbs., for example, about 20–40 lbs., and light enough to permit convenient and easy change out by hand.

In the preferred embodiment shown in FIG. 25, the seal member 192 is a stepped cross-sectional configuration of decreasing outermost dimensions (diameter, when circular) from a first end 112 to a second end 113, to achieve desirable sealing. Preferred specifications for the profile of the particular arrangement shown in FIG. 25 are as follows: a polyurethane foam material having a plurality of (preferably at least three) progressively larger steps configured to interface with the sidewall 110 and provide a fluid-tight seal.

The compressible seal member 192 defines a gradient of increasing internal diameters of surfaces for interfacing with the sidewall 110. Specifically, in the example shown in FIG. 25, the compressible seal member 192 defines three steps 114, 115, 116. The cross-sectional dimension or width of the steps 114, 115, 116 increases the further the step 114, 115, 116 is from the second end 113 of the compressible seal member 192. The smaller diameter at the second end 113 allows for easy insertion into a duct or housing. The larger diameter at the first end 112 ensures a tight seal.

In general, the media pack 140 can be arranged and configured to be press-fit against the sidewall 110 of the housing 186 or duct. In the specific embodiment shown in FIG. 24, the compressible seal member 192 is compressed between the sidewall 110 and the tip portion 104 of the frame 190. After compression, the compressible seal member 192 exerts a force against the sidewall 110 as the compressible seal member 192 tries to expand outwardly to its natural state, forming radial seal 94 between and against the tip portion 104 and the sidewall 110.

A variety of housings are usable with the media pack 140. In the particular embodiment depicted in FIG. 24, the housing 186 includes a body member or a first housing compartment 118 and a removable cover or second housing compartment 120. In some arrangements, the first housing compartment 118 is affixed to an object, such as a truck. The second housing compartment 120 is removably secured to the first housing compartment 118 by a latching device 122.

In the illustrated embodiment in FIG. 24, the second end 150 of the media pack 140 with the attached frame 190 and compressible seal member 192 is inserted into the first housing compartment 118. The media pack 140 is press-fit into the first housing compartment 118 such that the compressible seal member 192 is compressed between and against the tip portion 104 of the frame 190 and the sidewall 110 of the first housing compartment 118, to form radial seal 194 therebetween.

During use of the arrangement depicted in FIG. 24, the fluid enters the housing assembly 185 at the inlet region 124 of the second housing compartment 120, in the direction shown at 187. The fluid passes through the filter construction 146. As the fluid passes through the filter construction 146, contaminants are removed from the fluid. The fluid exits the housing assembly 185 at the outlet region 128, in the direction of 188. The compressible seal member 192 of the sealing system 144 forms radial seal 194 to prevent contaminated fluid from exiting the housing assembly 185, without first passing through the filter construction 146.

Figure 26:
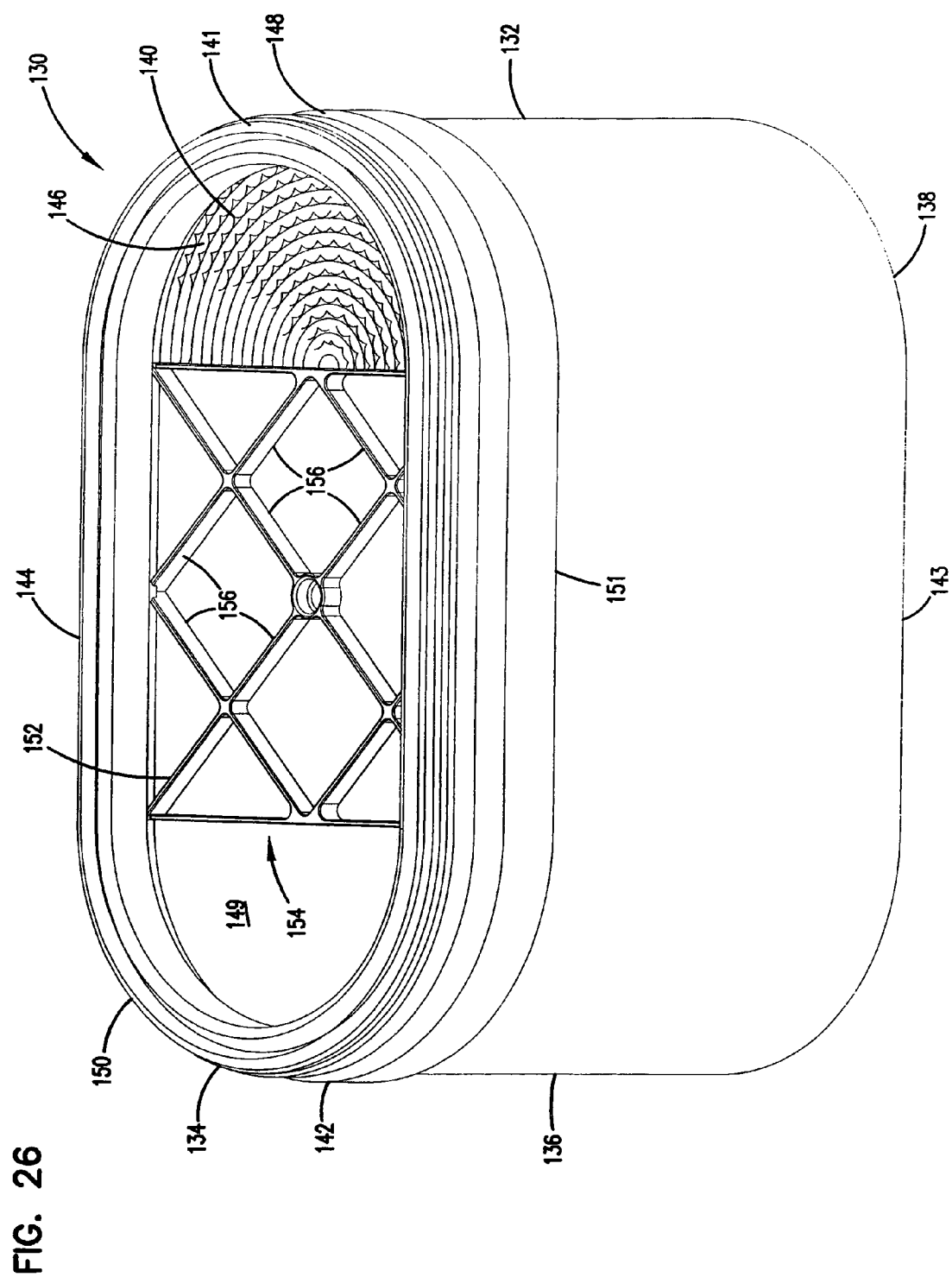
FIG. 26 is a schematic, perspective view of another embodiment of a filter element that may be utilized in the engine system of FIG. 21.

FIG. 26 is a perspective view of another embodiment of a media pack 130. In the construction depicted, the media pack 130 includes filter media 132 and a sealing system 134. The filter media 132 is designed to remove contaminants from a fluid, such as air, passing through the filter media 132. The sealing system 134 is designed to seal the filter media 134 to a housing or duct.

Figure 27:
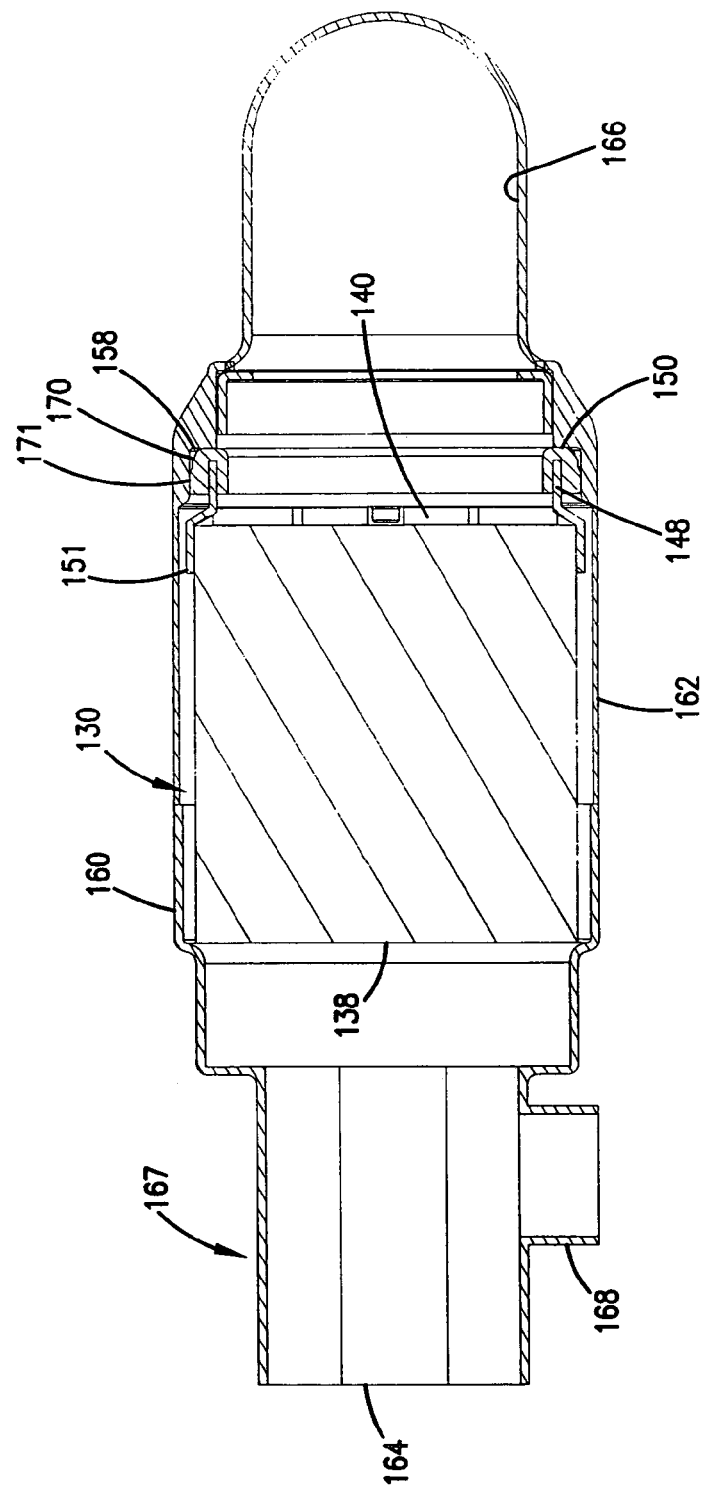
FIG. 27 is a schematic, cross-sectional view of the filter element of FIG. 26 installed within a housing.

The construction and geometry of the media pack 130 of FIGS. 26–27, with the exception of preferred media formulations given in Section H below, is described in U.S. Pat. No. 6,190,432, which is incorporated by reference herein.

In certain preferred arrangements, the filter media 132 will be configured in a filter construction 136 with a first flow face 138 and an opposite, second flow face 140.

The filter construction 136 can have a variety of configurations and cross-sectional shapes. In the particular embodiment illustrated in FIG. 26, the filter construction 136 has a non-circular cross-section. In particular, the FIG. 26 embodiment of the filter construction 136 has an ob-round or "racetrack" cross-sectional shape. By "racetrack" cross-sectional shape, it is meant that the filter construction 136 includes first and second semicircular ends 141, 142 joined by a pair of straight segments 143, 144.

In FIG. 26, certain portions 146 are depicted showing the flutes, including the open and closed ends. It should be understood that this portion or section 146 is representative of the entire flow face 140 (as well as the first flow face 138). For the sake of clarity and simplicity, the flutes are not depicted in the other remaining portions 149 of the flow face 140. Top and bottom plan views, as well as side elevational views of the media pack 130 usable in the systems and arrangements described herein are depicted in copending and commonly assigned U.S. patent application Ser. No. 29/101,193, filed Feb. 26, 1999, and entitled, "Filter Element Having Sealing System," herein and incorporated by reference.

As with the embodiment of FIG. 22, the media pack 130 includes sealing system 134. In preferred constructions, the sealing system 134 includes a frame 148 and a seal member 150.

The frame 148 has a non-circular, for example, obround and in particular, a racetrack shape and is arranged and configured for attachment to the end of the filter media 132. In particular, the frame 148 has a band or skirt or depending lip 151 that is generally racetrack shaped. The depending lip 151 depends or extends down a distance from cross braces 152 and is used to secure the frame 148 to the media pack 130.

During use of the arrangements depicted, inward forces are exerted around the circumference of the frame 148. Inward forces exerted against the semicircular ends 141, 142 can cause the straight segments 143, 144 to bow or bend. Cross braces 152 are provided to provide structural rigidity and support to the straight segments 143, 144. As can be seen in FIG. 26, the particular cross braces 152 depicted form a truss system 154 between the opposing straight segments 143, 144. The truss system 154 includes a plurality of rigid struts 156, preferably molded as a single piece with the remaining portions of the frame 148.

Figure 5:
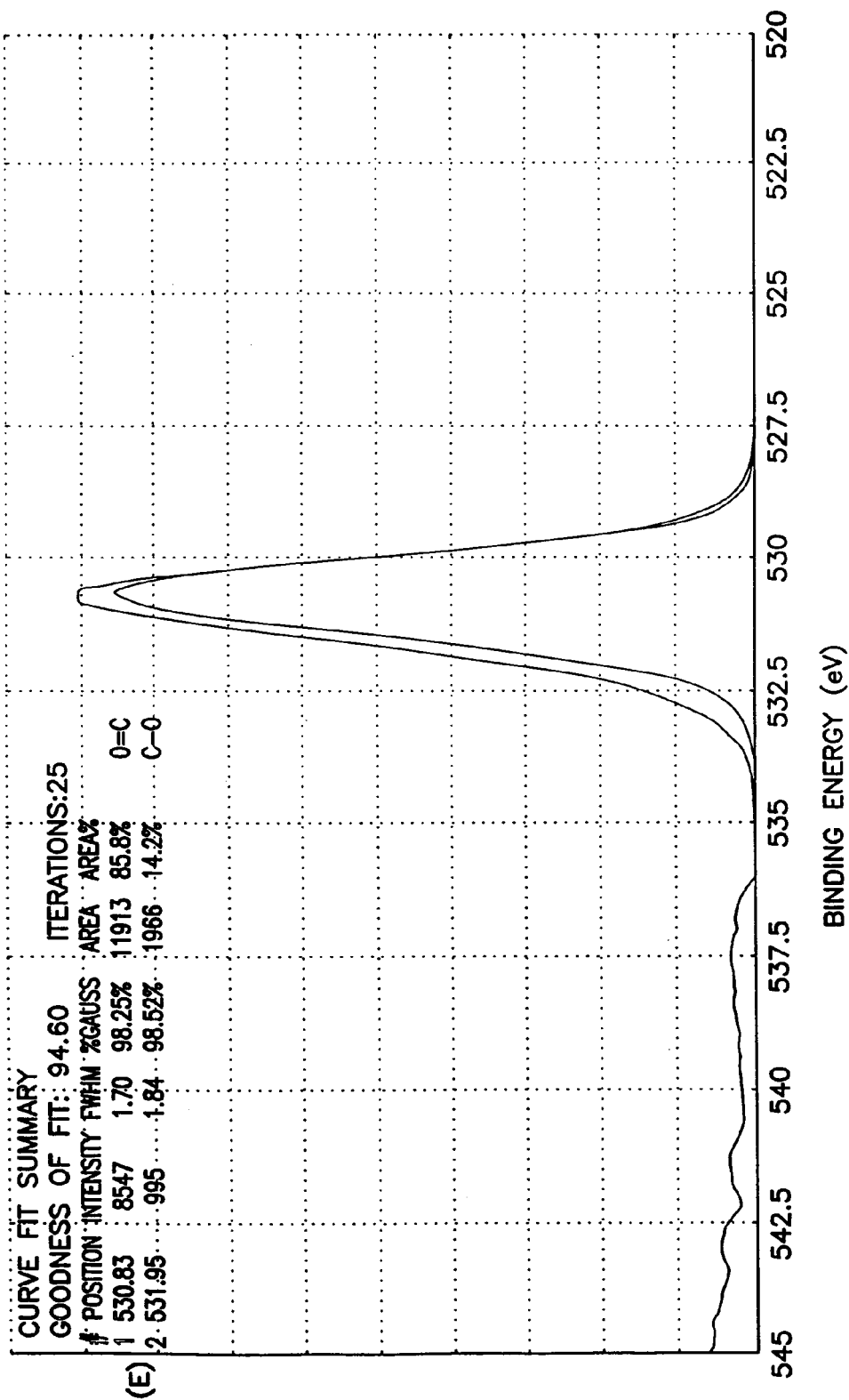

The frame 148 is constructed analogously to the frame 90. As such, the frame 148 includes a tip portion 158 (FIG. 27). In preferred arrangements, the tip portion 158 acts as an annular sealing support. In preferred systems, the compressible seal member 150 has structure analogous to the that of the compressible seal member 92 of FIG. 5.

Preferably, the media pack 130 will be installed in a duct or an air cleaner housing. In FIG. 27, the housing depicted is a two-piece housing including a cover 160 and a body member 162. The cover 160 defines an airflow inlet 164. The body member 162 defines an airflow outlet 166. The housing further includes a pre-cleaner arrangement 167 upstream of the media pack 130, such as that described in U.S. Pat. Nos. 2,887,177 and 4,162,906, incorporated by reference herein. In the one depicted, the pre-cleaner arrangement 167 is in the cover 160. The cover 160 includes a dust ejector 168 that expels dust and debris collected in the pre-cleaner 167.

The compressible seal member 150 is compressed between the sidewall 170 and the tip portion 158 of the frame 150. As the media pack 130 is press-fit, the compressible seal member 150 is compressed between and against the frame 148 (specifically, in the particular embodiment shown, the tip portion 158) and the sidewall 170. After compression, the compressible seal member 150 exerts a force against the sidewall 170 as the compressible seal member 150 tries to expand outwardly to its natural state, forming a radial seal 171 with the sidewall 170.

Preferred formulations for media 132 are described in Section H, below.

Figure 28:
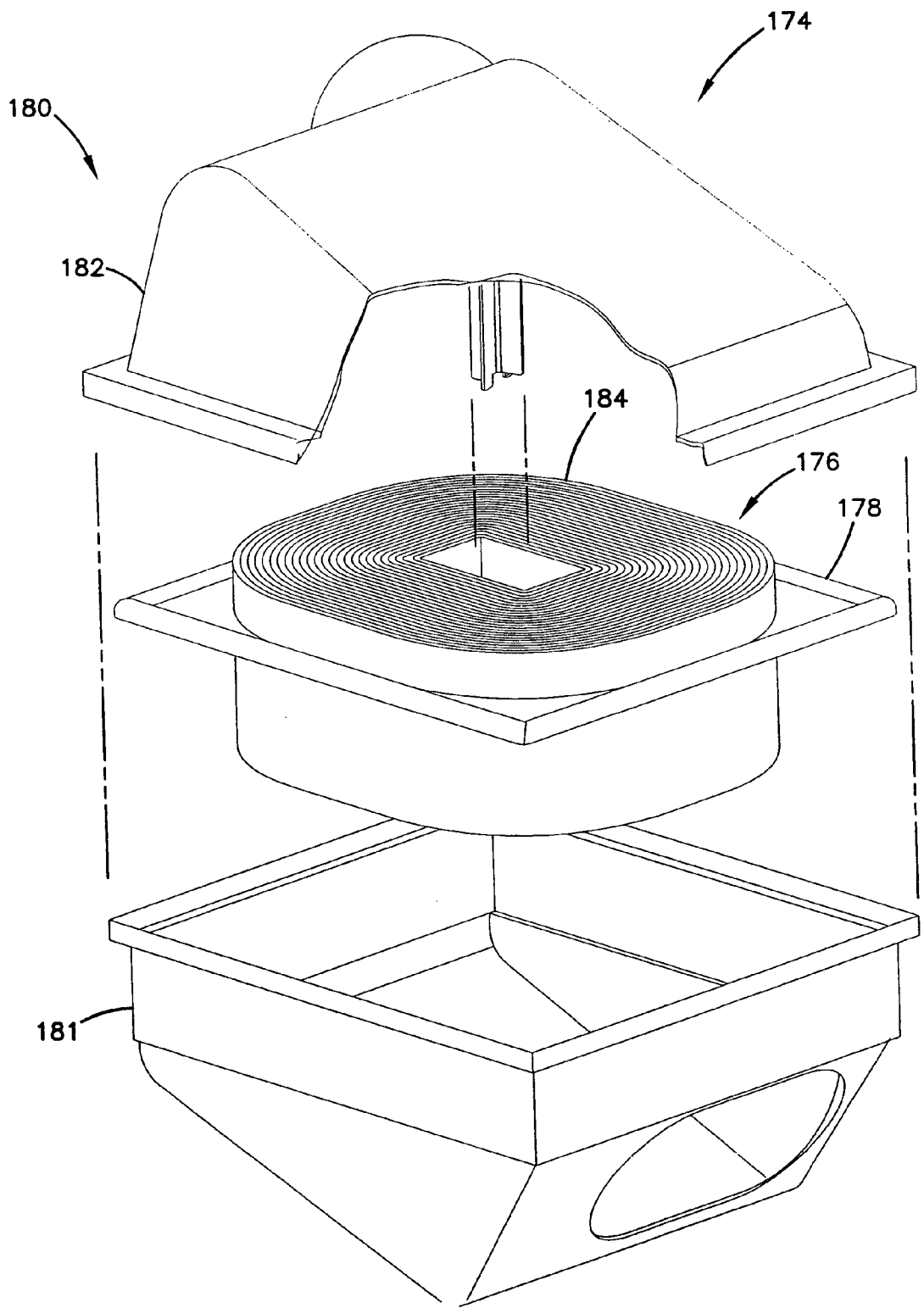
FIG. 28 is a schematic, exploded, perspective view of another embodiment of a filter element and housing that may be utilized in the engine system of FIG. 21.

Another filter arrangement is shown in FIG. 28, generally at 174. With the exception of preferred media formulations described in Section H below, the filter arrangement 174 is described in U.S. Pat. No. 5,820,646, incorporated by reference herein.

The filter arrangement 174 includes a media pack 176 mounted in, held by and supported by a panel construction 178. Filter arrangement 174 also includes a housing 180, which includes a body 181 and a removable cover member 182. The panel construction 178 holding the media pack 176 seals within the housing 180, and is removable and replaceable therefrom.

The media pack 176 includes fluted filter media 184 constructed as described above with respect to FIG. 23.

E. Typical System; Gas Turbine Air Intake

Figure 29:
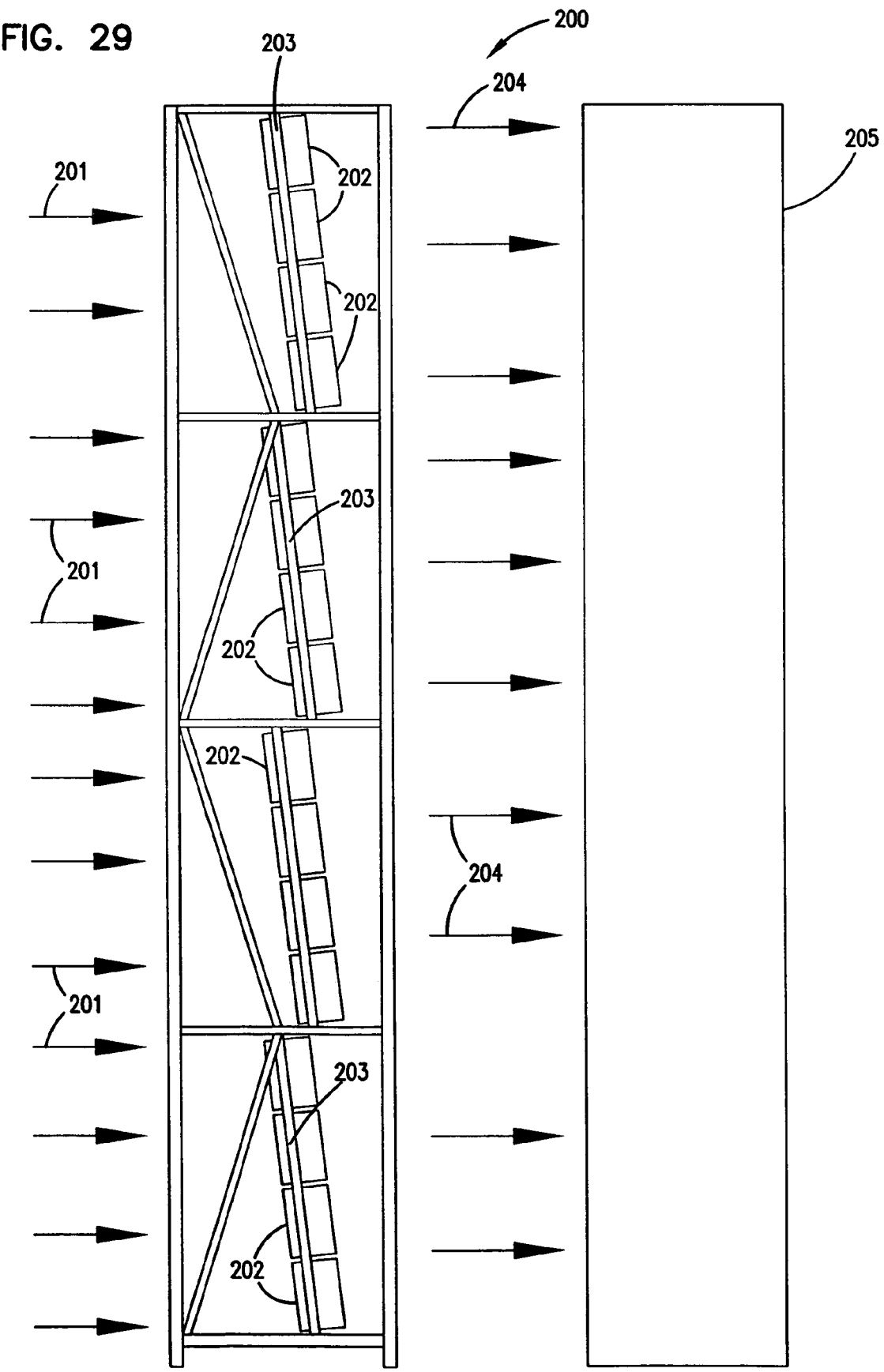
FIG. 29 is a schematic depiction of a gas turbine system in which filter elements according to the present disclosure may be utilized.

In FIG. 29, the air intake of a gas turbine system is shown generally at 200. Airflow is shown drawn into an air intake system 200 at arrows 201. The air intake system 200 includes a plurality of air filter arrangements 202 generally held in a tube sheet 203. In preferred systems, the tube sheet 203 will be constructed to hold the filter arrangements 202 at an angle, relative to a vertical axis. Preferred angles will be between 5–25°, for example, about 7°. This permits liquid to drain from the filter arrangements 202 when the system 200 is not operating.

The air is cleaned in the air filter arrangements 202, and then it flows downstream at arrows 204 into gas turbine generator 205, where it is used to generate power.

Figure 33:
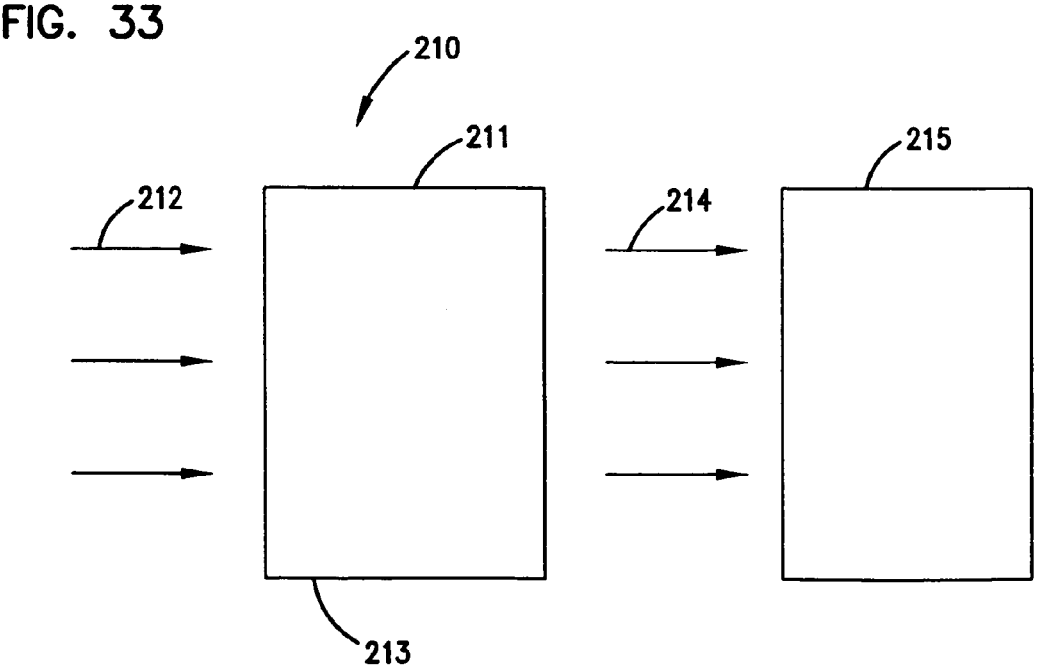
FIG. 33 is a schematic view of an air intake system for a microturbine system, in which filter elements of the present disclosure may be utilized.

In FIG. 33, an example of the air intake of a microturbine is illustrated generally at 210. In general, microturbines are smaller versions of gas turbines typically used as stand-by generators. In some instances, such microturbines are approximately 24 inches by 18 inches and have electrical power output typically between 30 kilowatts and 100 kilowatts. These systems typically have air flow between 1000 cfm and 10,000 cfm.

In FIG. 33, airflow is shown drawn into an air intake system 211 at arrows 212. The air intake system 211 includes a filter arrangement 213. As the air is drawn through the filter arrangement 213, the air is cleaned in the air filter arrangement 213, and then flows downstream at arrows 214 into a gas turbine 215. The gas turbine then typically powers an electrical generator, a fluid compressor, or a fluid pump. As explained below, constructing the filter arrangement in the form of a composite of a barrier media and at least a single layer, and in some instances, multiple layers of "fine fiber" can improve the performance (the operating efficiency, in particular) of the filter arrangement over prior art filters that are not constructed from such media composites.

F. Example Filter Arrangements for Gas Turbine Systems

Figure 30:
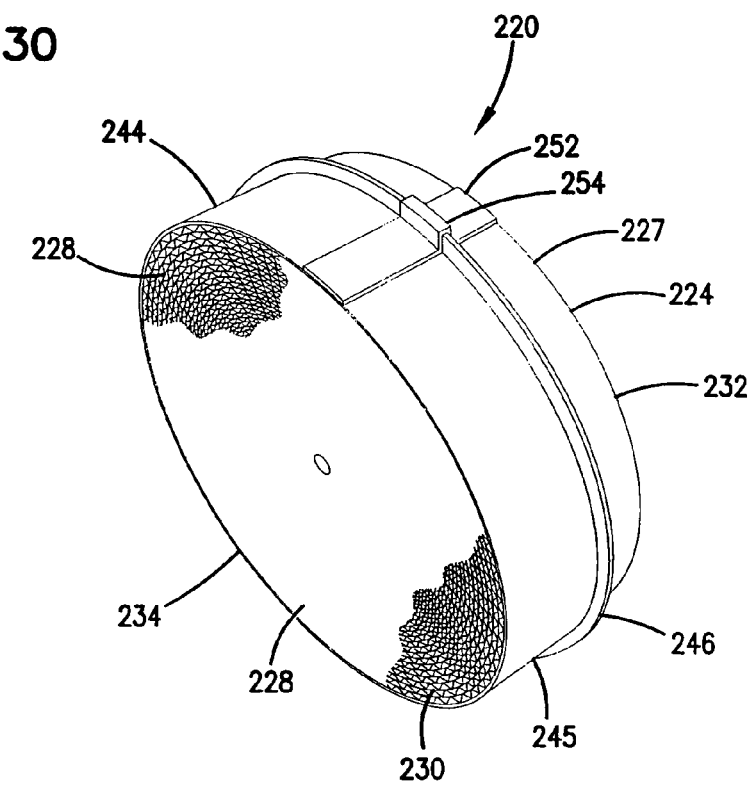
FIG. 30 is a schematic, perspective view of one embodiment of a filter element that may be useable in gas turbine air intake systems depicted in FIG. 29.
Figure 31:
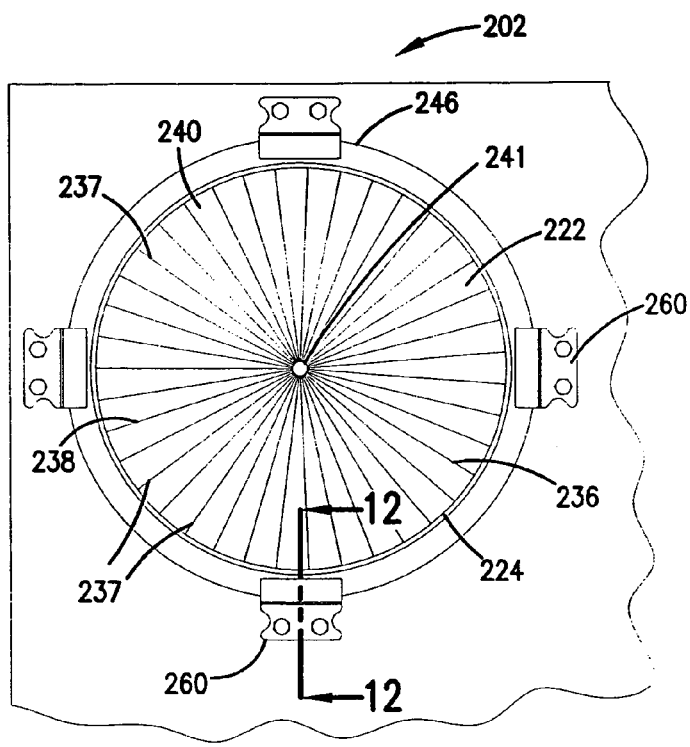
FIG. 31 is a rear elevational view of the filter element depicted in FIG. 30 installed within a tube sheet, and having a prefilter installed upstream of the filter element of FIG. 30.
Figure 32:
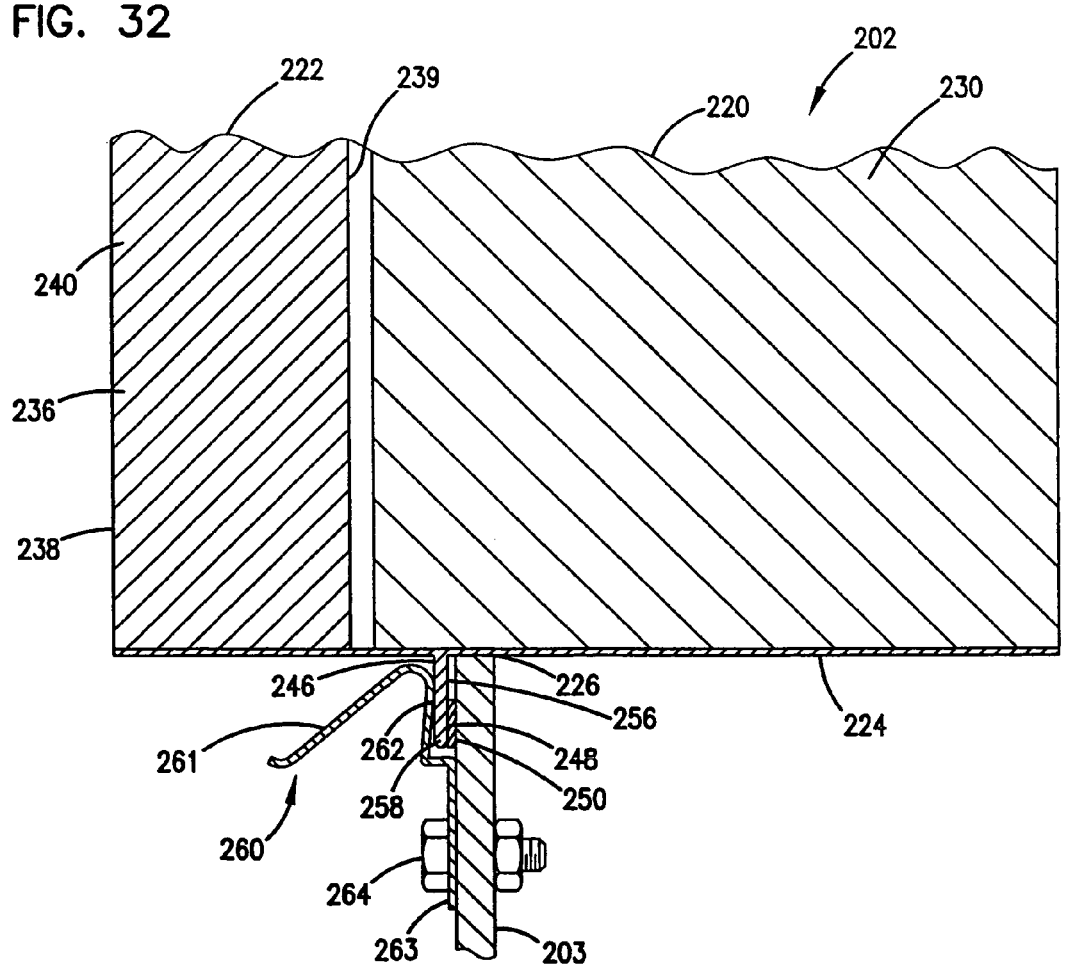
FIG. 32 is an enlarged, schematic, fragmented, cross-sectional view of the air filter arrangement of FIG. 31, taken along the line 12—12 of FIG. 31.

One example of an air filter arrangement 202 usable in system 200 or system 210 is shown in FIGS. 30–32. Other than preferred media formulations given in Section H, the air filter arrangement 202 is described in commonly assigned U.S. Ser. No. 09/437,867, filed Nov. 10, 1999, incorporated by reference herein. In general, the air filter arrangement 202 includes a first, or primary filter element 220 (FIGS. 30 and 32) and a second filter element 222 (FIGS. 31 and 32), which acts as a prefilter. By the term "prefilter", it is meant a separator that is positioned upstream of the main, primary filter element 220, that functions to remove large particles from the gas stream. The primary filter element 220 and the prefilter element 222 are preferably secured within a sleeve member 224 that is removably mountable in an aperture 226 in tube sheet 203. In general, air flow is taken into the system 200 and flows first through the prefilter element 222 and then through the primary filter element 220. After exiting the primary filter element 220, the air is directed into the generator 205.

In general, the element 220 is constructed from fluted or z-shaped media 230, as described above in connection with FIGS. 2 and 3. In FIG. 30, it should be understood that the outlet face 228 is shown schematically. That is, only a portion of the face 228 is shown with flutes. It should be understood that, in typical systems, the entire face 228 will be fluted.

The filter element 220 has a first end 232 and an opposite, second end 234. In the arrangement depicted in FIG. 30, the first end 232 will correspond to an upstream end inlet face 227, while the second end 234 will correspond to a downstream end outlet face 228. The straight through flow allows gas to flow into the first end 232 and exit the second end 234, such that the direction of the air flow into the first end 232 is the same direction of air flow that is exiting the second end 234. Straight through flow patterns can reduce the amount of turbulence in the gas flow.

The media 230 can be a polyester synthetic media, a media made from cellulose, or blends of these types of materials and treated with fine fiber.

Preferably, the prefilter element 222 is a pleated construction 236 comprising a plurality of individual pleats 237. The pleats 237 are arranged in a zig-zag fashion. Preferred prefilter elements 222 will have a generally circular cross-section.

The prefilter element 222 is configured to permit straight through flow. In other words, the air flows directly through the prefilter element 222, entering at an inlet face 238 and exiting at an oppositely disposed outlet face 239, wherein the direction of fluid flow entering the inlet face 238 is in the same direction of fluid flow exiting the outlet face 239.

In certain preferred embodiments, there will be at least 15 pleats 237, no greater than 80 pleats 237, and typically 30–50 pleats 237. The pleated construction 236 is made from a media 240 that is folded in the form of pleats 237 centered around a central core 241. Useable types of media 240 includes fiberglass, or alternatively, an air laid media. Specific properties of usable media 240 include: a dry laid filter medium made from polyester fibers randomly oriented to form a web having a weight of 2.7–3.3 oz./yd$^3$ (92–112 g/m$^3$); a free thickness (i.e., thickness at 0.002 psi compression) of 0.25–0.40 in. (6.4–10.2 mm); and a permeability of at least 400 ft./min (122 m/min).

In general, the prefilter element 222 is removably and replaceably mountable in the sleeve member 224. The sleeve member 224 is described in further detail below. In certain systems, the prefilter element 222 is held within the sleeve member 224 by squeezing or compressing end tips of the media 240 against the inside wall of the sleeve member 224.

Preferred filter arrangements 202 constructed according to principles herein will have sleeve member 224 secured to and circumscribing the primary filter element 220. In general, the sleeve member 224 functions to hold the primary element 220 in place in the system 200. Preferred sleeve members 224 will also hold the prefilter element 222 in place upstream of the primary element 220.

As can be seen in FIGS. 30 and 31, the sleeve member 224 preferably has a cross-section that matches the cross-section of the primary filter element. The sleeve member 224 includes a surrounding wall 244 that is curved in a form to result in a surrounding ring 245. The sleeve member 224 is preferably oriented relative to the primary filter element 220 to extend at least 30% of the axial length of the primary filter element 220. In many typical arrangements, the sleeve member 224 will extend greater than 50% of the axial length of the primary filter element 220. Indeed, in most preferred arrangements, the sleeve member 224 will extend at least the entire length (that is, 100%) of the axial length of the primary filter element 220. In many typical applications, the sleeve member 224 will have a radius of at least 10 inches, typically 15–30 inches, and in some instances, no greater than 50 inches.

The sleeve member 224 is preferably constructed and arranged with a sealing system to allow for securing the primary filter element 220 to the tube sheet 203, to inhibit air from bypassing the primary element 220. In the illustrated embodiment, the sleeve member 224 includes a seal member pressure flange 246. The flange 246 at least partially, and in many embodiments fully, circumscribes the wall 244 of the sleeve member 224. The seal member pressure flange 246 operates as a backstop to support a seal member 248 in order to create a seal 250 between and against the flange 246 and the tube sheet 203. The flange 246 extends radially from the wall 244 of the sleeve member 224 and fully circumscribes the seal member 224. The flange 246 will extend radially from the wall 244 a distance sufficient to support the seal member 248.

A patch or retaining clip 252 (FIG. 30) extends over a joint 254 to secure the sleeve member 224 in its final configuration Preferably, the retaining clip 252 is secured in a permanent way to the sleeve member 224; for example, by ultrasonic welding.

Attention is directed to FIG. 32. It can be seen that the flange 246 supports the seal member 248 on the axial side 256. The seal member 248 generally comprises a circular gasket 258. The gasket 258 is preferably secured to the flange 246, by adhesive between the gasket 258 and the side 256 of the flange 246. The gasket 258 is positioned on the flange 246, such that the gasket 258 completely circumscribes the wall 244 and the primary element 220.

The arrangement depicted also includes a system for clamping the sleeve member 224 to the tube sheet 203. In the illustrated embodiment, the clamping system includes a plurality of latches or clamps 260. There should be enough latches or clamps 260 to form a good, tight seal 250 between the flange 246 and the tube sheet 203, when the sleeve member 224 is operably installed in the tube sheet 203; for example, illustrated is 4 clamps 260. In FIG. 32, the clamp 260 is shown in cross-section. Each of the clamps 260 includes a lever 261, a nose 262, and a plate 263. The plate 263 includes apertures for accommodating a fastener, such as a bolt 264 to secure the clamp 260 to the tube sheet 203. The nose 262 operates to apply pressure to the flange 246 and compress the seal member 248 against the tube sheet 203. The lever 261 operates to selectively move the nose 262 toward and away from the tube sheet 203. In other embodiments, the clamps 260 can be hand-tightened, such as using wing nuts.

In typical operation, there is an overall pressure drop across the filter arrangement 202 of about 0.6–1.6 inches of water. This includes both the primary filter element 220 and the prefilter 222. Typically, the pressure drop across the prefilter 222 alone will be about 0.2–0.6 inches of water, while the pressure drop across the primary element 220 alone will be about 0.4–1 inch of water.

Figure 34:
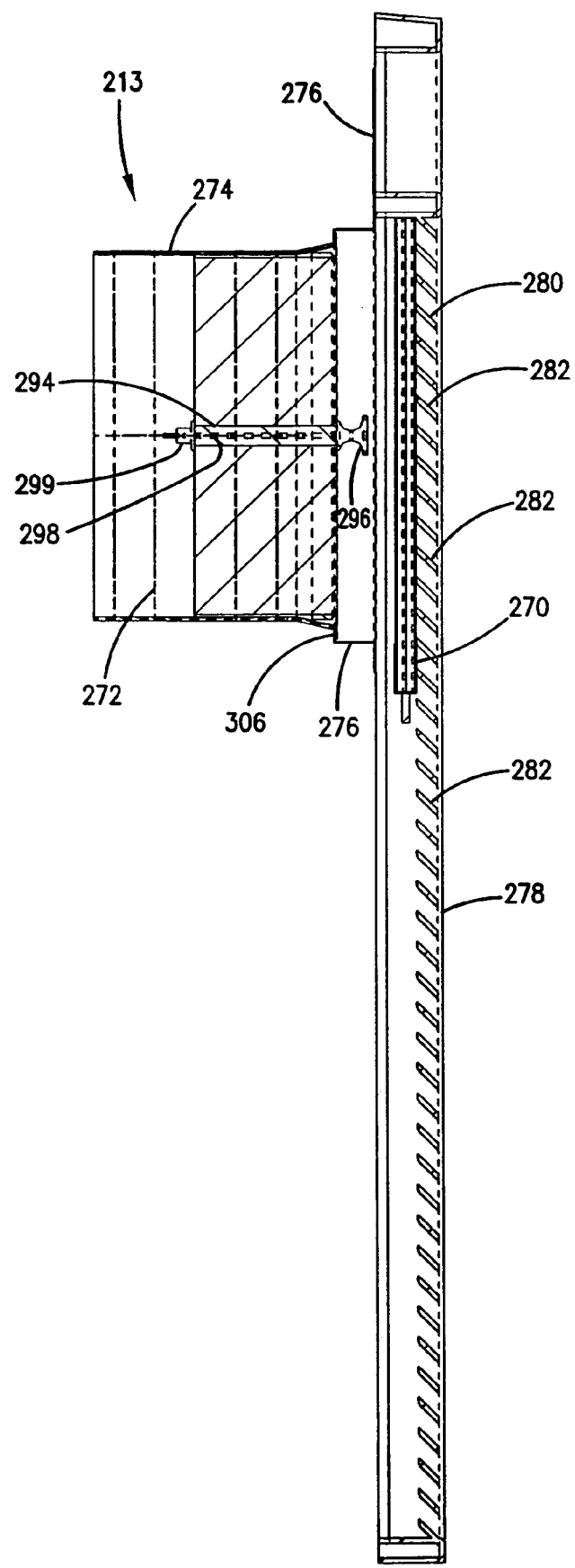
FIG. 34 is a schematic, cross-sectional view of a filter element in an operable installation to clean intake air in a gas turbine system, the cross-section being taken along the line 14—14 of FIG. 35, but in an assembled state.
Figure 35:
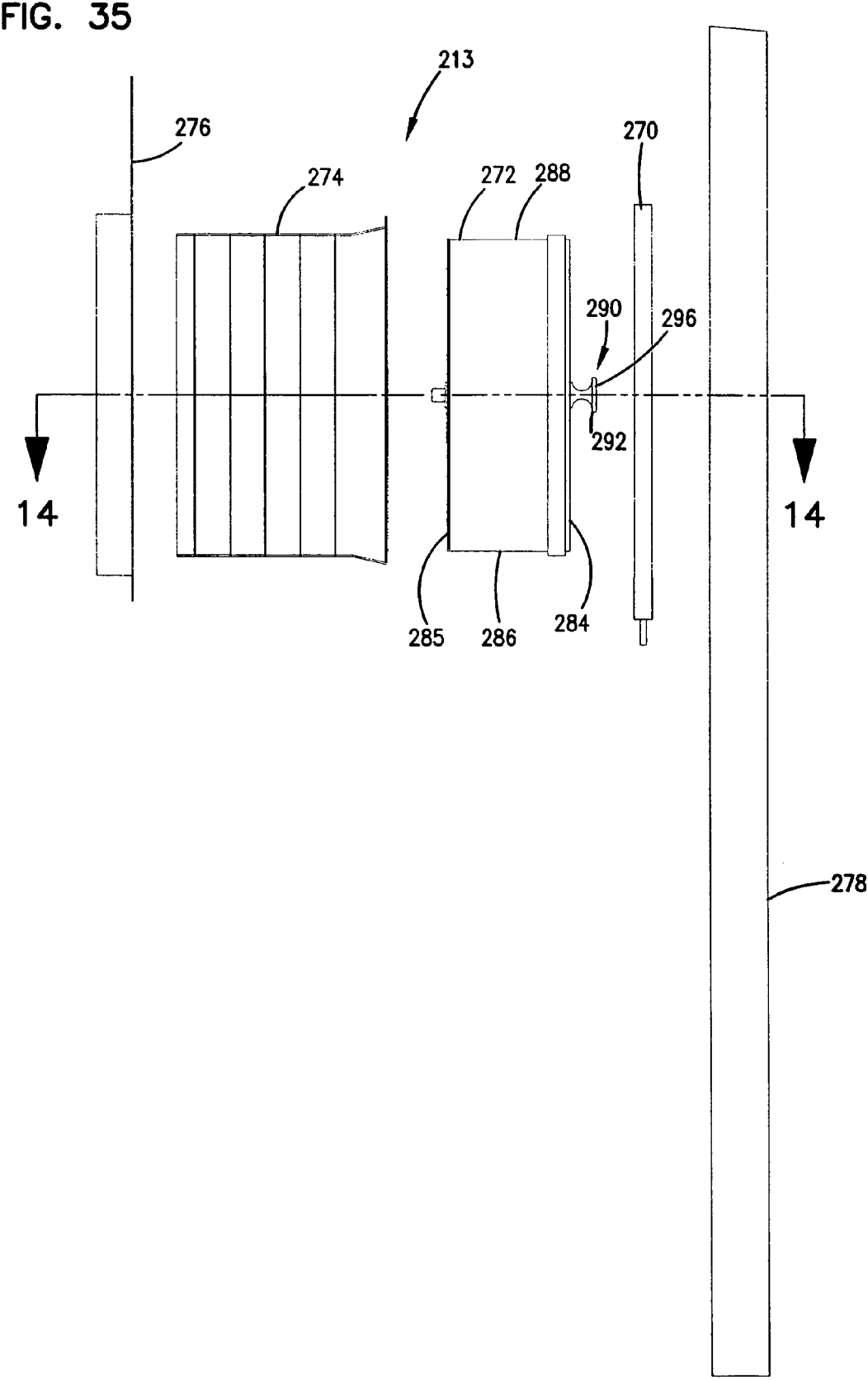
FIG. 35 is an exploded, side elevational view of the filter arrangement of FIG. 34, and in an unassembled state.
Figure 36:
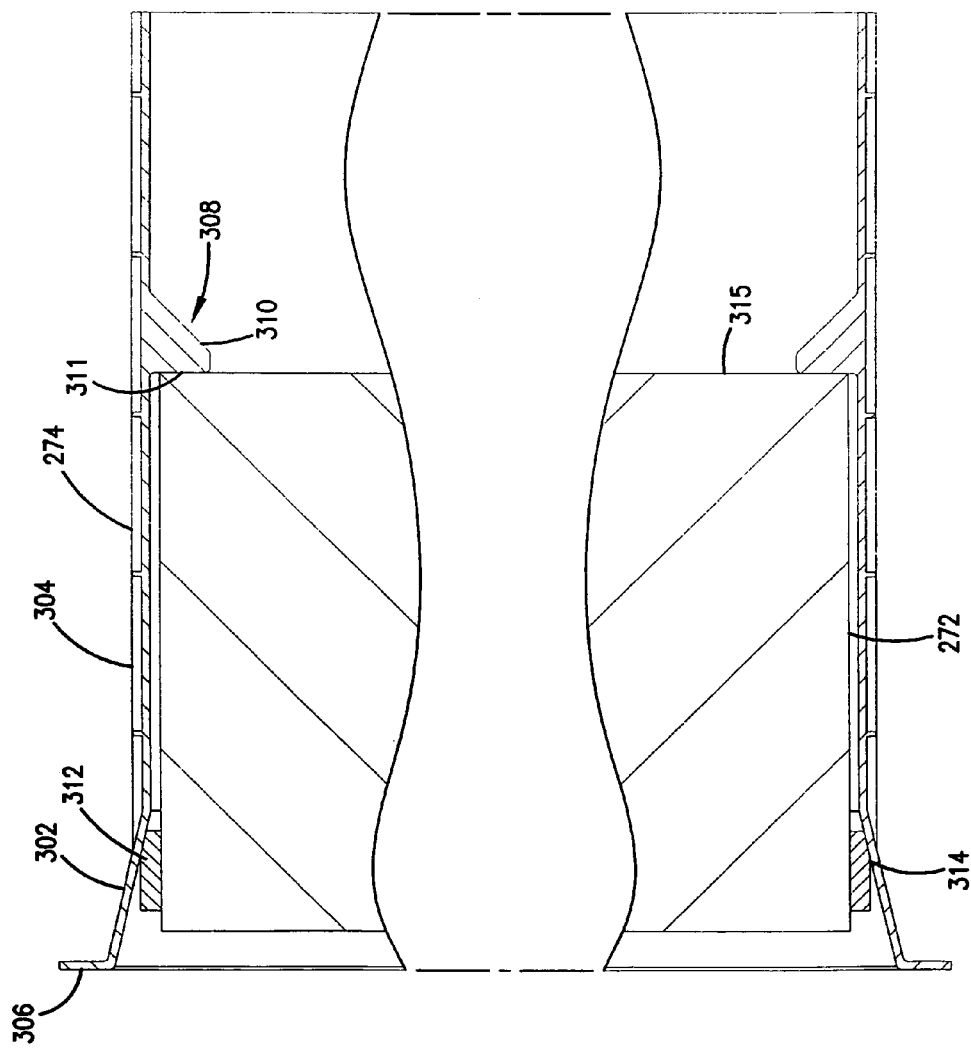
FIG. 36 is a fragmented, schematic, cross-sectional view showing the filter element sealed within a filter housing.

Another example of an air filter arrangement 213 usable in the system 304 or system 302 is shown in FIGS. 34–36. With the exception of preferred media formulations provided in Section H below, the air filter arrangement is described in commonly assigned U.S. patent application Ser. No. 09/593,257 filed Jun. 13, 2000, incorporated by reference herein.

Figure 14:
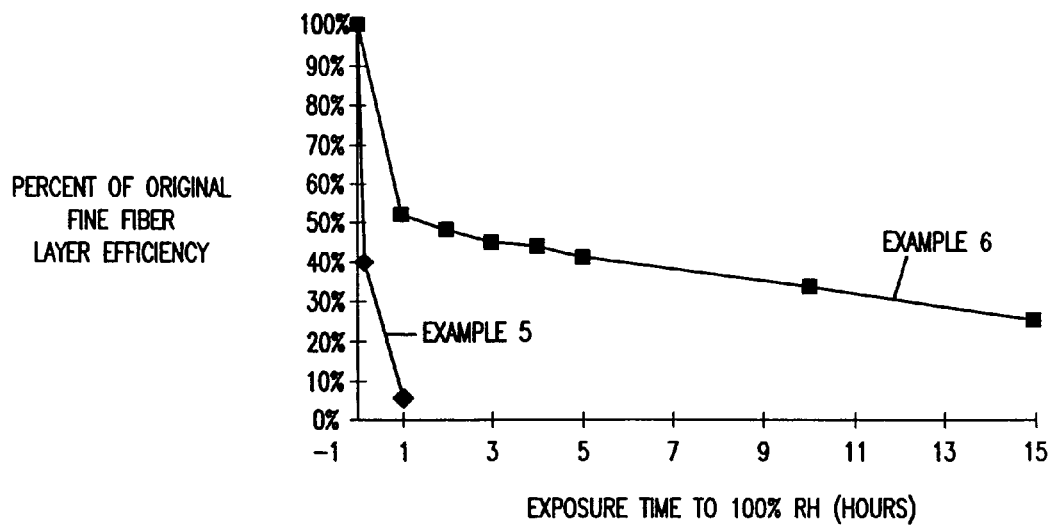
Figure 15:
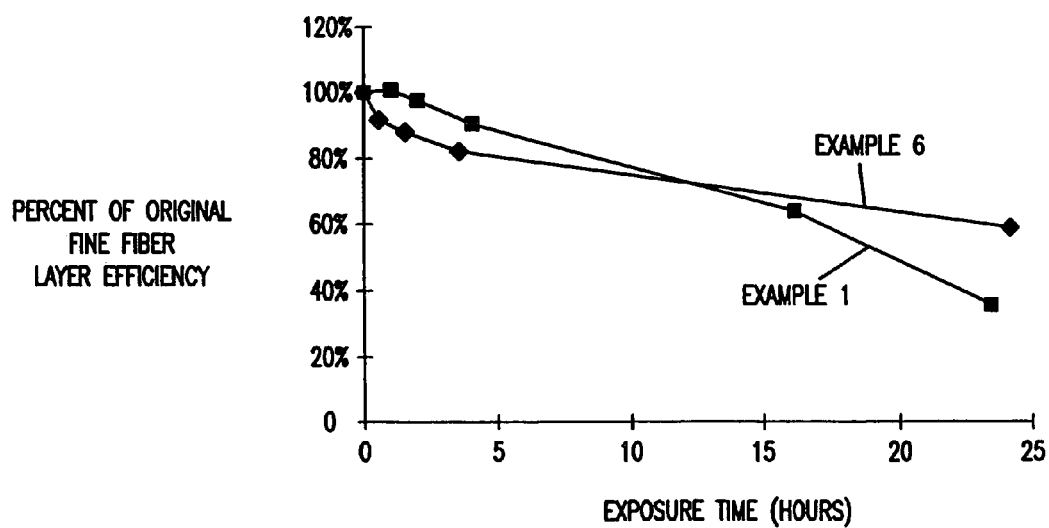

FIG. 35 illustrates the filter arrangement 213 in an exploded, unassembled form, while FIG. 14 illustrates the filter arrangement 213 assembled for use. In general, the air filter arrangement 213 includes a moisture separator 270, a filter assembly 272, and a filter housing 274. The filter housing 274 is typically secured within a tube sheet 276 when assembled for use. Preferably, the filter housing 274 is secured within the tube sheet 276 by welding the housing 274 to the tube sheet 276 or by bolting the housing 274 to the tube sheet 276.

An access door 278 provides access to the filter arrangement 213 when assembled and allows air to be drawn into the system 302. In general, the access door 278 is designed and constructed to fit the particular housing of the system, such as the system 302, of FIG. 33, it is to be installed in and to provide access to the filter arrangement 213, when assembled. The access door 278 is also designed and constructed to allow air to enter the system 210, FIG. 33.

The access door 278 preferably includes an air flow resistance arrangement 280. In general, the air flow resistance arrangement 280 directs air flow into the filter arrangement 213 in a particular direction to reduce resistance through the system 302. The air flow resistance arrangement 280 also aids in noise attenuation. In the embodiment depicted in FIG. 34, the air flow resistance arrangement is depicted as a plurality of louvers 282. The louvers 282 also aid in protecting the system 210 from entry of large objects and moisture into the system 302, FIG. 33. The louvers 282 further aid in noise attenuation.

Moisture in the incoming air stream can damage the integrity of the filter assembly 272, and damage, i.e. contribute to rusting, the internal mechanisms of the system 302. To address this, the filter arrangement includes moisture separator 270. In general, the moisture separator 270 separates and collects moisture from the incoming air stream prior to reaching the filter assembly 272. In one embodiment, the moisture separator 270 includes a plurality of flat screens, e.g., wire mesh.

In general, the filter assembly 272 removes contaminants from the incoming air stream 212, FIG. 33, prior to entry into the internal mechanisms of the system 302. Preferably, the filter assembly 272 is configured to permit straight through flow directly through the filter assembly 272, entering at an inlet face 284 and exiting at an oppositely disposed outlet face 285, wherein the direction of fluid flow entering the inlet face 284 is in the same direction of fluid flow exiting the outlet face 285.

The filter assembly 272 includes a media pack 286 formed from fluted media 288 rolled into a cylinder, as explained above in connection with FIGS. 22 and 23. The media 288 can be a polyester synthetic media, a media made from cellulose, or blends of these types of materials and treated with a coating or a layer of fine fiber. Preferred media formulations are given in Section H below.

The filter assembly 272 depicted includes a pull mechanism 290. The pull mechanism 290 is constructed to allow a user to easily remove the filter assembly 272 from the filter housing 274. In the one shown, the pull mechanism 290 includes a handle 292 and a retention mechanism 294 (FIG. 34). Typically, the handle 292 is a knob 296. In the one shown in FIG. 34, the retention mechanism 294 includes a bolt 298 attached to the knob 296 and a nut 299 at the other end of the bolt. Alternatively, the pull mechanism and the core of the filter media could be one integrated unit.

Figure 16:
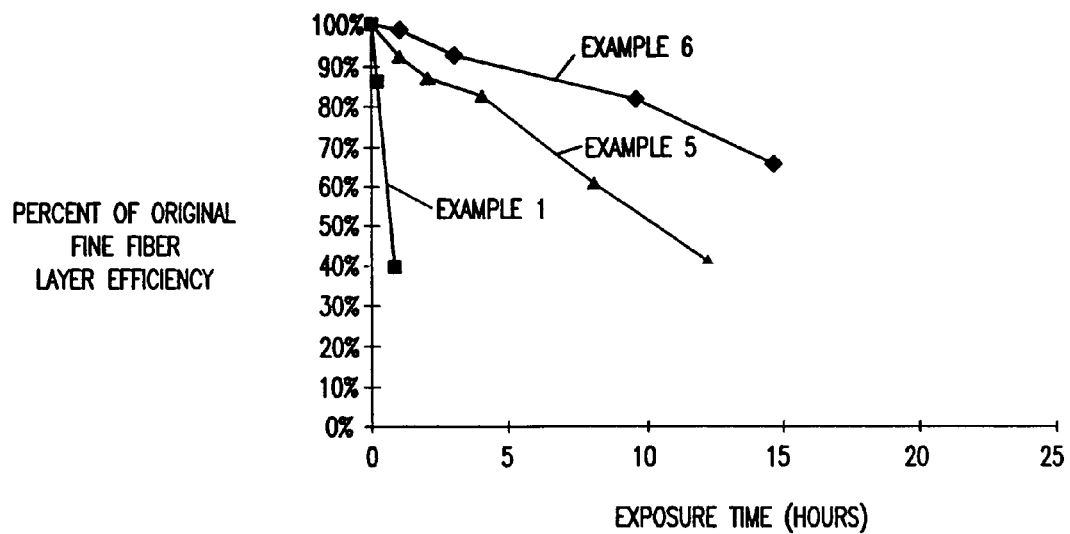
Figure 17:
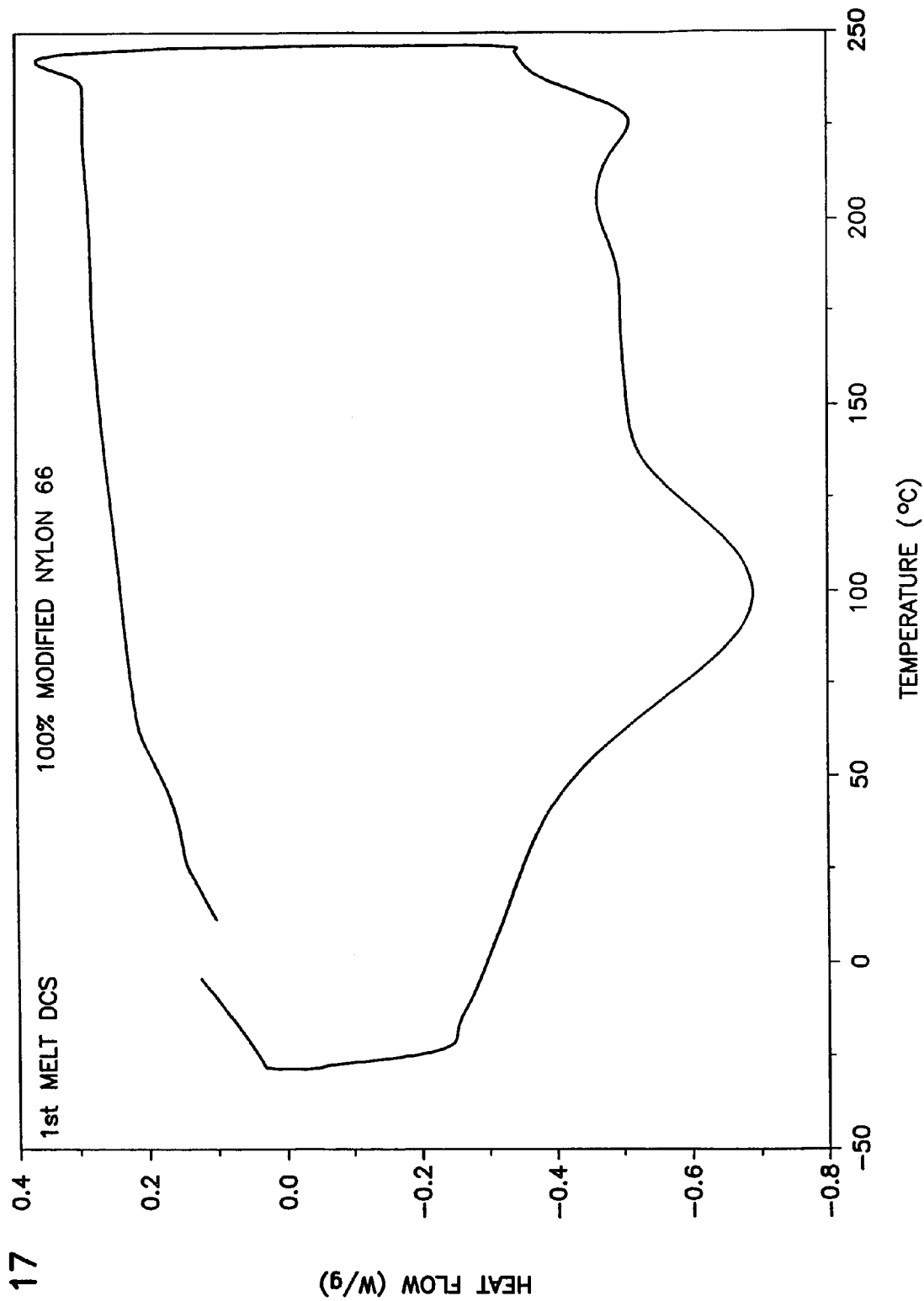
FIGS. 17 through 20 demonstrate that the blend of two copolymers, a nylon homopolymer and a nylon copolymer, once heat treated and combined with additives form a single component material that does not display distinguishable characteristics of two separate polymer materials, but appears to be a crosslinked or otherwise chemically joined single phase.
Figure 18:
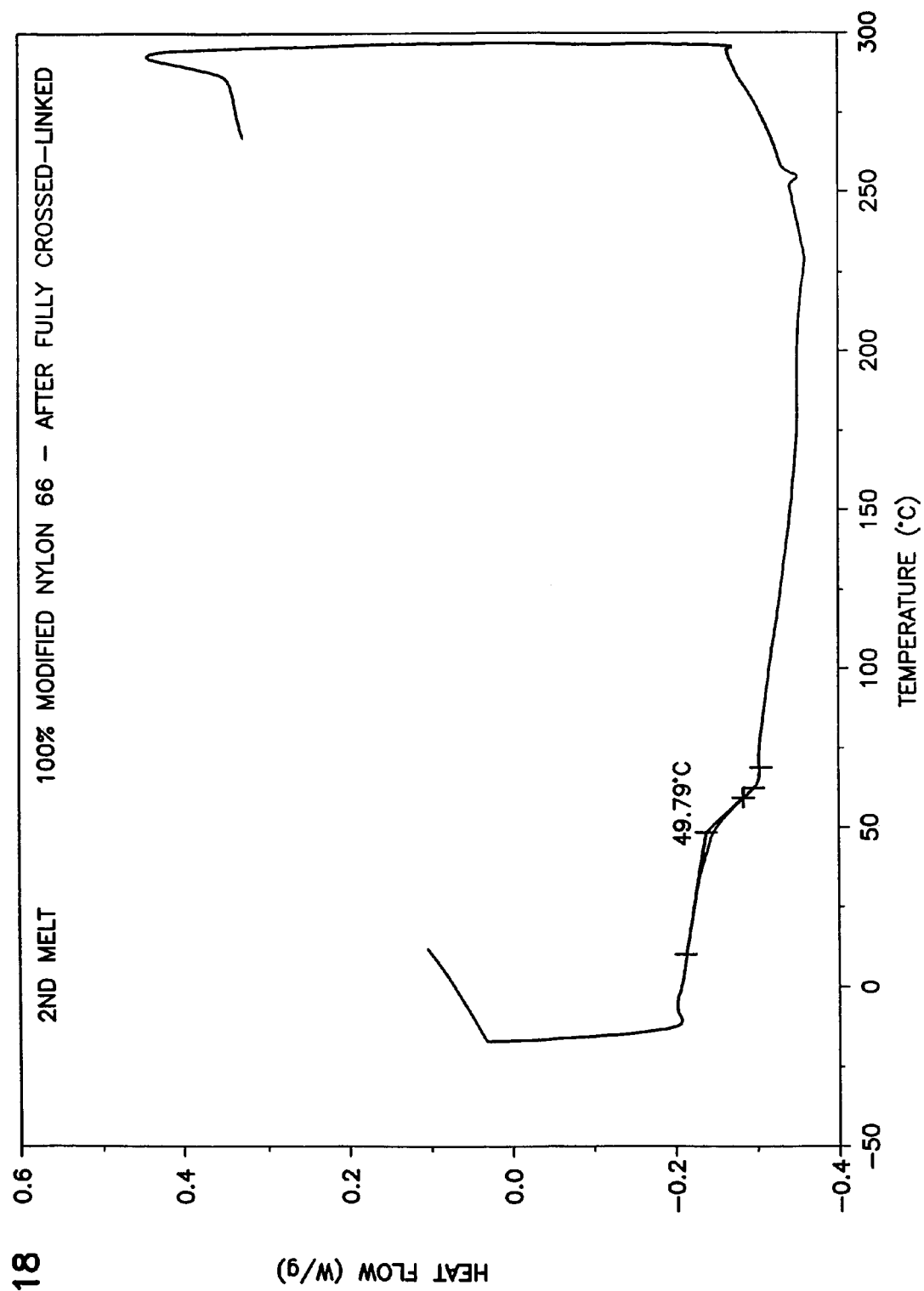
Figure 19:
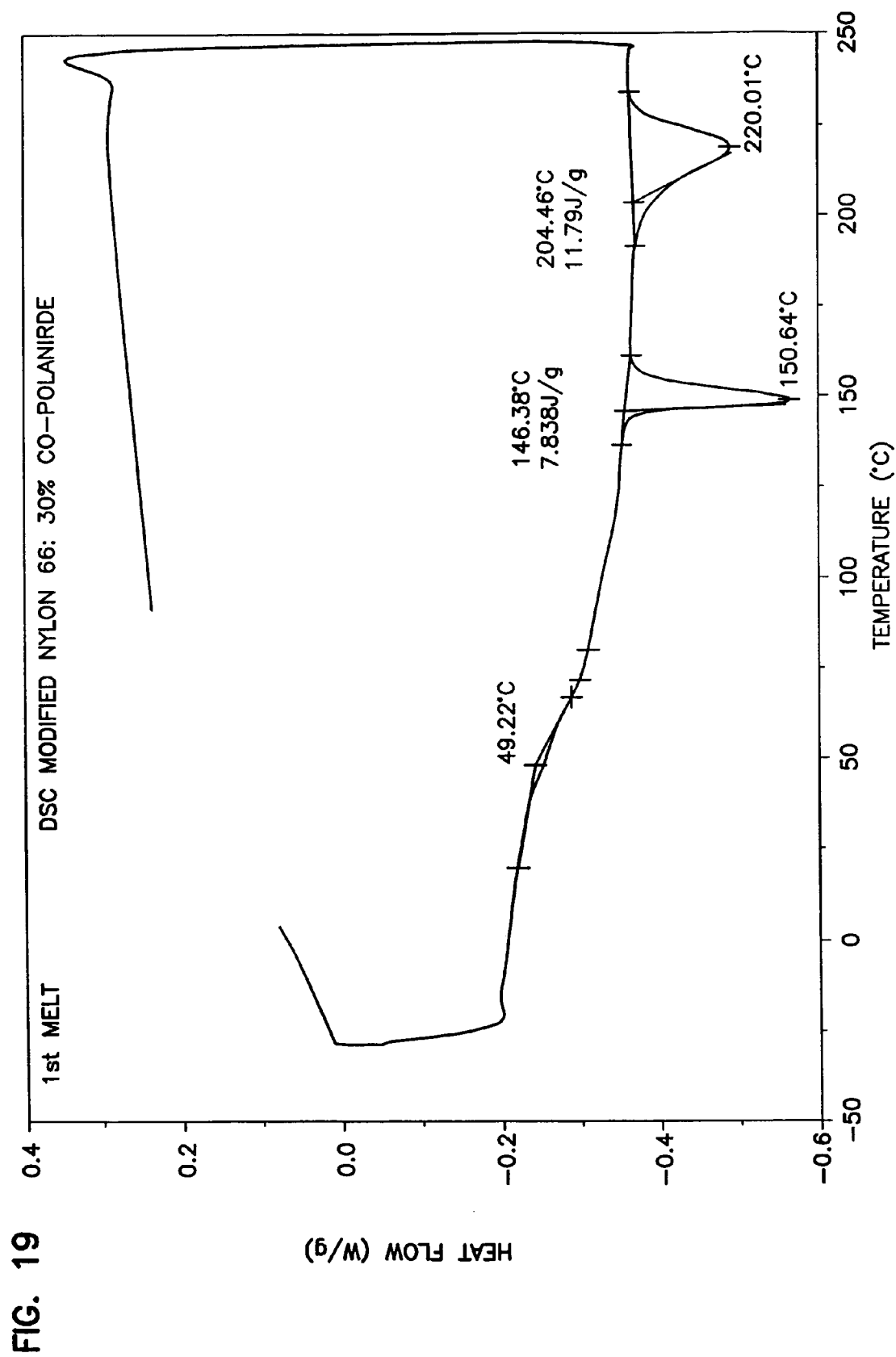
Figure 20:
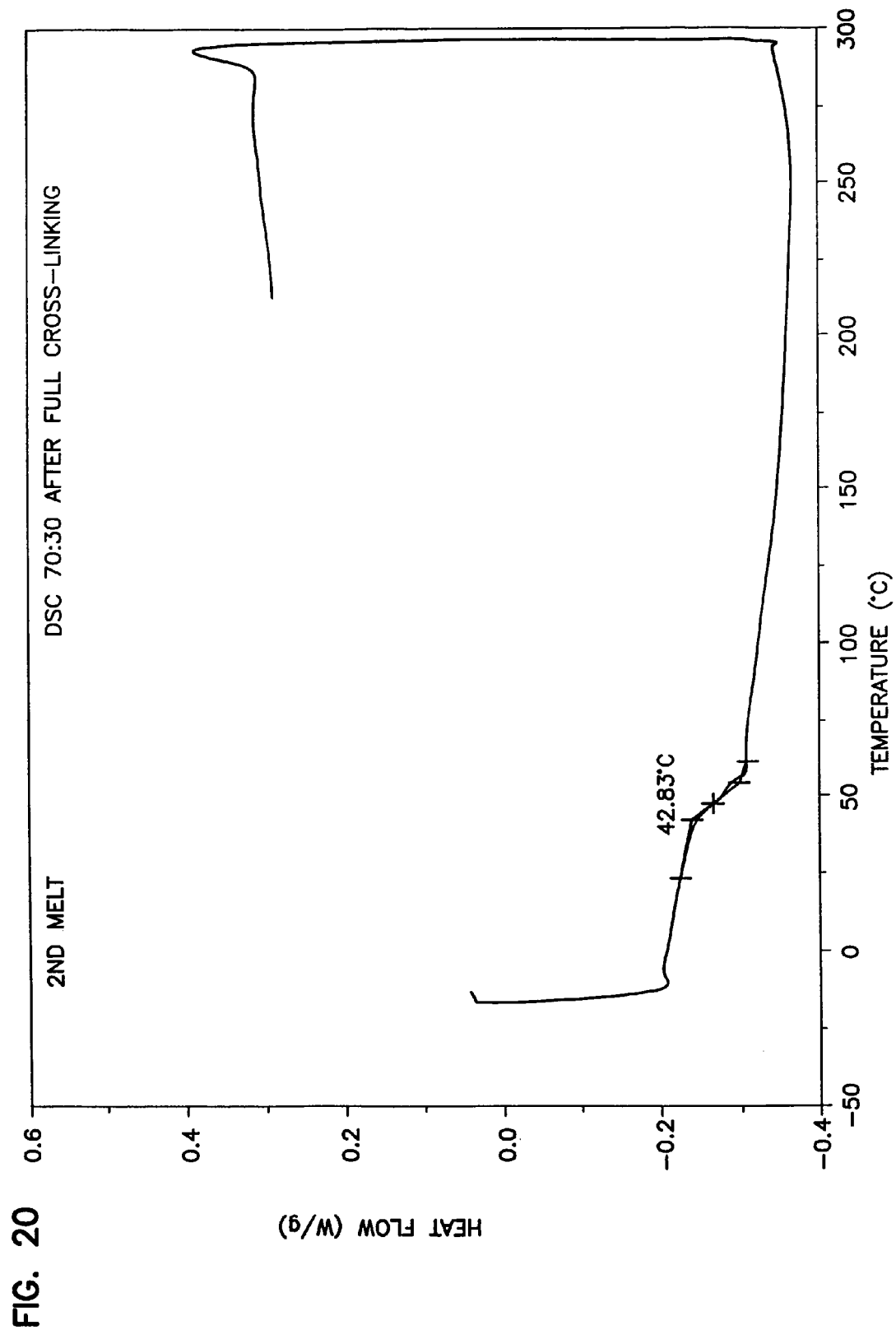

In general, the filter housing 274 is constructed to receive and hold the filter assembly 272 and to facilitate sealing with the filter assembly 272. In the one shown in FIG. 16, the filter housing 274 includes a transition area 302 angled from an outer wall 304 at an angle of at least 10 degrees, preferably between 10 and 210 degrees, and most preferably about 15 degrees. The transition area 302 aids in sealing the filter assembly 272 as will be explained in more detail below.

The filter housing 274 further includes a mounting flange 306. The mounting flange 306 secures the filter housing 274 to the tube sheet 276 through a fastener arrangement (e.g., bolts). The housing 274 also includes a stopping arrangement 308. The stopping arrangement 308 seats the filter assembly 272 within the housing 274 to prevent the filter assembly 272 from being pushed too far into the housing 274. The stopping arrangement 308 also helps in ensuring a proper seal between the filter assembly 272 and the housing 274.

The stopping arrangement 308 includes a stop 310. Preferably, the stop 310 projects from the outer wall 304 a distance sufficient to prevent the filter assembly 272 from bypassing the stop 310. During use, the filter assembly 272 rests upon a top surface 311 of the stop 310.

The filter assembly 272 also includes a sealing gasket 312. The sealing gasket 312 seals the filter assembly 272 in the filter housing 274, inhibiting air from entering the system 302 between the filter assembly 272 and the filter housing 274 and bypassing the filter assembly 272. This ensures that the air stream goes substantially through the filter assembly 272. In the one illustrated, the sealing gasket 312 extends circumferentially around the radial edge of the filter assembly 272. In one embodiment, the sealing gasket 312 comprises closed cell foam; of course, the sealing gasket 312 can comprise other suitable material.

During use, the sealing gasket 312 seals a joint 314 between the filter assembly 272 and the filter housing 274. During installation, the filter assembly 272 is inserted into the housing 274 until an end 315 rests against the stop 310. As the filter assembly 272 is installed, the sealing gasket 312 is compressed in the transition area 302 between the filter assembly 272 and the housing 274, sealing the joint 314.

During assembly, the filter housing 274 is slid into the tube sheet 276 until the mounting flange 306 of the filter housing 274 is seated against the tube sheet 276. Next, the filter assembly 272 is seated within the filter housing 274. The filter assembly 272 is slid into the filter housing 274 until the end 315 of the filter assembly 272 rests against the stop 310. The sealing gasket 312 is partially compressed and the filter assembly 272 is snugly held with the filter housing 274.

In operation, the filter arrangement 213 is used as follows: Air to be filtered in the system 302 is directed at arrows 212 into the intake system 211. The air flows through the filter assembly 272. The air enters at the inlet face 284, passes through the fluted construction 288, and exits through the outlet face 285. From there, the air is taken into the turbine or generator 215.

G. Typical System; Fuel Cell Air Intake

Figure 37:
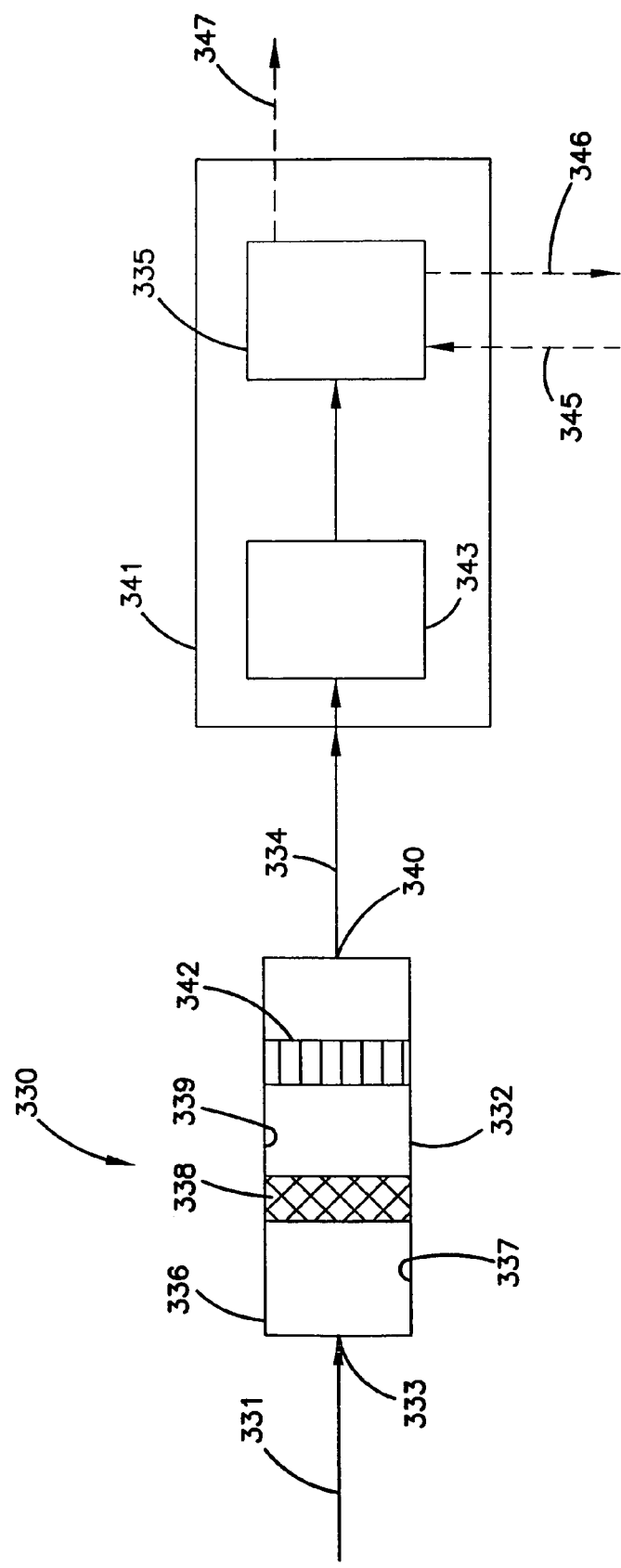
FIG. 37 is a schematic view of an air intake for a fuel cell system, which may utilize filter elements disclosed herein.

A fuel cell air intake is shown schematically in FIG. 37 at 330. As depicted in FIG. 37, atmospheric or ambient air 331 enters filter assembly 332 via an inlet 333. Prior to entering filter assembly 332, atmospheric air 331 is dirty air having various physical (e.g., particulate) and chemical contaminants. Filter assembly 332 is constructed to remove various contaminants from the dirty air to provide clean air 334 that exits from filter assembly 332. Clean air 334 is the intake air for a fuel cell 335, used to generate power.

Referring still to FIG. 37, atmospheric air 331 enters filter assembly 332 as dirty air through inlet 333 in housing 336 and progresses to dirty air side 337 of filter element 338. As the air passes through filter element 338 to clean air side 339, contaminants are removed by filter element 338 to provide filtered air 334. Filtered air 334 exits filter assembly 332 through outlet 340 of housing 336 and is used by equipment 341.

Filter assembly 332 also optionally includes a noise suppression element 342 to reduce or suppress the level of noise or sound emanating from equipment 341. Suppression element 342 may be positioned within housing 336, and in some embodiments, suppression element 342 is defined by housing 336.

Equipment 341 includes a compressor 343 that provides air to fuel cell 335 to use in its catalytic reaction. Compressor 343 emits noise, typically in the range of 3 Hertz to 30,000 Hertz, sometimes as high as 50,000 Hertz, at a level of 85 to 110 dB at one meter. Suppression element 342, reduces the level of sound traveling upstream from compressor 343 by at least 3 dB, typically by at least 6 dB, and preferably by at least 25 dB.

The fuel cell 335 takes in hydrogen fuel 345, emits a by-product of water and carbon dioxide 346, and generates power 347. In general, fuel cells are devices consisting of two electrodes (an anode and a cathode) that sandwich an electrolyte. A fuel containing hydrogen flows to the anode, where the hydrogen electrons are freed, leaving positively charged ions. The electrons travel through an external circuit in which the ions diffuse through the electrolyte. At the cathode, the electrons combine with the hydrogen ions and oxygen to form water and carbon dioxide, by-products. A common oxygen source is air. To speed the cathodic reaction, a catalyst is often used. Examples of catalysts often used in the fuel cell reaction include nickel, platinum, palladium, cobalt, cesium, neodymium, and other rare earth metals. The reactants in the fuel cell are the hydrogen fuel and an oxidizer.

Typically, "low temperature fuel cells" operate at temperatures, typically about 70 to 100° C., sometimes as high as 200° C. High temperature fuel cells are typically not as sensitive to chemical contamination due to their higher operating temperature. High temperature fuel cells are, however, sensitive to particulate contamination, and some forms of chemical contamination, and thus high temperature fuel cells benefit from the filtering features as described herein. One type of low temperature fuel cell is commonly referred to as a "PEM", is named for its use of a proton exchange membrane. Examples of other various types of fuel cells that can be used in combination with the filter assembly of the present invention include, for example, U.S. Pat. Nos. 6,110,611; 6,117,579; 6,103,415; and 6,083,637, the disclosures of which are incorporated here by reference. Various fuel cells are commercially available from, for example, Ballard Power Systems, Inc. of Vancouver, Canada; International Fuel Cells, of Connecticut; Proton Energy Systems, Inc. of Rocky Hill, Conn.; American Fuel Cell Corp. of Massachusetts; Siemans A G of Erlangen, Germany; Energy Partners, L.C. of Florida; General Motors of Detroit, Mich.; and Toyota Motor Corporation of Japan.

The filter assemblies, as described below, remove contaminants from the atmospheric air before the air is used in the fuel cell operation. As explained below, constructing the filter assembly in the form of a composite of a barrier media and at least a single layer, and in some instances, multiple layers of "fine fiber" can enhance the performance (the operating efficiency, in particular) of the filter assembly. The fine fiber treatment is advantageous in improving filter efficiency in most filter geometry and environment. In certain harsh environments with a filter temperature over 120° F., which includes both low temperature and high temperature fuel cells the fine fiber can often survive and provide extended lifetime filtration.

H. Example Filter Arrangement for Fuel Cell Air Intake Systems

Figure 38:
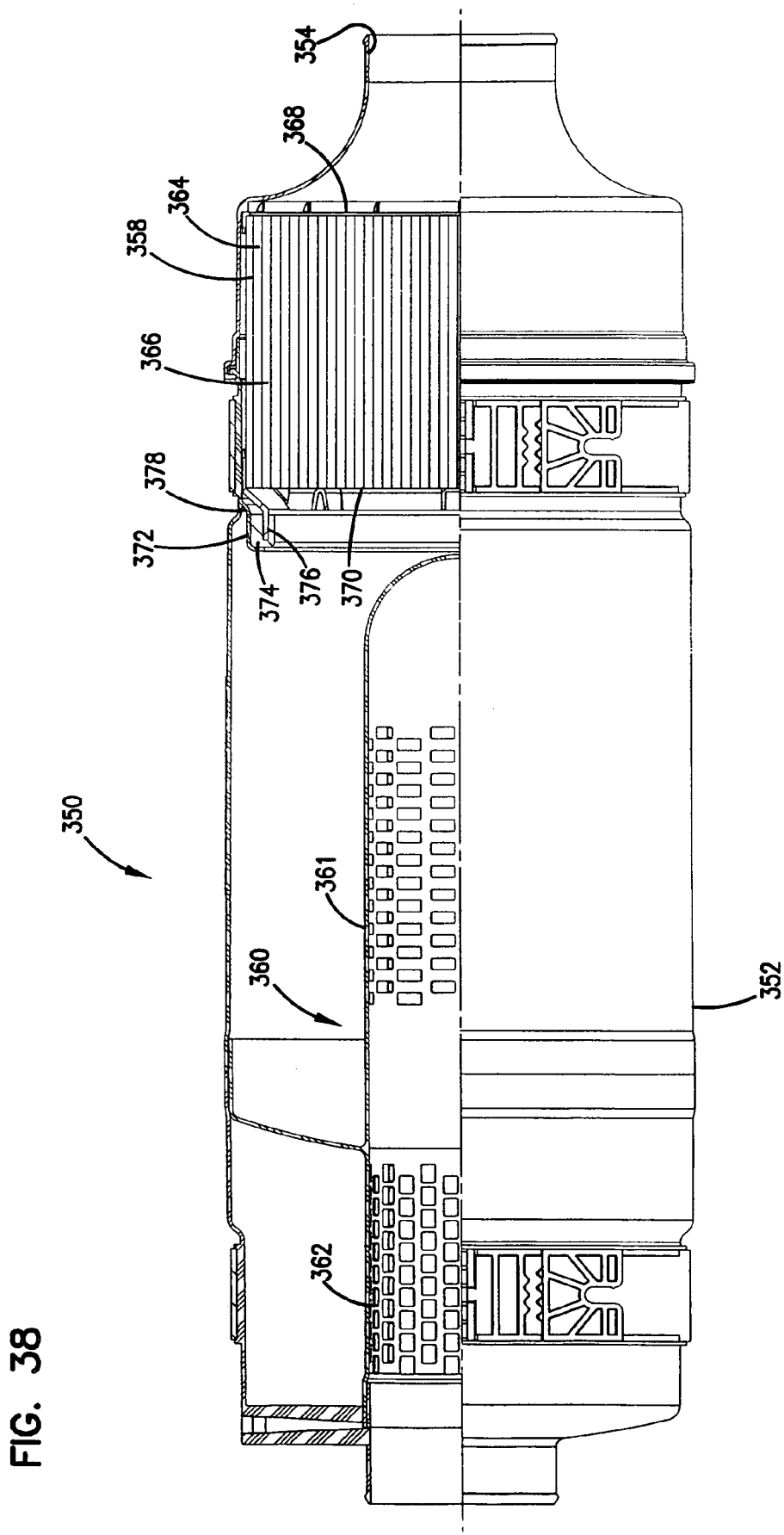
FIG. 38 is a schematic, cross-sectional view of a filter assembly that may be utilized in the fuel cell air intake system of FIG. 37.

FIG. 38 illustrates a filter assembly 350 usable in the system of FIG. 37. Filter assembly 350 includes a housing 352 which defines an inlet 354 and an outlet 356. Dirty air enters filter assembly 350 via inlet 354, and clean air exits via outlet 356.

Positioned within housing 352 is a filter element 358 and a noise suppression element 360. Suppression element 360 comprises a first resonator 361 and a second resonator 362.

First resonator 361 is configured to attenuate a peak of about 900 Hz, and second resonator 362 is configured to attenuate a peak of about 550 Hz.

Filter element 358 of FIG. 38 is generally constructed analogously as the filter element construction 40 (FIG. 22). As such, it includes a media pack 364 of fluted media 366 (as described with respect to FIG. 3) rolled into filter element 358.

When filter element 358 is used with inline-flow housing 352, the air will enter through inlet 354 of housing 352 in one direction, enter filter element 358 through first flow face 368 in the same direction, exit filter element 358 in the same direction from second flow face 370, and exit housing 352 through outlet 356 also in the same direction.

As with the embodiment of FIGS. 22 and 24, a radial seal 372 is formed by compression of the sealing gasket 374 between and against a frame 376 and an inner sealing surface 378 of the housing.

Filter assembly 350 preferably also includes a portion designed to remove contaminants from the atmosphere by either adsorption or absorption. As used herein, the terms "adsorb", "adsorption", "adsorbent" and the like, are intended to also include the mechanisms of absorption and adsorption.

The chemical removal portion typically includes a physisorbent or chemisorbent material, such as, for example, desiccants (i.e., materials that adsorb or absorb water or water vapor) or materials that adsorb or absorb volatile organic compounds and/or acid gases and/or basic gases. The terms "adsorbent material," "adsorption material," "adsorptive material," "absorbent material," "absorption material," "absorptive material," and any variations thereof, are intended to cover any material that removes chemical contaminants by adsorption or absorption. Suitable adsorbent materials include, for example, activated carbon, activated carbon fibers, impregnated carbon, activated alumina, molecular sieves, ion-exchange resins, ion-exchange fibers, silica gel, alumina, and silica. Any of these materials can be combined with, coated with, or impregnated with materials such as potassium permanganate, calcium carbonate, potassium carbonate, sodium carbonate, calcium sulfate, citric acid, or mixtures thereof. In some embodiments, the adsorbent material can be combined or impregnated with a second material.

The adsorbent material typically includes particulates or granulated material and can be present as granules, beads, fibers, fine powders, nanostructures, nanotubes, aerogels, or can be present as a coating on a base material such as a ceramic bead, monolithic structures, paper media, or metallic surface. Typically, the adsorbent materials, especially particulate or granulated materials, are provided as a bed of material.

Alternately, the adsorbent material can be shaped into a monolithic or unitary form, such as a large tablet, granule, bead, or pleatable or honeycomb structure that optionally can be further shaped. In at least some instances, the shaped adsorbent material substantially retains its shape during the normal or expected lifetime of the filter assembly. The shaped adsorbent material can be formed from a free-flowing particulate material combined with a solid or liquid binder that is then shaped into a non-free-flowing article. The shaped adsorbent material can be formed by, for example, a molding, a compression molding, or an extrusion process. Shaped adsorbent articles are taught, for example, in U.S. Pat. No. 5,189,092 (Koslow), and U.S. Pat. No. 5,331,037 (Koslow), which are incorporated herein by reference.

The binder used for providing shaped articles can be dry, that is, in powdered and/or granular form, or the binder can be a liquid, solvated, or dispersed binder. Certain binders, such as moisture curable urethanes and materials typically referred to as "hot melts", can be applied directly to the adsorbent material by a spray process. In some embodiments, a temporary liquid binder, including a solvent or dispersant which can be removed during the molding process, is used. Suitable binders include, for example, latex, microcrystalline cellulose, polyvinyl alcohol, ethylene-vinyl acetate, starch, carboxylmethyl cellulose, polyvinylpyrrolidone, dicalcium phosphate dihydrate, and sodium silicate. Preferably the composition of a shaped material includes at least about 70%, by weight, and typically not more than about 98%, by weight, adsorbent material. In some instances, the shaped adsorbent includes 85 to 95%, preferably, approximately 90%, by weight, adsorbent material. The shaped adsorbent typically includes not less than about 2%, by weight, binder and not more than about 30%, by weight, binder.

Another embodiment of a suitable adsorbent material for use in the chemical removal portion is an adsorbent material that includes a carrier. For example, a mesh or scrim can be used to hold the adsorbent material and binder. Polyester and other suitable materials can be used as the mesh or scrim. Typically, any carrier is not more than about 50% of the weight of the adsorbent material, and is more often about 20 to 40% of the total adsorbent weight. The amount of binder in the shaped adsorbed article with the carrier typically ranges about 10 to 50% of the total adsorbent weight and the amount of adsorbent material typically ranges about 20 to 60% of the total adsorbent weight.

The chemical removal portion can include strongly basic materials for the removal of acid contaminants from the air, or strongly acidic materials for the removal of basic contaminants from the air, or both. Preferably, the basic materials and acidic materials are removed from each other so that they do not cancel each other. In some embodiments, the adsorbent material itself may be the strongly acidic or strong basic material. Examples of such materials include materials such as polymer particulates, activated carbon media, zeolites, clays, silica gels, and metal oxides. In other embodiments, the strongly acidic materials and the strongly basic materials can be provided as surface coatings on carriers such as granular particulate, beads, fibers, fine powders, nanotubes, and aerogels. Alternately or additionally, the acidic and basic material that forms the acidic and basic surfaces may be present throughout at least a portion of the carrier; this can be done, for example, by coating or impregnating the carrier material with the acidic or basic material.

Both basic and acidic materials may be present in the chemical removal portion of the filter element; however, it is preferable that the two types of materials are spaced from each other so that they do not react with and neutralize one another. In some embodiments, the basic material, acidic material, or both, may be spaced from an adsorbent material, such as activated carbon.

Examples of acidic compounds that are often present in atmospheric air and are considered as contaminants for fuel cells include sulfur oxides, nitrogen oxides, hydrogen sulfide, hydrogen chloride, and volatile organic acids and nonvolatile organic acids. Examples of basic compounds that are often present in atmospheric air and are considered as contaminants for fuel cells include ammonia, amines, amides, sodium hydroxides, lithium hydroxides, potassium hydroxides, volatile organic bases and nonvolatile organic bases.

For PEM fuel cells, the cathodic reaction occurs under acidic conditions, thus, it is undesirable to have basic contaminants present. An example of a preferred material for removing basic contaminants, such as ammonia, is a bed of activated carbon granules impregnated with citric acid.

Figure 39:
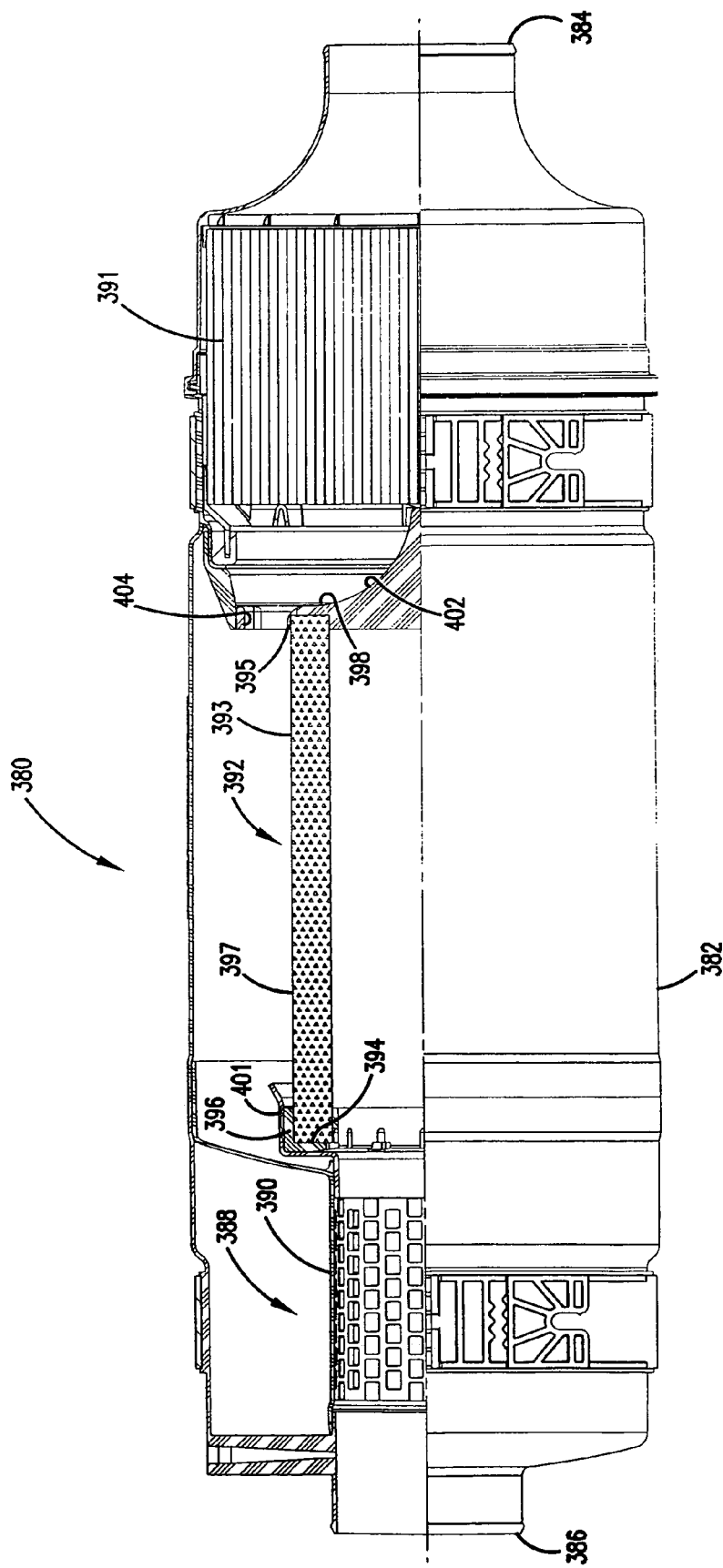
FIG. 39 is a schematic, cross-sectional view of another embodiment of a filter assembly that may be utilized in the air intake for a fuel cell system.

A second example of a filter assembly usable in the system of FIG. 37 is shown in fragmented cross-section in FIG. 39 as a filter assembly 380. Filter assembly 380 includes a housing 382 which defines an inlet 384 and an outlet 386. Dirty air enters filter assembly 380 via inlet 384, and clean air exits via outlet 386. Sound suppression element 388 comprises a resonator 390. A filter element 391 is mounted within the housing 382 and is analogous to filter element 358.

Filter assembly 380 also includes an adsorbent element 392. Adsorbent element 392 comprises a cylindrical mass of carbon 393 between ends 394,395. In the one depicted, mass of carbon 393 is a hollow, circular extension 397 of activated carbon held together by a thermoplastic binder. Carbon 393 can be produced, for example, by the teachings of U.S. Pat. No. 5,189,092 (Koslow), and U.S. Pat. No. 5,331,037 (Koslow). Positioned at first end 394 is a sealing system 396 and positioned at second end 395 is a cap 398.

Sealing system 396 provides an air-tight seal between adsorbent element 392 and baffle 401. Sealing system 396 is designed to seal adsorbent element 392 against baffle 401, and, under normal conditions, inhibit air from passing through a region between adsorbent element 392 and the sidewall of housing 382. Sealing system 396 inhibits air flow from avoiding passing through carbon 393 of adsorbent element 392. Sealing system 396 is typically made from a flexible, compressible material, such as polyurethane.

Cap 398 diverts air exiting filter element 358 so that it enters adsorbent element 392 through carbon 393 rather than passing axially through the cylindrical extension of carbon 393. Air from filter element 391 impinges on an exposed surface 402 of cap 398 and is rerouted from its "straight-line" flow to a flow having a radial component. Cap 398 includes apertures 404 therein for passage of air through cap 398 so that the air can reach carbon 393. In addition to managing air flow, cap 398 provides anchoring of absorbent element 392 to filter element 391.

Adsorbent element 392 functions both as a chemical removal portion and as an element of sound suppression element 388. Other arrangements of adsorbent elements and adsorbent materials may also have both a chemical removal quality and a sound suppression quality.

I. Preferred Media Construction for Filter Elements Disclosed Above

A fine fiber filter structure includes a bi-layer or multi-layer structure wherein the filter contains one or more fine fiber layers combined with or separated by one or more synthetic, cellulosic or blended webs. Another preferred motif is a structure including fine fiber in a matrix or blend of other fibers.

We believe important characteristics of the fiber and microfiber layers in the filter structure relate to temperature resistance, humidity or moisture resistance and solvent resistance, particularly when the microfiber is contacted with humidity, moisture or a solvent at elevated temperatures. Further, a second important property of the materials of the invention relates to the adhesion of the material to a substrate structure. The microfiber layer adhesion is an important characteristic of the filter material such that the material can be manufactured without delaminating the microfiber layer from the substrate, the microfiber layer plus substrate can be processed into a filter structure including pleats, rolled materials and other structures without significant delamination. We have found that the heating step of the manufacturing process wherein the temperature is raised to a temperature at or near but just below melt temperature of one polymer material, typically lower than the lowest melt temperature substantially improves the adhesion of the fibers to each other and the substrate. At or above the melt temperature, the fine fiber can lose its fibrous structure. It is also critical to control heating rate. If the fiber is exposed to its crystallization temperature for extended period of time, it is also possible to lose fibrous structure. Careful heat treatment also improved polymer properties that result from the formation of the exterior additive layers as additive materials migrate to the surface and expose hydrophobic or oleophobic groups on the fiber surface.

The criteria for performance is that the material be capable of surviving intact various operating temperatures, i.e. a temperature of 140° F., 160° F., 270° F., 300° F. for a period of time of 1 hour or 3 hours, depending on end use, while retaining 30%, 50%, 80% or 90% of filter efficiency. An alternative criteria for performances that the material is capable of surviving intact at various operating temperatures, i.e. temperatures of 140° F., 160° F., 270° F., 300° F., for a period of time of 1 hours or 3 hours depending on end use, while retaining, depending on end use, 30%, 50%, 80% or 90% of effective fine fibers in a filter layer. Survival at these temperatures is important at low humidity, high humidity, and in water saturated air. The microfiber and filter material of the invention are deemed moisture resistant where the material can survive immersion at a temperature of greater than 160° F. while maintaining efficiency for a time greater than about 5 minutes. Similarly, solvent resistance in the microfiber material and the filter material of the invention is obtained from a material that can survive contact with a solvent such as ethanol, a hydrocarbon, a hydraulic fluid, or an aromatic solvent for a period of time greater than about 5 minutes at 70° F. while maintaining 50% efficiency.

The fine fiber materials of the invention can be used in a variety of filter applications including pulse clean and non-pulse cleaned filters for dust collection, gas turbines and engine air intake or induction systems; gas turbine intake or induction systems, heavy duty engine intake or induction systems, light vehicle engine intake or induction systems; vehicle cabin air; off road vehicle cabin air, disk drive air, photocopier-toner removal; HVAC filters in both commercial or residential filtration applications. Paper filter elements are widely used forms of surface loading media. In general, paper elements comprise dense mats of cellulose, synthetic or other fibers oriented across a gas stream carrying particulate material. The paper is generally constructed to be permeable to the gas flow, and to also have a sufficiently fine pore size and appropriate porosity to inhibit the passage of particles greater than a selected size therethrough. As the gases (fluids) pass through the filter paper, the upstream side of the filter paper operates through diffusion and interception to capture and retain selected sized particles from the gas (fluid) stream. The particles are collected as a dust cake on the upstream side of the filter paper. In time, the dust cake also begins to operate as a filter, increasing efficiency. This is sometimes referred to as "seasoning," i.e. development of an efficiency greater than initial efficiency.

A simple filter design such as that described above is subject to at least two types of problems. First, a relatively simple flaw, i.e. rupture of the paper, results in failure of the system. Secondly, particulate material rapidly builds up on the upstream side of the filter, as a thin dust cake or layer, increasing the pressure drop. Various methods have been applied to increase the "lifetime" of surface-loaded filter systems, such as paper filters. One method is to provide the media in a pleated construction, so that the surface area of media encountered by the gas flow stream is increased relative to a flat, non-pleated construction. While this increases filter lifetime, it is still substantially limited. For this reason, surface loaded media has primarily found use in applications wherein relatively low velocities through the filter media are involved, generally not higher than about 20–30 feet per minute and typically on the order of about 10 feet per minute or less. The term "velocity" in this context is the average velocity through the media (i.e. flow volume per media area).

In general, as air flow velocity is increased through a pleated paper media, filter life is decreased by a factor proportional to the square of the velocity. Thus, when a pleated paper, surface loaded, filter system is used as a particulate filter for a system that requires substantial flows of air, a relatively large surface area for the filter media is needed. For example, a typical cylindrical pleated paper filter element of an over-the-highway diesel truck will be about 9–15 inches in diameter and about 12–24 inches long, with pleats about 1–2 inches deep. Thus, the filtering surface area of media (one side) is typically 30 to 300 square feet.

In many applications, especially those involving relatively high flow rates, an alternative type of filter media, sometimes generally referred to as "depth" media, is used. A typical depth media comprises a relatively thick tangle of fibrous material. Depth media is generally defined in terms of its porosity, density or percent solids content. For example, a 2–3% solidity media would be a depth media mat of fibers arranged such that approximately 2–3% of the overall volume comprises fibrous materials (solids), the remainder being air or gas space.

Another useful parameter for defining depth media is fiber diameter. If percent solidity is held constant, but fiber diameter (size) is reduced, pore size or interfiber space is reduced; i.e. the filter becomes more efficient and will more effectively trap smaller particles.

A typical conventional depth media filter is a deep, relatively constant (or uniform) density, media, i.e. a system in which the solidity of the depth media remains substantially constant throughout its thickness. By "substantially constant" in this context, it is meant that only relatively minor fluctuations in density, if any, are found throughout the depth of the media Such fluctuations, for example, may result from a slight compression of an outer engaged surface, by a container in which the filter media is positioned.

Gradient density depth media arrangements have been developed. some such arrangements are described, for example, in U.S. Pat. Nos. 4,082,476; 5,238,474; and 5,364,456. In general, a depth media arrangement can be designed to provide "loading" of particulate materials substantially throughout its volume or depth. Thus, such arrangements can be designed to load with a higher amount of particulate material, relative to surface loaded systems, when full filter lifetime is reached. However, in general the tradeoff for such arrangements has been efficiency, since, for substantial loading, a relatively low solidity media is desired. Gradient density systems such as those in the patents referred to above, have been designed to provide for substantial efficiency and longer life. In some instances, surface loading media is utilized as a "polish" filter in such arrangements.

A filter media construction according to the present invention includes a first layer of permeable coarse fibrous media or substrate having a first surface. A first layer of fine fiber media is secured to the first surface of the first layer of permeable coarse fibrous media. Preferably the first layer of permeable coarse fibrous material comprises fibers having an average diameter of at least 10 microns, typically and preferably about 12 (or 14) to 30 microns. Also preferably the first layer of permeable coarse fibrous material comprises a media having a basis weight of no greater than about 200 grams/meter$^2$, preferably about 0.50 to 150 g/m$^2$, and most preferably at least 8 g/m$^2$. Preferably the first layer of permeable coarse fibrous media is at least 0.0005 inch (12 microns) thick, and typically 0.0006 to 0.02 (15 to 500 microns) thick and preferably is about 0.001 to 0.030 inch (25–800 microns) thick.

In preferred arrangements, the first layer of permeable coarse fibrous material comprises a material which, if evaluated separately from a remainder of the construction by the Frazier permeability test, would exhibit a permeability of at least 1 meter(s)/min, and typically and preferably about 2–900 meters/min. Herein when reference is made to efficiency, unless otherwise specified, reference is meant to efficiency when measured according to ASTM-1215-89, with 0.78μ monodisperse polystyrene spherical particles, at 20 fpm (6.1 meters/min) as described herein.

Preferably the layer of fine fiber material secured to the first surface of the layer of permeable coarse fibrous media is a layer of nano- and microfiber media wherein the fibers have average fiber diameters of no greater than about 2 microns, generally and preferably no greater than about 1 micron, and typically and preferably have fiber diameters smaller than 0.5 micron and within the range of about 0.05 to 0.5 micron. Also, preferably the first layer of fine fiber material secured to the first surface of the first layer of permeable coarse fibrous material has an overall thickness that is no greater than about 30 microns, more preferably no more than 20 microns, most preferably no greater than about 10 microns, and typically and preferably that is within a thickness of about 1–8 times (and more preferably no more than 5 times) the fine fiber average diameter of the layer.

Certain preferred arrangements according to the present invention include filter media as generally defined, in an overall filter construction. Some preferred arrangements for such use comprise the media arranged in a cylindrical, pleated configuration with the pleats extending generally longitudinally, i.e. in the same direction as a longitudinal axis of the cylindrical pattern. For such arrangements, the media may be imbedded in end caps, as with conventional filters. Such arrangements may include upstream liners and downstream liners if desired, for typical conventional purposes.

In some applications, media according to the present invention may be used in conjunction with other types of media, for example conventional media, to improve overall filtering performance or lifetime. For example, media according to the present invention may be laminated to conventional media, be utilized in stack arrangements; or be incorporated (an integral feature) into media structures including one or more regions of conventional media. It may be used upstream of such media, for good load; and/or, it may be used downstream from conventional media, as a high efficiency polishing filter.

Certain arrangements according to the present invention may also be utilized in liquid filter systems, i.e. wherein the particulate material to be filtered is carried in a liquid. Also, certain arrangements according to the present invention may be used in mist collectors, for example arrangements for filtering fine mists from air.

According to the present invention, methods are provided for filtering. The methods generally involve utilization of media as described to advantage, for filtering. As will be seen from the descriptions and examples below, media according to the present invention can be specifically configured and constructed to provide relatively long life in relatively efficient systems, to advantage.

Various filter designs are shown in patents disclosing and claiming various aspects of filter structure and structures used with the filter materials. Engel et al., U.S. Pat. No. 4,720,292, disclose a radial seal design for a filter assembly having a generally cylindrical filter element design, the filter element being sealed by a relatively soft, rubber-like end cap having a cylindrical, radially inwardly facing surface. Kahlbaugh et al., U.S. Pat. No. 5,082,476, disclose a filter design using a depth media comprising a foam substrate with pleated components combined with the microfiber materials of the invention. Stifelman et al., U.S. Pat. No. 5,104,537, relate to a filter structure useful for filtering liquid media. Liquid is entrained into the filter housing, passes through the exterior of the filter into an interior annular core and then returns to active use in the structure. Such filters are highly useful for filtering hydraulic fluids. Engel et al., U.S. Pat. No. 5,613,992, show a typical diesel engine air intake filter structure. The structure obtains air from the external aspect of the housing that may or may not contain entrained moisture. The air passes through the filter while the moisture can pass to the bottom of the housing and can drain from the housing. Gillingham et al., U.S. Pat. No. 5,820,646, disclose a Z filter structure that uses a specific pleated filter design involving plugged passages that require a fluid stream to pass through at least one layer of filter media in a "Z" shaped path to obtain proper filtering performance. The filter media formed into the pleated Z shaped format can contain the fine fiber media of the invention. Glen et al., U.S. Pat. No. 5,853,442, disclose a bag house structure having filter elements that can contain the fine fiber structures of the invention. Berkhoel et al., U.S. Pat. No. 5,954,849, show a dust collector structure useful in processing typically air having large dust loads to filter dust from an air stream after processing a workpiece generates a significant dust load in an environmental air. Lastly, Gillingham, U.S. Design Pat. No. 425,189, discloses a panel filter using the Z filter design.

The following materials were produced using the following electrospin process conditions.

The following materials were spun using either a rotating emitter system or a capillary needle system. Both were found to produce substantially the same fibrous materials.

Using the device generally a fiber is made. The flow rate was 1.5 mil/min per emitter, a target distance of 8 inches, an emitter voltage of 88 kV, a relative humidity of 45%, and for the rotating emitter an rpm of 35.

EXAMPLE 1

Effect of Fiber Size

Figure 12:
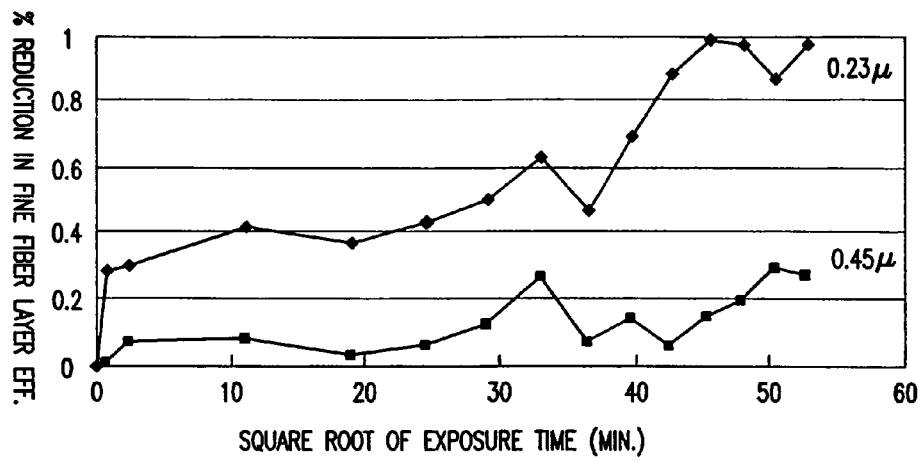
FIG. 12 shows the stability of the 0.23 and 0.45 microfiber material of the invention from Example 5.

Fine fiber samples were prepared from a copolymer of nylon 6, 66, 610 nylon copolymer resin (SVP-651) was analyzed for molecular weight by the end group titration. (J. E. Walz and G. B. Taylor, determination of the molecular weight of nylon, Anal. Chem. Vol. 19, Number 7, pp 448–450 (1947). Number average molecular weight was between 21,500 and 24,800. The composition was estimated by the phase diagram of melt temperature of three component nylon, nylon 6 about 45%, nylon 66 about 20% and nylon 610 about 25%. (Page 286, Nylon Plastics Handbook, Melvin Kohan ed. Hanser Publisher, New York (1995)). Reported physical properties of SVP 651 resin are:

| Property | ASTM Method | Units | Typical Value |
| --- | --- | --- | --- |
| Specific Gravity | D-792 | — | 1.08 |
| Water Absorption (24 hr immersion) | D-570 | % | 2.5 |
| Hardness | D-240 | Shore D | 65 |
| Melting Point | DSC | °C.(° F.) | 154 (309) |
| Tensile Strength @ Yield | D-638 | MPa (kpsi) | 50 (7.3) |
| Elongation at Break | D-638 | % | 350 |
| Flexural Modulus | D-790 | MPa (kpsi) | 180 (26) |
| Volume Resistivity | D-257 | ohm-cm | $10^{12}$ | to produce fiber of 0.23 and 0.45 micron in diameter. Samples were soaked in room temperature water, air-dried and its efficiency was measured. Bigger fiber takes longer time to degrade and the level of degradation was less as can be seen in the plot of FIG. 12. While wishing not to be limited by certain theory, it appears that smaller fibers with a higher surface/volume ratio are more susceptible to degradation due to environmental effects. However, bigger fibers do not make as efficient filter medium.

EXAMPLE 2

Cross-Linking of Nylon Fibers with Phenolic Resin and Epoxy Resin

In order to improve chemical resistance of fibers, chemical cross-linking of nylon fibers was attempted. Copolyamide (nylon 6, 66, 610) described earlier is mixed with phenolic resin, identified as Georgia Pacific 5137 and spun into fiber. Nylon:Phenolic Resin ratio and its melt temperature of blends are shown here;

| Composition | Melting Temperature (F. °) |
| --- | --- |
| Polyamide:Phenolic = 100:0 | 150 |
| Polyamide:Phenolic = 80:20 | 110 |
| Polyamide:Phenolic = 65:35 | 94 |
| Polyamide:Phenolic = 50:50 | 65 |

We were able to produce comparable fiber from the blends. The 50:50 blend could not be cross-linked via heat as the fibrous structure was destroyed. Heating 65:35 blend below 90 degree C. for 12 hours improves the chemical resistance of the resultant fibers to resist dissolution in alcohol. Blends of polyamide with epoxy resin, such Epon 828 from Shell and Epi-Rez 510 can be used.

EXAMPLE 3

Surface Modification Though Fluoro Additive (Scotchgard®) Repellant

Alcohol miscible Scotchgard® FC-430 and 431 from 3M Company were added to polyamide before spinning. Add-on amount was 10% of solids. Addition of Scotchgard did not hinder fiber formation. THC bench shows that Scotchgard-like high molecular weight repellant finish did not improve water resistance. Scotchgard added samples were heated at 300° F. for 10 minutes as suggested by manufacturer.

EXAMPLE 4

Modification with Coupling Agents

Polymeric films were cast from polyamides with tinanate coupling agents from Kenrich Petrochemicals, Inc. They include isopropyl triisostearoyl titanate (KR TTS), neopentyl (diallyl) oxytri (dioctyl) phosphato titanate (LICA12), neopentyl (dially) oxy, tri (N-ethylene diamino) ethyl zirconate (NZ44). Cast films were soaked in boiling water. Control sample without coupling agent loses its strength immediately, while coupling agent added samples maintained its form for up to ten minutes. These coupling agents added samples were spun into fiber (0.2 micron fiber).

EXAMPLE 5

Modification with Low Molecular Weight p-tert-butyl phenol Polymer

Oligomers of para-tert-butyl phenol, molecular weight range 400 to 1100, was purchased from Enzymol International, Columbus, Ohio. These low molecular weight polymers are soluble in low alcohols, such as ethanol, isopropanol and butanol. These polymers were added to co-polyamide described earlier and electrospun into 0.2 micron fibers without adverse consequences. Some polymers and additives hinder the electrospinning process. Unlike the conventional phenolic resin described in Example 2, we have found that this group of polymers does not interfere with fiber forming process.

We have found that this group of additive protects fine fibers from wet environment as see in the plot. FIGS. 13–16 show that oligomers provide a very good protection at 140° F., 100% humidity and the performance is not very good at 160° F. We have added this additive between 5% and 15% of polymer used. We have found that they are equally effective protecting fibers from exposure to high humidity at 140° F. We have also found out that performance is enhanced when the fibers are subjected to 150° C. for short period of time.

The table 1 shows the effect of temperature and time exposure of 10% add-on to polyamide fibers.

TABLE 1

| | Efficiency Retained (%) After 140 deg. F. Soak: | | |
| --- | --- | --- | --- |
| | Heating Time | | |
| | 1 min | 3 min | 10 min |
| Temperature | | | |
| 150 C. ° | 98.9 | 98.8 | 98.5 |
| | 98.8 | 98.9 | 98.8 |
| 130 C. ° | 95.4 | 98.7 | 99.8 |
| | 96.7 | 98.6 | 99.6 |
| 110 C. ° | 82.8 | 90.5 | 91.7 |
| | 86.2 | 90.9 | 85.7 |

This was a surprising result. We saw dramatic improvement in water resistance with this family of additives. In order to understand how this group of additive works, we have analyzed the fine fiber mat with surface analysis techniques called ESCA. 10% add-on samples shown in Table 1 were analyzed with ESCA at the University of Minnesota with the results shown in Table 2.

TABLE 2

Surface Composition (Polymer:Additive Ratio)

| | Heating Time | | |
|---|---|---|---|
| | 1 min | 3 min | 10 min |
| Temperature | | | |
| 150 C. °. | 40:60 | 40:60 | 50:50 |
| 130 C. °. | 60:40 | 56:44 | 62:82 |
| 110 C. °. | 63:37 | 64:36 | 59:41 |
| No Heat | 77:23 | | |

Initially, it did not seem to make sense to find surface concentration of additive more than twice of bulk concentration. However, we believe that this can be explained by the molecular weight of the additives. Molecular weight of the additive of about 600 is much smaller than that of host fiber forming polymer. As they are smaller in size, they can move along evaporating solvent molecules. Thus, we achieve higher surface concentration of additives. Further treatment increases the surface concentration of the protective additive. However, at 10 min exposure, 150° C., did not increase concentration. This may be an indication that mixing of two components of copolyamide and oligomer molecules is happening as long chain polymer has a time to move around. What this analysis has taught us is that proper selection of post treatment time and temperature can enhance performance, while too long exposure could have a negative influence.

We further examined the surface of these additive laden microfibers using techniques called Time of Flight SIMS. This technique involves bombarding the subject with electrons and observes what is coming from the surface. The samples without additives show organic nitrogen species are coming off upon bombardment with electron. This is an indication that polyamide species are broken off. It also shows presence of small quantity of impurities, such as sodium and silicone. Samples with additive without heat treatment (23% additive concentration on surface) show a dominant species of t-butyl fragment, and small but unambiguous peaks observed peaks observed for the polyamides. Also observed are high mass peaks with mass differences of 148 amu, corresponding to t-butyl phenol. For the sample treated at 10 min at 150° C. (50% surface additive concentration by ESCA analysis), inspection shows dominance of t-butyl fragments and trace, if at all, of peaks for polyamide. It does not show peaks associated with whole t-butyl phenol and its polymers. It also shows a peak associated with $C_2H_3O$ fragments.

The ToF SIMS analysis shows us that bare polyamide fibers will give off broken nitrogen fragment from exposed polymer chain and contaminants on the surface with ion bombardment. Additive without heat treatment shows incomplete coverage, indicating that additives do not cover portions of surface. The t-butyl oligomers are loosely organized on the surface. When ion beam hits the surface, whole molecules can come off along with labile t-butyl fragment. Additive with heat treatment promotes complete coverage on the surface. In addition, the molecules are tightly arranged so that only labile fragments such as t-butyl-, and possibly CH=CH—OH, are coming off and the whole molecules of t-butyl phenol are not coming off. ESCA and ToF SIMS look at different depths of surface. ESCA looks at deeper surface up to 100 Angstrom while ToF SIMS only looks at 10-Angstrom depth. These analyses agree.

EXAMPLE 6

Development of Surface Coated Interpolymer

Type 8 Nylon was originally developed to prepare soluble and crosslinkable resin for coating and adhesive application. This type of polymer is made by the reaction of polyamide 66 with formaldehyde and alcohol in the presence of acid. (Ref. Cairns, T. L.; Foster, H. D.; Larcher, A. W.; Schneider, A. K.; Schreiber, R. S. J. Am. Chem. Soc. 1949, 71, 651). This type of polymer can be electrospun and can be crosslinked. However, formation of fiber from this polymer is inferior to copolyamides and crosslinking can be tricky.

In order to prepare type 8 nylon, 10-gallon high-pressure reactor was charged with the following ratio:

| | |
|---|---|
| Nylon 66 (duPont Zytel 101) | 10 pounds |
| Methanol | 15.1 pounds |
| Water | 2.0 pounds |
| Formaldehyde | 12.0 pounds |

The reactor is then flushed with nitrogen and is heated to at least 135° C. under pressure. When the desired temperature was reached, small quantity of acid was added as catalyst. Acidic catalysts include trifluoroacetic acid, formic acid, toluene sulfonic acid, maleic acid, maleic anhydride, phthalic acid, phthalic anhydride, phosphoric acid, citric acid and mixtures thereof. Nafion® polymer can also be used as a catalyst. After addition of catalyst, reaction proceeds up to 30 minutes. Viscous homogeneous polymer solution is formed at this stage. After the specified reaction time, the content of the high pressure vessel is transferred to a bath containing methanol, water and base, like ammonium hydroxide or sodium hydroxide to shortstop the reaction. After the solution is sufficiently quenched, the solution is precipitated in deionized water. Fluffy granules of polymer are formed. Polymer granules are then centrifuged and vacuum dried. This polymer is soluble in, methanol, ethanol, propanol, butanol and their mixtures with water of varying proportion. They are also soluble in blends of different alcohols.

Figure 13:
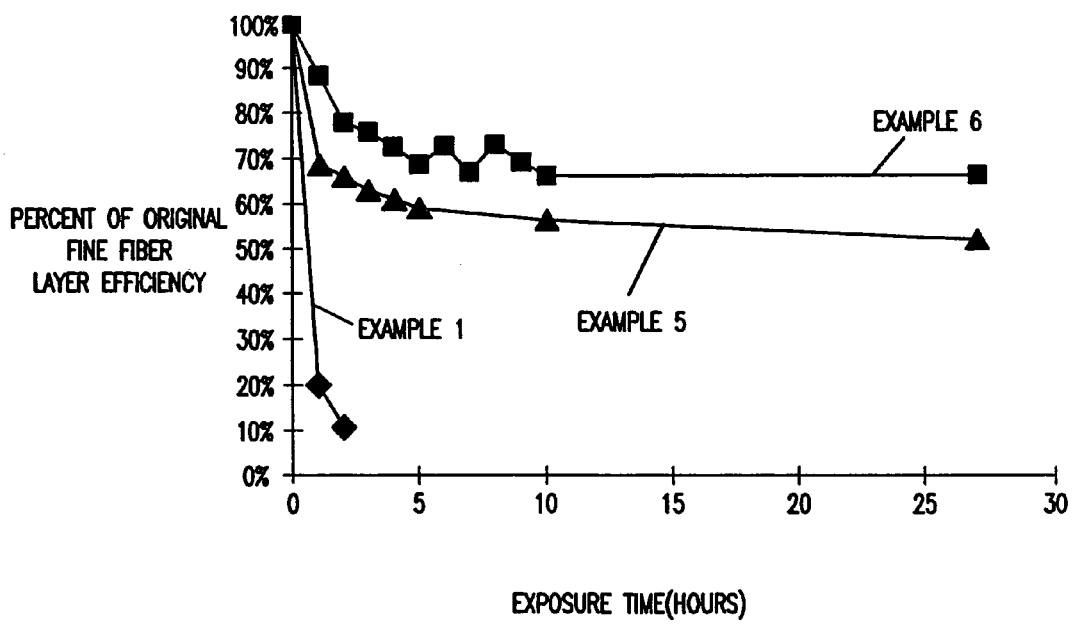
FIGS. 13 through 16 show the improved temperature and humidity stability of the materials of Examples 5 and 6 when compared to unmodified nylon copolymer solvent soluble polyamide.

Thus formed alkoxy alkyl modified type 8 polyamide is dissolved in ethanol/water mixture. Polymer solution is electrospun in a manner described in Barris U.S. Pat. No. 4,650,516. Polymer solution viscosity tends to increase with time. It is generally known that polymer viscosity has a great influence in determining fiber sizes. Thus, it is difficult to control the process in commercial scale, continuous production. Furthermore, under same conditions, type 8 polyamides do not form microfibers as efficiently as copolyamides. However, when the solution is prepared with addition of acidic catalyst, such as toluene sulfonic acid, maleic anhydride, trifluoro methane sulfonic acid, citric acid, ascorbic acid and the like, and fiber mats are carefully heat-treated after fiber formation, the resultant fiber has a very good chemical resistance. (FIG. 13). Care must be taken during the crosslinking stage, so that one does not destroy fibrous structure.

We have found a surprising result when type 8 polyamide (polymer B) is blended with alcohol soluble copolyamides. By replacing 30% by weight of alkoxy alkyl modified polyamide 66 with alcohol soluble copolyamide like SVP 637 or 651 (polymer A), Elvamide 8061, synergistic effects were found. Fiber formation of the blend is more efficient than either of the components alone. Soaking in ethanol and measuring filtration efficiency shows better than 98% filtration efficiency retention, THC bench testing showing comparable results with Type 8 polyamide alone. This type blend shows that we can obtain advantage of efficient fiber formation and excellent filtration characteristic of copolyamide with advantage of excellent chemical resistance of crosslinked type 8 polyamide. Alcohol soak test strongly suggests that non-crosslinkable copolyamide has participated in crosslinking to maintain 98% of filtration efficiency.

DSC (see FIGS. 17–20) of blends of polymer A and B become indistinguishable from that of polymer A alone after they are heated to 250° C. (fully crosslinked) with no distinct melt temperature. This strongly suggests that blends of polymer A and B are a fully integrated polymer by polymer B crosslinking with polymer A. This is a completely new class of polyamide.

Similarly, melt-blend poly (ethylene terephthalate) with poly(butylene terephthalate) can have similar properties. During the melt processing at temperatures higher than melt temperature of either component, ester group exchange occurs and inter polymer of PET and PBT formed. Furthermore, our crosslinking temperature is lower than either of single component. One would not have expected that such group exchange occur at this low temperature. Therefore, we believe that we found a new family of polyamide through solution blending of Type A and Type B polyamide and crosslinking at temperature lower than the melting point of either component.

When we added 10% by weight of t-butyl phenol oligomer (Additive 7) and heat treated at temperature necessary for crosslinking temperature, we have found even better results. We theorized that hydroxyl functional group of t-butyl phenol oligomers would participate in reaction with functional group of type 8 nylons. What we have found is this component system provides good fiber formation, improved resistance to high temperature and high humidity and hydrophobicity to the surface of fine fiber layers.

We have prepared samples of mixture of Polymer A and Polymer B (Sample 6A) and another sample of mixture of Polymer A, Polymer B and Additive & (Sample 6B). We then formed fiber by electrospinning process, exposed the fiber mat at 300° F. for 10 minutes and evaluated the surface composition by ESCA surface analysis.

Table shows ESCA analysis of Samples 6A and 6B.

| Composition (%) | Sample 6A | | Sample 6B | |
| --- | --- | --- | --- | --- |
| Polymer A | 30 | | 30 | |
| Polymer B | 70 | | 70 | |
| Additive 7 | 0 | | 10 | |
| Surface Composition | W/O Heat | W/Heat | W/O Heat | W/Heat |
| Polymer A&B (%) | 100 | 100 | 68.9 | 43.0 |
| Additive 7 | 0 | 0 | 31.1 | 57.0 |

Figure 4:
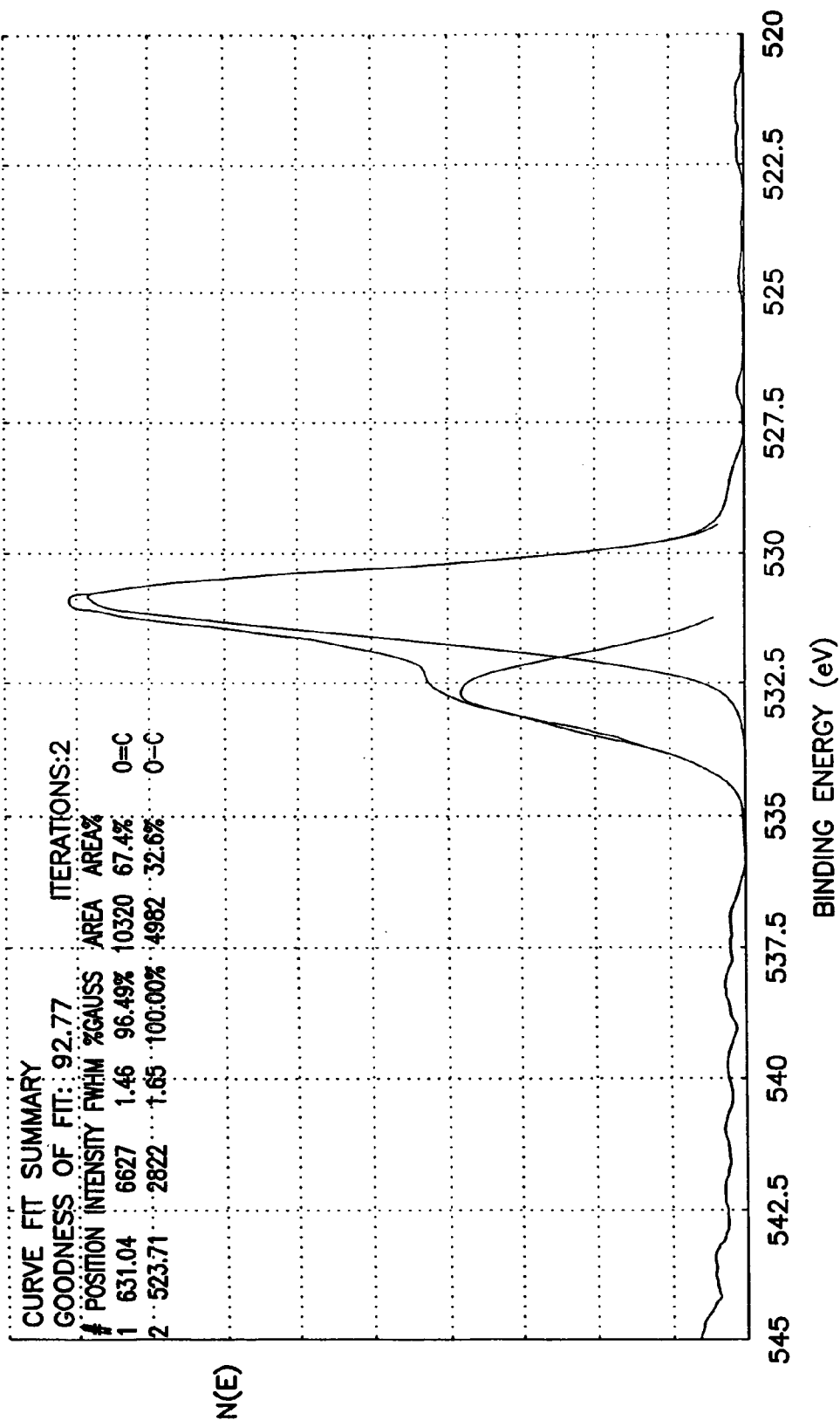
FIGS. 4 through 11 are analytical ESCA spectra relating to Example 13.
Figure 6:
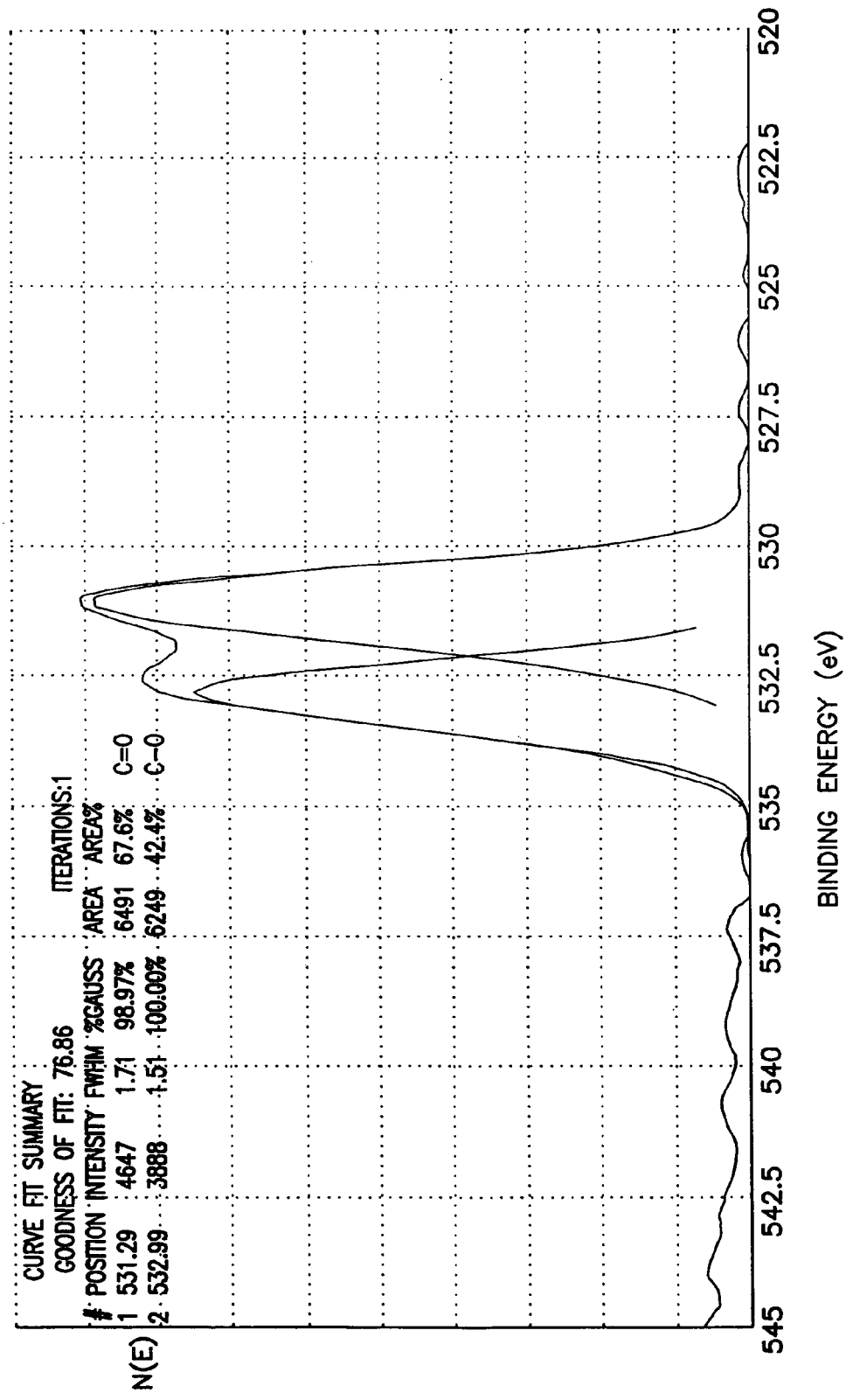
Figure 7:
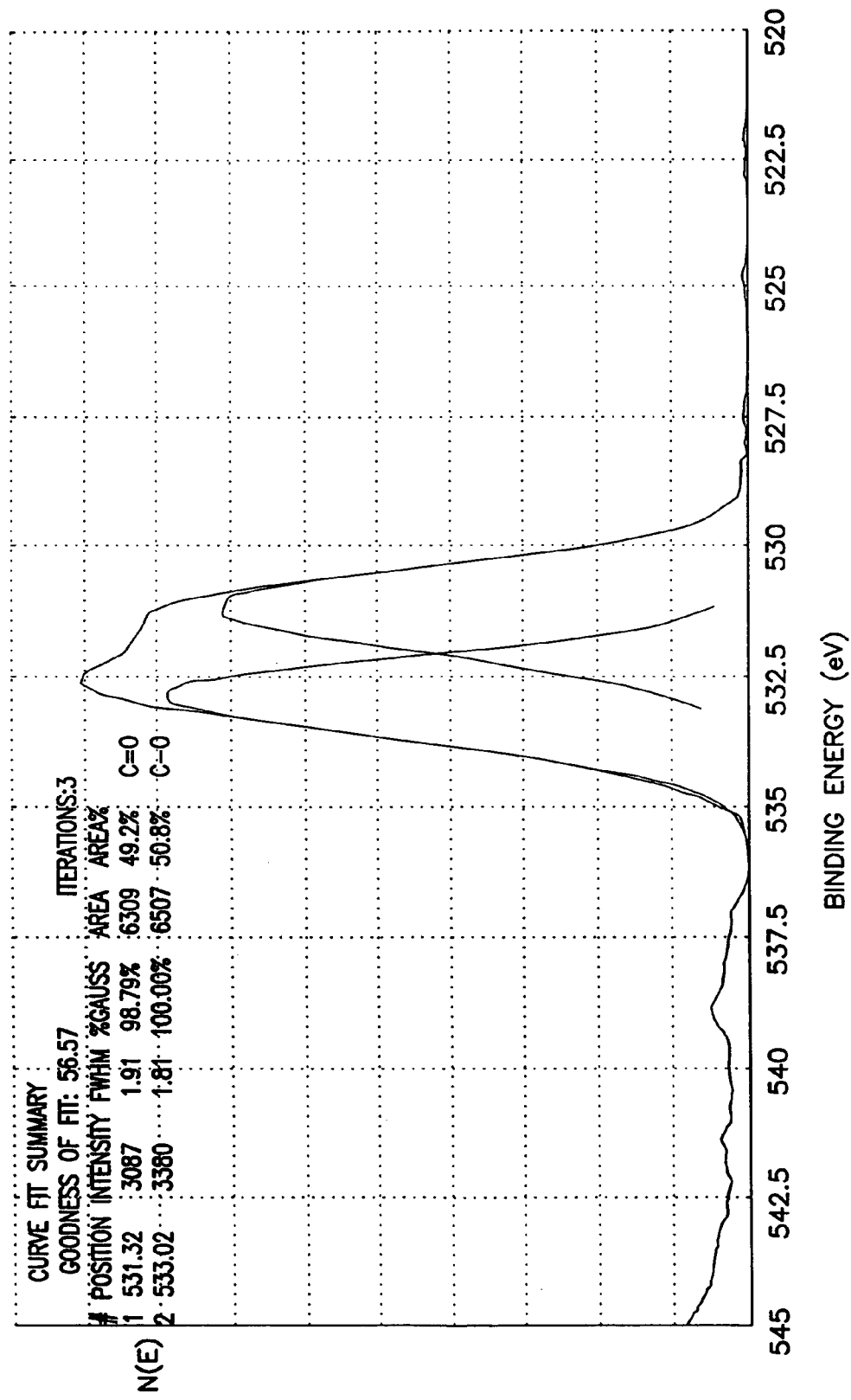
Figure 8:
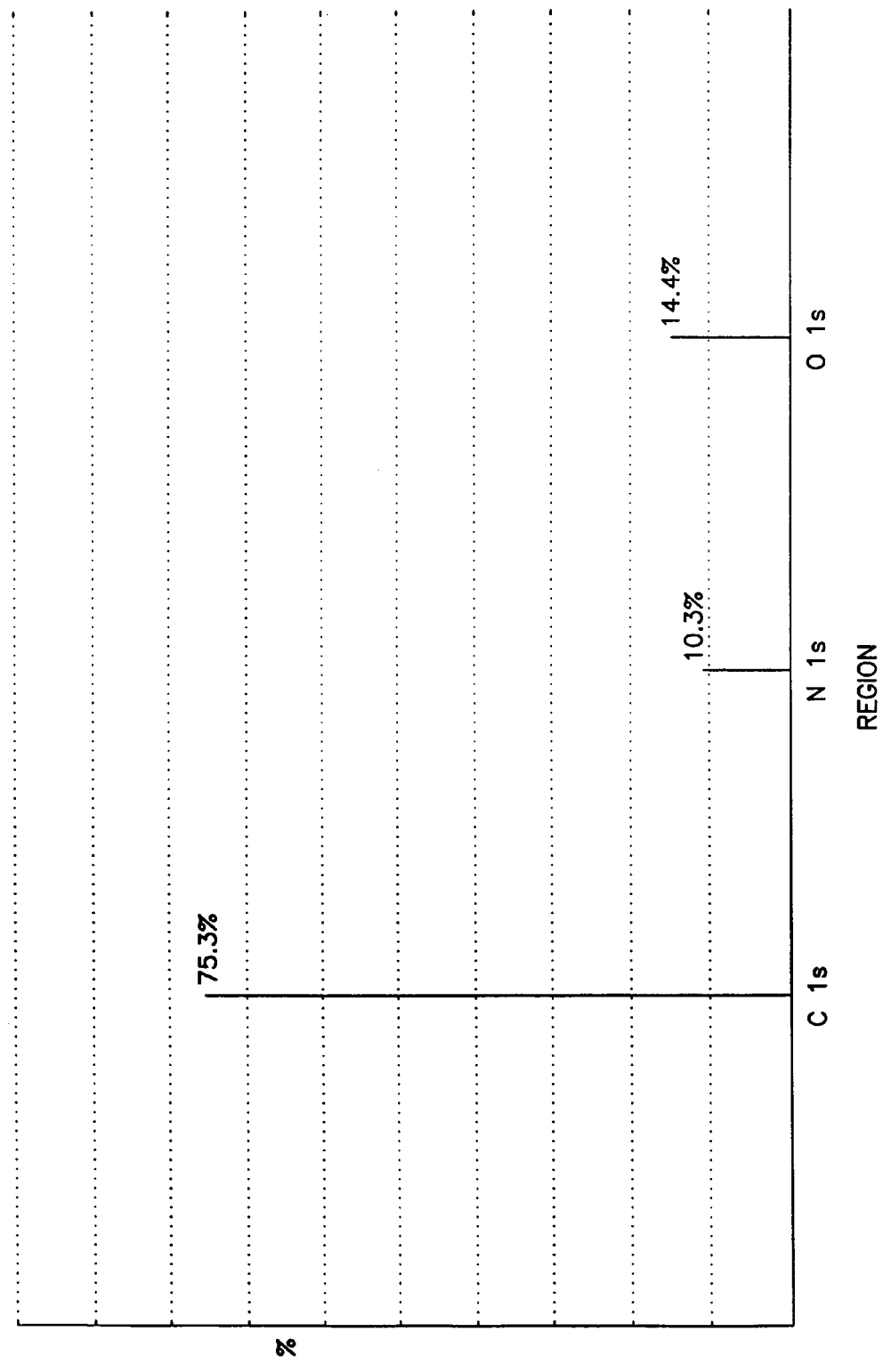
Figure 9:
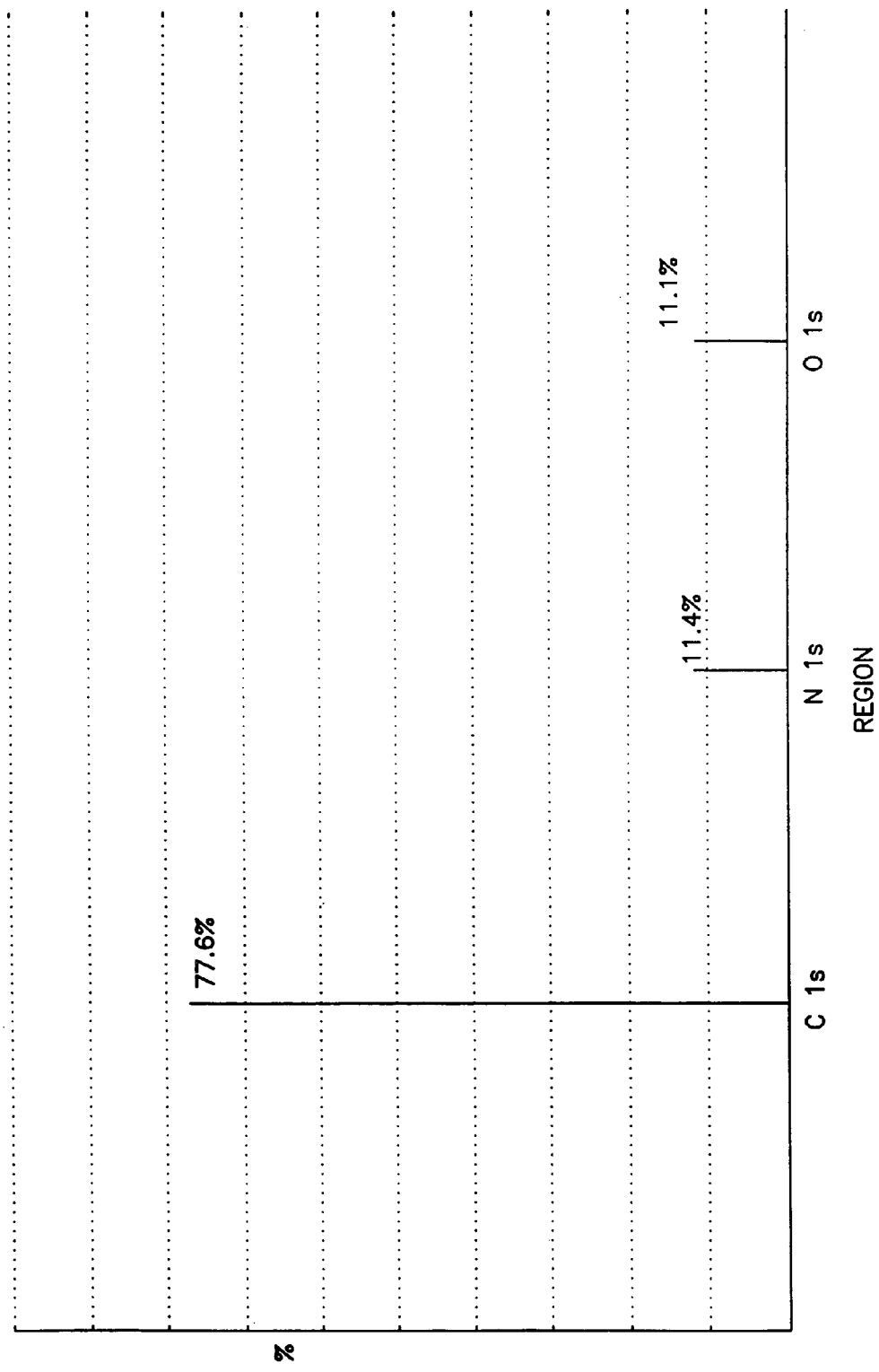
Figure 10:
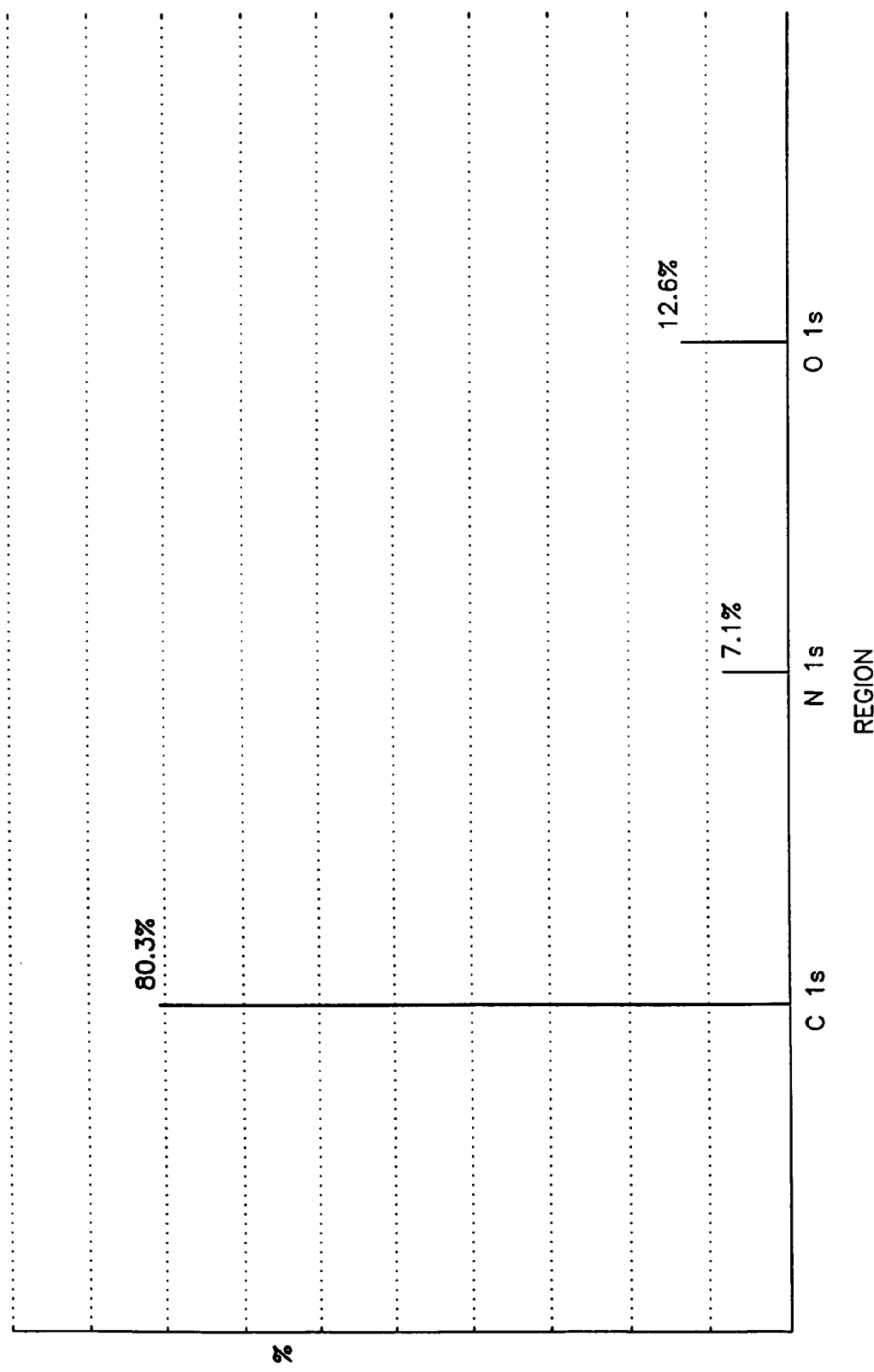
Figure 11:
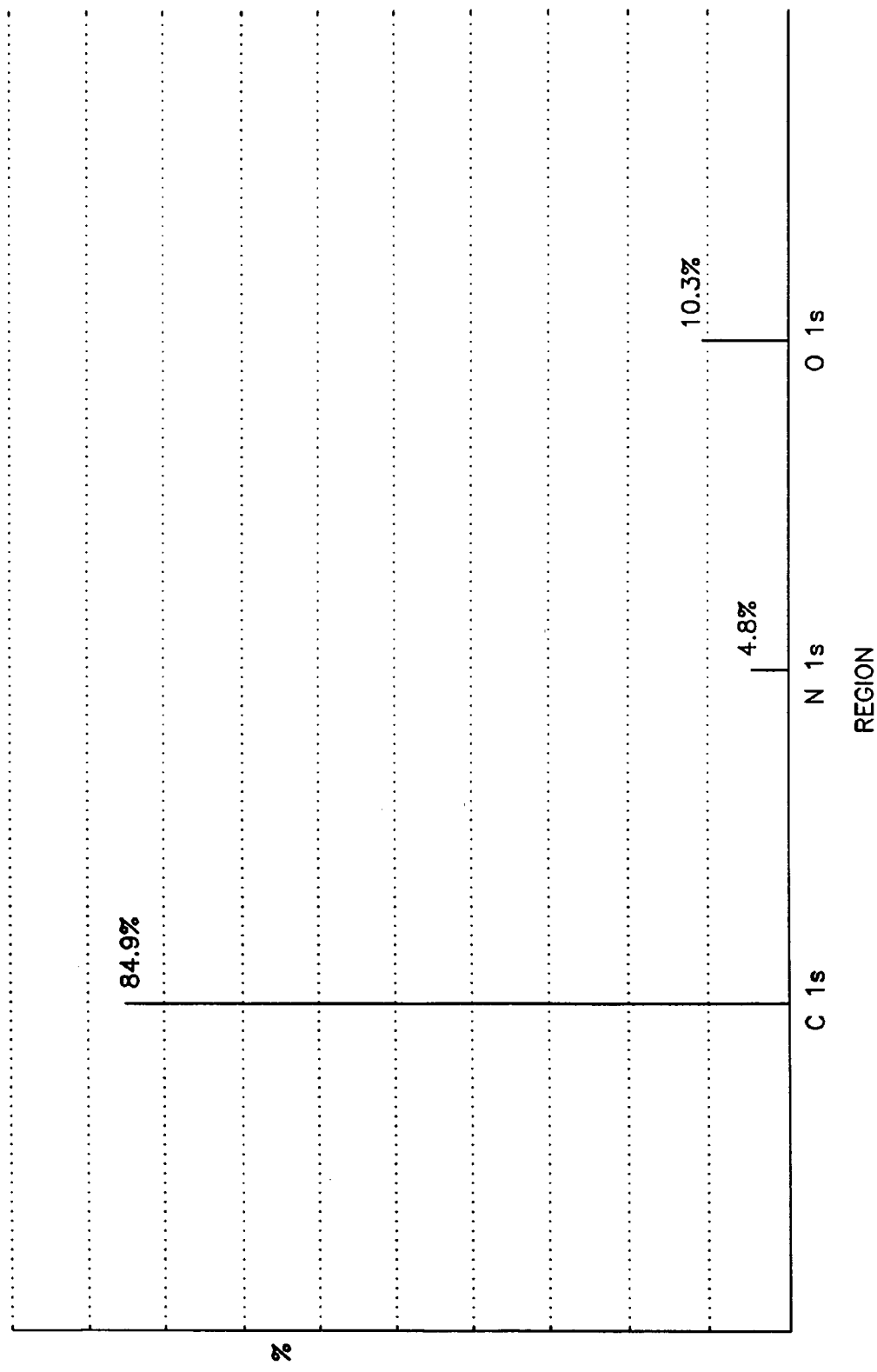

ESCA provides information regarding surface composition, except the concentration of hydrogen. It provides information on carbon, nitrogen and oxygen. Since the Additive 7 does not contain nitrogen, we can estimate the ratio of nitrogen containing polyamides and additive that does not contain nitrogen by comparing concentration of nitrogen. Additional qualitative information is available by examining O 1s spectrum of binding energy between 535 and 527 eV. C=O bond has a binding energy at around 531 eV and C—O bond has a binding energy at 533 eV. By comparing peak heights at these two peaks, one can estimate relative concentration of polyamide with predominant C=O and additive with solely C—O groups. Polymer B has C—O linkage due to modification and upon crosslinking the concentration of C—O will decrease. ESCA confirms such reaction had indeed occurred, showing relative decrease of C—O linkage. (FIG. 4 for non heat treated mixture fiber of Polymer A and Polymer B, FIG. 5 for heat treated mixture fiber of Polymer A and Polymer B). When Additive 7 molecules are present on the surface, one can expect more of C—O linkage. This is indeed the case as can be seen in FIGS. 6 and 7. (FIG. 6 for as-spun mixture fibers of Polymer A, Polymer B and Additive 7. FIG. 7 for heat treated mixture fibers of Polymer A, Polymer B and Additive 7). FIG. 6 shows that the concentration of C—O linkage increases for Example 7. The finding is consistent with the surface concentration based on XPS multiplex spectrum of FIGS. 8 through 11.

The t-butyl oligomer molecules migrate toward the surface of the fine fibers and form hydrophobic coating of about 50 Å. Type 8 nylon has functional groups such as —CH$_2$OH and —CH$_2$OCH$_3$, which we expected to react with —OH group of t-butyl phenol. Thus, we expected to see less oligomer molecules on the surface of the fibers. We have found that our hypothesis was not correct and we found the surface of the interpolymer has a thin coating.

Samples 6A, 6B and a repeat of sample described in Section 5 have been exposed THC bench at 160° F. at 100% RH. In previous section, the samples were exposed to 140° F. and 100% RH. Under these conditions, t-butyl phenol protected terpolymer copolyamide from degradation. However, if the temperature is raised to 160° F. and 100% RH, then the t-butyl phenol oligomer is not as good in protecting the underlying terpolymer copolyamide fibers. We have compared samples at 160° F. and 100% RH.

TABLE

| Sample | Retained Fine Fiber Efficiency after Exposure to 160° F. and 100% RH | | |
| --- | --- | --- | --- |
| | After 1 Hr. | After 2 Hrs. | After 3 Hrs. |
| Sample 6A | 82.6 | 82.6 | 85.9 |
| Sample 6B | 82.4 | 88.4 | 91.6 |
| Sample 5 | 10.1 | | |

The table shows that Sample 6B helps protect exposure to high temperature and high humidity.

More striking difference shows when we exposed to droplets of water on a fiber mat. When we place a drop of DI water in the surface of Sample 6A, the water drops immediately spread across the fiber mat and they wet the substrate paper as well. On the other hand, when we place a drop of water on the surface of Sample 6B, the water drop forms a bead and did not spread on the surface of the mat. We have modified the surface of Sample 16 to be hydrophobic by addition of oligomers of p-t-butyl phenol. This type of product can be used as a water mist eliminator, as water drops will not go through the fine fiber surface layer of Sample 6B.

Samples 6A, 6B and a repeat sample of Section 5 were placed in an oven where the temperature was set at 310° F.

Table shows that both Samples 6A and 6B remain intact while Sample of Section 5 was severely damaged.

TABLE

Retained Fine Fiber Efficiency after Exposure to 310° F.

| Sample | After 6 Hrs. | After 77 Hrs. |
|---|---|---|
| Sample 6A | 100% | 100% |
| Sample 6B | 100% | 100% |
| Sample 5 | 34% | 33% |

While addition of oligomer to Polymer A alone improved the high temperature resistance of fine fiber layer, the addition of Additive 7 has a neutral effect on the high temperature exposure.

We have clearly shown that the mixture of terpolymer copolyamide, alkoxy alkyl modified nylon 66 and oligomers of t-butyl phenol provides a superior products in helping fine fibers under severe environment with improved productivity in manufacturing over either mixture of terpolymer copolyamide and t-butyl phenol oligomer or the mixture of terpolymer copolyamide and alkoxy alkyl modified nylon 66. These two components mixture are also improvement over single component system.

EXAMPLE 7

Compatible Blend of Polyamides and Bisphenol A Polymers

A new family of polymers can be prepared by oxidative coupling of phenolic ring (Pecora, A; Cyrus, W. U.S. Pat. No. 4,900,671 (1990) and Pecora, A; Cyrus, W.; Johnson, M. U.S. Pat. No. 5,153,298 (1992)). Of particular interest is polymer made of Bisphenol A sold by Enzymol Corp. Soybean Peroxidase catalyzed oxidation of Bisphenol A can start from either side of two —OH groups in Bisphenol A. Unlike Bisphenol A based polycarbonate, which is linear, this type of Bisphenol A polymer forms hyperbranched polymers. Because of hyperbranched nature of this polymer, they can lower viscosity of polymer blend.

We have found that this type of Bisphenol A polymer can be solution blended with polyamides. Reported Hansen's solubility parameter for nylon is 18.6. (Page 317, Handbook of Solubility Parameters and other cohesion parameters, A. Barton ed., CRC Press, Boca Raton Fla., 1985) If one calculates solubility parameter (page 61, Handbook of Solubility Parameters), then the calculated solubility parameter is 28.0. Due to the differences in solubility parameter, one would not expect that they would be miscible with each other. However, we found that they are quite miscible and provide unexpected properties.

50:50 blend of Bisphenol A resin of M.W. 3,000 and copolyamide was made in ethanol solution. Total concentration in solution was 10%. Copolyamide alone would have resulted in 0.2 micron fiber diameter. Blend resulted in lofty layer of fibers around 1 micron. Bisphenol A of 7,000 M.W. is not stable with copolyamide and tends to precipitate.

DSC of 50:50 blend shows lack of melting temperature. Copolyamide has melting temperature around 150 degree C. and Bisphenol A resin is a glassy polymer with Tg of about 100. The blend shows lack of distinct melting. When the fiber mat is exposed to 100 degree C., the fiber mat disappears. This blend would make an excellent filter media where upper use temperature is not very high, but low-pressure drop is required. This polymer system could not be crosslinked with a reasonable manner.

EXAMPLE 8

Dual Roles of Bisphenol A Polymer as Solvent and Solid in Blend

A surprising feature of Bisphenol A polymer blend is that in solution form Bisphenol A polymer acts like a solvent and in solid form the polymer acts as a solid. We find dual role of Bisphenol A polymer truly unique.

The following formulation is made:

| | |
|---|---|
| Alkoxy alkyl modified PA 66: Polymer B | 180 g |
| Bisphenol A Resin (3,000 MW): Polymer C | 108 g |
| Ethanol 190 Grade | 827 g |
| Acetone | 218 8 |
| DI water | 167 g |
| Catalyst | 9.3 g |

The viscosity of this blend was 32.6 centipoise by Brookfield viscometer. Total polymer concentration was be 19.2%. Viscosity of Polymer B at 19.2% is over 200 centipoise. Viscosity of 12% polymer B alone in similar solvent is around 60 centipoise. This is a clear example that Bisphenol A resin acts like a solvent because the viscosity of the total solution was lower than expected. Resultant fiber diameter was 0.157 micron. If polymer B alone participated in fiber formation, the expected fiber size would be less than 0.1 micron. In other words, Polymer C participated in fiber formation. We do not know of any other case of such dramatic dual role of a component. After soaking the sample in ethanol, the filtration efficiency and fiber size was measured. After alcohol soak, 85.6% of filtration efficiency was retained and the fiber size was unchanged. This indicates that Polymer C has participated in crosslinking acting like a polymer solid.

Another polymer solution was prepared in the following manner:

| | | |
|---|---|---|
| Alkoxy alkyl Modified PA66: | Polymer B | 225 g |
| Bisphenol A Resin (3,000 MW): | Polymer C | 135 g |
| Ethanol 190 Grade | | 778 g |
| Acetone | | 205 g |
| DI Water | | 157 g |
| Catalyst | | 11.6 g |

Viscosity of this blend was 90.2 centipoise. This is a very low viscosity value for 24% solid. Again, this is an indication Polymer C acts like a solvent in the solution. However, when they are electrospun into fiber, the fiber diameter is 0.438 micron. 15% solution of Polymer B alone would have produced around 0.2-micron fibers. In final state, Polymer C contributes to enlarging fiber sizes. Again, this example illustrates that this type of branched polymer acts as a solvent in solution and acts as a solid in final state. After soaking in ethanol solution, 77.9% of filtration efficiency was retained and fiber size was unchanged.

EXAMPLE 9

Development of Crosslinked Polyamides/Bisphenol A Polymer Blends

Three different samples were prepared by combining resins, alcohols and water, stirring 2 hours at 60 degree C. The solution is cooled to room temperature and catalyst was added to solution and the mixture was stirred another 15 minutes. Afterward, viscosity of solution was measured and spun into fibers.

The following table shows these examples:

| Recipe (g) | Sample 9A | Sample 9B | Sample 9C |
|---|---|---|---|
| Polymer B | 8.4 | 12.6 | 14.7 |
| Polymer A | 3.6 | 5.4 | 6.3 |
| Polymer C | 7.2 | 10.8 | 12.6 |
| Ethanol 190 Grade | 89.3 | 82.7 | 79.5 |
| Isopropanol | 23.5 | 21.8 | 21.0 |
| DI Water | 18.0 | 16.7 | 15.9 |
| Catalyst | .45 | 0.58 | 0.79 |
| Viscosity (cP) | 22.5 | 73.5 | 134.2 |
| Fiber Size (micron) | 0.14 | 0.258 | 0.496 |

We have found out that this blend generates fibers efficiently, producing about 50% more mass of fiber compared to Polymer A recipe. In addition, resultant polymeric microfibers produce a more chemically resistant fiber. After alcohol soak, a filter made from these fibers maintained more than 90% filtration efficiency and unchanged fiber diameter even though inherently crosslinkable polymer is only 44% of the solid composition. This three-polymer composition of co-polyamide, alkoxy alkyl modified Nylon 66 and Bisphenol A creates excellent fiber forming, chemically resistant material.

EXAMPLE 10

Alkoxy Alkyl Modified Co-polymer of Nylon 66 and Nylon 46

In a 10-gallon high-pressure reactor, the following reactions were made, and resultant polymers were analyzed. After reaction temperature was reached, catalyst were added and reacted for 15 minutes. Afterward, the polymer solution was quenched, precipitated, washed and dried.

| Reactor Charge (LB) | Run 10A | Run 10B | Run 10C | Run 10D | Run 10E |
|---|---|---|---|---|---|
| Nylon 4, 6 (duPont Zytel 101) | 10 | 5 | 5 | 5 | 5 |
| Nylon 6, 6 (DSM Stanyl 300) | 0 | 5 | 5 | 5 | 5 |
| Formaldehyde | 8 | 10 | 8 | 10 | 8 |
| DI Water | 0.2 | 0.2 | 2 | 0.2 | 2 |
| Methanol | 22 | 20 | 20 | 20 | 20 |
| Reaction Temp (C. °) | 140 | 140 | 140 | 150 | 150 |
| Tg (C. °) | 56.7 | 38.8 | 37.7 | 38.5 | 31.8 |
| Tm (C. °) | 241.1 | 162.3 | 184.9 | 175.4 | 189.5 |
| Level of Substitution | | | | | |
| Alkoxy (wt. %) | 11.9 | 11.7 | 7.1 | 11.1 | 8.4 |
| Methylol (wt %) | 0.14 | 0.13 | 0.14 | 0.26 | 0.24 |

DSC of the polymer made with Nylon 46 and Nylon 66 shows broad single melt temperature, which are lower than the melting temperature of modified Nylon 46 (241° C.) or modified Nylon 66 (210° C.). This is an indication that during the reaction, both components are randomly distributed along the polymer chain. Thus, we believe that we have achieved random copolymer of Nylon 46 and Nylon 66 with alkoxy alkyl modification. These polymers are soluble in alcohols and mixtures of alcohol and water.

| Property | ASTM | Nylon 6.6 | Nylon 4.6 |
|---|---|---|---|
| $T_m$ | | 265° C. | 295° C. |
| Tensile Strength | D638 | 13.700 | 8.500 |
| Elongation at Break | D638 | 15–80 | 60 |
| Tensile Yield Strength | D638 | 8000–12,000 | |
| Flexural Strength | D790 | 17,8000 | 11,500 |
| Tensile Modulus × $10^3$ psi | D638 | 230–550 | 250 |
| Izod Impact ft-lb/in of notch | D256A | 0.55–1.0 | 17 |
| Deflection Temp Under Flexural Load 264 psi | D648 | 158 | 194 |

Both are highly crystalline and are not soluble in common alcohols.

Source: Modem Plastics Encyclopedia 1998

EXAMPLE 11

Development of Interpolymer of Coplyamides and Alkoxyalkyl Modified Nylon 46/66 Copolymer and Formation of Electrospun Fibers Runs 10B and 10D samples were made into fibers by methods described in above. Alkoxy alkyl modified Nylon 46/66 (Polymer D) alone were successfully electrospun. Blending Polymer D with Polymer A brings additional benefits of more efficient fiber formation and ability to make bigger fibers without sacrificing the crosslinkability of Polymer D as can be seen in the following table:

| | Polymer 10B | | Polymer 10D | |
|---|---|---|---|---|
| | Alone | w/30% Polymer A | Alone | w/30% Polymer A |
| Fiber Size(micron) | 0.183 | 0.464 | 0.19 | 0.3 |
| Fiber Mass Ratio | 1 | 3 | 1 | 2 |
| Filtration Effi. Retention(%) | 87 | 90 | 92 | 90 |

Fiber Mass Ratio is calculated by (total length of fiber times cross sectional area). Filtration Efficiency Retention is measured soaking filter sample in ethanol. Fiber size was unchanged by alcohol soak.

EXAMPLE 12

Crosslinked, Electrospun PVA

PVA powders were purchased from Aldrich Chemicals. They were dissolved either in water or 50/50 mixture of methanol and water. They were mixed with crosslinking agent and toluene sulfonic acid catalyst before electrospinning. The resulting fiber mat was crosslinked in an oven at 150° C. for 10 minutes before exposing to THC bench.

|  | Sample 12A | Sample 12B | Sample 12C | Sample 12D |
|---|---|---|---|---|
| PVA |  |  |  |  |
| Hydrolysis | 98–99 | 87–89 | 87–89 | 87–89 |
| M.W. | 31,500–50,000 | 31,500–50,000 | 31,500–50,000 | 31,500–50,000 |
| PVA Conc. (%) | 10 | 10 | 10 | 10 |
| Solvent | Water | Mixture | Mixture (c) | Mixture (d) |
| Other Polymer | None | None | Acrylic Acid | Cymel 385 |
| Other Polymer/ PVA (%) | 0 | 0 | 30 | 30 |
| % Fiber Retained THC, 1 hr. | 0 (a) | 0 (a, b) | 95 (b) | 20 (b) |
| % Fiber Retained THC, 3 hr. |  |  | 90 (a) |  |

(a): Temperature 160° F., 100% humidity
(b): Temperature 140° F., 100% humidity
(c): Molecular Weight 2000
(d): Melamine formaldehyde resin from Cytec

EXAMPLE 13

A conventional cellulose air filter media was used as the substrate. This substrate had a basis weight of 67 pounds per 3000 square feet, a Frazier permeability of 16 feet per minute at 0.5 inches of water pressure drop, a thickness of 0.012 inches, and a LEFS efficiency of 41.6%. A fine fiber layer of Example 1 was added to the surface using the process described with a nominal fiber diameter of 0.2 microns. The resulting composite had a LEFS efficiency of 63.7%. After exposure to 140F air at 100% relative humidity for 1 hour the substrate only sample was allowed to cool and dry, it then had a LEFS efficiency of 36.5%. After exposure to 140F air at 100% relative humidity for 1 hour the composite sample was allowed to cool and dry, it then had a LEFS efficiency of 39.7%. Using the mathematical formulas described, the fine fiber layer efficiency retained after 1 hour of exposure was 13%, the number of effective fine fibers retained was 11%.

EXAMPLE 14

A conventional cellulose air filter media was used as the substrate. This substrate had a basis weight of 67 pounds per 3000 square feet, a Frazier permeability of 16 feet per minute at 0.5 inches of water pressure drop, a thickness of 0.012 inches, and a LEFS efficiency of 41.6%. A fine fiber layer of Example 5 was added to the surface using the process described with a nominal fiber diameter of 0.2 microns. The resulting composite had a LEFS efficiency of 96.0%. After exposure to 160F air at 100% relative humidity for 3 hours the substrate only sample was allowed to cool and dry, it then had a LEFS efficiency of 35.3%. After exposure to 160F air at 100% relative humidity for 3 hours the composite sample was allowed to cool and dry, it then had a LEFS efficiency of 68.0%. Using the mathematical formulas described, the fine fiber layer efficiency retained after 3 hours of exposure was 58%, the number of effective fine fibers retained was 29%.

EXAMPLE 15

A conventional cellulose air filter media was used as the substrate. This substrate had a basis weight of 67 pounds per 3000 square feet, a Frazier permeability of 16 feet per minute at 0.5 inches of water pressure drop, a thickness of 0.012 inches, and a LEFS efficiency of 41.6%. A fine fiber layer of a blend of Polymer A and Polymer B as described in Example 6 was added to the surface using the process described with a nominal fiber diameter of 0.2 microns. The resulting composite had a LEFS efficiency of 92.9%. After exposure to 160F air at 100% relative humidity for 3 hours the substrate only sample was allowed to cool and dry, it then had a LEFS efficiency of 35.3%. After exposure to 160F air at 100% relative humidity for 3 hours the composite sample was allowed to cool and dry, it then had a LEFS efficiency of 86.0%. Using the mathematical formulas described, the fine fiber layer efficiency retained after 3 hours of exposure was 96%, the number of effective fine fibers retained was 89%.

EXAMPLE 16

A conventional cellulose air filter media was used as the substrate. This substrate had a basis weight of 67 pounds per 3000 square feet, a Frazier permeability of 16 feet per minute at 0.5 inches of water pressure drop, a thickness of 0.012 inches, and a LEFS efficiency of 41.6%. A fine fiber layer of Polymer A, Polymer B, t-butyl phenol oligomer as described in Example 6 was added to the surface using the process described with a nominal fiber diameter of 0.2 microns. The resulting composite had a LEFS efficiency of 90.4%. After exposure to 160F air at 100% relative humidity for 3 hours the substrate only sample was allowed to cool and dry, it then had a LEFS efficiency of 35.3%. After exposure to 160F air at 100% relative humidity for 3 hours the composite sample was allowed to cool and dry, it then had a LEFS efficiency of 87.3%. Using the mathematical formulas described, the fine fiber layer efficiency retained after 3 hours of exposure was 97%, the number of effective fine fibers retained was 92%.

EXAMPLE 17

A conventional cellulose air filter media was used as the substrate. This substrate had a basis weight of 67 pounds per 3000 square feet, a Frazier permeability of 16 feet per minute at 0.5 inches of water pressure drop, a thickness of 0.012 inches, and a LEFS efficiency of 41.6%. A fine fiber layer of crosslinked PVA with polyacrylic acid of Example 12 was added to the surface using the process described with a nominal fiber diameter of 0.2 microns. The resulting composite had a LEFS efficiency of 92.9%. After exposure to 160F air at 100% relative humidity for 2 hours the substrate only sample was allowed to cool and dry, it then had a LEFS efficiency of 35.3%. After exposure to 160F air at 100% relative humidity for 2 hours the composite sample was allowed to cool and dry, it then had a LEFS efficiency of 83.1%. Using the mathematical formulas described, the fine fiber layer efficiency retained after 2 hours of exposure was 89%, the number of effective fine fibers retained was 76%.

EXAMPLE 18

The following filter medias have been made with the methods described in Example 1–17.

- the filtration measure evaluates several square inches of media yielding a better average than the tiny area seen in SEM photomicrographs (usually less than 0.0001 square inch
- the filtration measurement quantifies the number of fibers remaining functional in the structure. Those fibers that remain, but are clumped together or otherwise existing in an altered structure are only included by their measured effectiveness and functionality.

Nevertheless, in fibrous structures where the filtration efficiency is not easily measured, other methods can be used to measure the percent of fiber remaining and evaluated against the 50% retention criteria.

Filter Media Examples

| Substrate Single fine fiber layer on single substrate (flow either direction through media | Substrate perm (Frazier) (+/− 10%) | Substrate Basis wt (lbs/3000 sq ft) (+/− 10%) | Substrate Thickness (in) (+/− 25%) | Substrate Eff (LEFS) (+/− 5%) | Composite Eff (LEFS) (+/− 5%) |
|---|---|---|---|---|---|
| Cellulose air filter media | 58 | 67 | 0.012 | 11% | 50% |
| Cellulose air filter media | 16 | 67 | 0.012 | 43% | 58% |
| Cellulose air filter media | 58 | 67 | 0.012 | 11% | 65% |
| Cellulose air filter media | 16 | 67 | 0.012 | 43% | 70% |
| Cellulose air filter media | 22 | 52 | 0.010 | 17% | 70% |
| Cellulose air filter media | 16 | 67 | 0.012 | 43% | 72% |
| Cellulose/synthetic blend with moisture resistant resin | 14 | 70 | 0.012 | 30% | 70% |
| Flame retardant cellulose air filter media | 17 | 77 | 0.012 | 31% | 58% |
| Flame retardant cellulose air filter media | 17 | 77 | 0.012 | 31% | 72% |
| Flame retardant synthetic air filter media | 27 | 83 | 0.012 |  | 77% |
| Spunbond Remay (polyester) | 1200 | 15 | 0.007 | 5% | 55% |
| Synthetic/cellulose air filter media | 260 | 76 | 0.015 | 6% | 17% |
| Synthetic/glass air filter media | 31 | 70 | 0.012 | 55% | 77% |
| Synthetic/glass air filter media | 31 | 70 | 0.012 | 50% | 90% |
| Single fine fiber layer on substrate. Two layers of composite are then laminated together (fine fiber layers on the inside-substrates on the outside) |  |  |  |  |  |
| Synthetic (Lutrador-polyester) | 300 | 25 | 0.008 | 3% | 65% |
| Synthetic (Lutrador-polyester) |  |  | 0.016 |  | 90% |

Media has been used flat, corrugated, pleated, corrugated and pleated, in flatsheets, pleated flat panels, pleated round filters, and Zee filters.

Test Methods

Hot Water Soak Test

Using filtration efficiency as the measure of the number of fine fibers effectively and functionally retained in structure has a number of advantages over other possible methods such as SEM evaluation.

Description: This test is an accelerated indicator of filter media moisture resistance. The test uses the LEFS test bench to measure filter media performance changes upon immersion in water. Water temperature is a critical parameter and is chosen based on the survivability history of the media under investigation, the desire to minimize the test time and the ability of the test to discriminate between media types. Typical water temperatures re 70° F., 140° F. or 160° F.

Procedure:

A 4" diameter sample is cut from the media. Particle capture efficiency of the test specimen is calculated using 0.8 μm latex spheres as a test challenge contaminant in the LEFS (for a description of the LEFS test, see ASTM Standard F1215-89) bench operating at 20 FPM. The sample is then submerged in (typically 140° F.) distilled water for 5 minutes. The sample is then placed on a drying rack and dried at room temperature (typically overnight). Once it is dry the sample is then retested for efficiency on the LEFS bench using the same conditions for the initial calculation.

The previous steps are repeated for the fine fiber supporting substrate without fine fiber.

From the above information one can calculate the efficiency component due only to the fine fiber and the resulting loss in efficiency due to water damage. Once the loss in efficiency due to the fine fiber is determined one can calculate the amount of efficiency retained.

Calculations:
Fine fiber layer efficiency:
  $E_i$=Initial Composite Efficiency;
  $E_s$=Initial Substrate Efficiency;
  $F_e$=Fine Fiber Layer $F_e$=1-EXP($Ln(1-E_i)-Ln(1-E_s)$)

Fine fiber layer efficiency retained:
  $F_i$=Initial fine fiber layer efficiency;
  $F_x$=Post soak fine fiber layer efficiency;
  $F_r$=Fine fiber retained $F_r=F_x/F_i$ The percentage of the fine fibers retained with effective functionality can also be calculated by:

%=log(1-$F_x$)/log(1-$F_i$)

Pass/Fail Criteria: >50% efficiency retention

In most industrial pulse cleaning filter applications the filter would perform adequately if at least 50% of the fine fiber efficiency is retained.

THC Bench (Temperature, Humidity
Description: The purpose of this bench is to evaluate fine fiber media resistance to the affects of elevated temperature and high humidity under dynamic flow conditions. The test is intended to simulate extreme operating conditions of either an industrial filtration application, gas turbine inlet application, or heavy duty engine air intake environments. Samples are taken out, dried and LEFS tested at intervals. This system is mostly used to simulate hot humid conditions but can also be used to simulate hot/cold dry situations.

| | |
|---|---|
| Temperature | −31 to 390° F. |
| Humidity | 0 to 100% RH (Max temp for 100% RH is 160° F. and max continuous duration at this condition is 16 hours) |
| Flow Rate | 1 to 35 FPM |

Procedure:

A 4" diameter sample is cut from the media.

Particle capture efficiency of the test specimen is calculated using 0.8 μm latex spheres as a test challenge contaminant in the LEFS bench operating at 20 FPM.

The sample is then inserted into the THC media chuck.

Test times can be from minutes to days depending on testing conditions.

The sample is then placed on a drying rack and dried at room temperature (typically overnight). Once it is dry the sample is then retested for efficiency on the LEFS bench using the same conditions for the initial calculation.

The previous steps are repeated for the fine fiber supporting substrate without fine fiber.

From the above information one can calculate the efficiency component due only to the fine fiber and the resulting loss in efficiency due to alcohol damage.

Once the loss in efficiency due to the fine fiber is determined one can calculate the amount of efficiency retained.
Pass/Fail Criteria: >50% efficiency retention In most industrial pulse cleaning filter applications the filter would perform adequately if at least 50% of the fine fiber efficiency is retained.

Alcohol (Ethanol) Soak Test
Description: The test uses the LEFS test bench to measure filter media performance changes upon immersion in room temperature ethanol.
Procedure:

A 4" diameter sample is cut from the media. Particle capture efficiency of the test specimen is calculated using 0.8 μm latex spheres as a test challenge contaminant in the LEFS bench operating at 20 FPM. The sample is then submerged in alcohol for 1 minute.

The sample is then placed on a drying rack and dried at room temperature (typically overnight). Once it is dry the sample is then retested for efficiency on the LEFS bench using the same conditions for the initial calculation. The previous steps are repeated for the fine fiber supporting substrate without fine fiber. From the above information one can calculate the efficiency component due only to the fine fiber and the resulting loss in efficiency due to alcohol damage. Once the loss in efficiency due to the fine fiber is determined one can calculate the amount of efficiency retained.

Pass/Fail Criteria: >50% efficiency retention.

The above specification, examples and data provide an explanation of the invention. However, many variations and embodiments can be made to the disclosed invention. The invention is embodied in the claims herein after appended.

What is claimed is:

1. A filter element arrangement comprising:
  (a) a media pack having a substrate comprising first and second opposite flow faces and a plurality of flutes wherein in said media pack;
    (i) each of said flutes have a first end portion adjacent to said first flow face and a second end portion adjacent to said second flow face;
    (ii) selected ones of said flutes being open at said first end portion and closed at said second end portion; and selected ones of said flutes being closed at said first end portion and open at said second end portion;
    (iii) said substrate at least partially covered by a layer comprising fine fiber comprising a fiber with a diameter of about 0.01 to 0.5 microns, the fiber comprising a polymer and about 2 to 25% of resinous additive in the form of a coating on the fiber such that the fiber, when tested under conditions of exposure for a test period of 16 hours to test conditions of 140° F. air at a relative humidity of 100%, retains greater than 30% of the fiber unchanged for filtration purposes; and (b) a sealing system including a frame construction and a seal member;
  (i) said frame arrangement including an extension projecting axially from one of said first and second flow faces, said extension comprises a hoop construction having an outer radial surface;
  (ii) said seal member being supported by said extension of said frame arrangement;
    (A) said seal member comprising a resilient seal member;
    (B) said seal member being oriented against at least said outer radial surface.

2. The element of claim 1 wherein the polymer comprises an addition polymer.

3. The element of claim 2 wherein the addition polymer comprises a polyvinyl halide polymer, a polyvinylidene halide polymer or mixtures thereof.

4. The element of claim 2 wherein the addition polymer comprises a polyvinylalcohol.

5. The element of claim 2 wherein the addition polymer comprises a copolymer comprising vinylalcohol.

6. The element of claim 4 wherein the polyvinylalcohol is crosslinked with about 1 to 40 wt. % of a crosslinking agent.

7. The element of claim 5 wherein the polymer is crosslinked with about 1 to 40 wt. % of a crosslinking agent.

8. The element of claim 1 wherein the resinous additive comprises an oligomer having a molecular weight of about 500 to 3000 and an aromatic character wherein the additive is miscible in the condensation polymer.

9. The element of claim 1 comprising a condensation polymer.

10. The element of claim 9 comprising a nylon polymer.

11. The element of claim 10 wherein the nylon comprises a nylon other than a copolymer formed from a cyclic lactam and a $C_{6-10}$ diamine monomer or a $C_{6-10}$ diacid monomer.

12. The element of claim 9 wherein the condensation polymer comprises a polyalkylene terephthalate.

13. The element of claim 9 wherein the condensation polymer comprises a nylon polymer comprising a homopolymer having repeating units derived from a cyclic lactam.

14. The element of claim 10 wherein the nylon polymer is combined with a second nylon polymer, the second nylon polymer differing in molecular weight or monomer composition.

15. The element of claim 11 wherein the second nylon polymer comprises an alkoxy alkyl modified polyamide.

16. The element of claim 14 wherein the second nylon polymer comprises a nylon copolymer.

17. The element of claim 14 wherein the polymers are treated to form a single polymeric composition as measured by a differential scanning calorimeter showing a single-phase material.

18. The element of claim 17 wherein the copolymer and the second polymer are heat-treated.

19. The element of claim 18 wherein the copolymer and the second polymer are heat-treated to a temperature less than the lower melting point of the polymers.

20. The element of claim 18 wherein the additive comprises an oligomer comprising a phenol compound.

21. The element of claim 18 wherein the additive comprises a blend of the resinous additive and a fluoropolymer.

22. The element of claim 18 wherein the fluoropolymer comprises a fluorocarbon surfactant.

23. The element of claim 18 wherein the additive comprises a nonionic surfactant.

24. The element of claim 9 wherein the condensation polymer comprises a polyurethane polymer.

25. The element of claim 9 wherein the condensation polymer comprises a blend of a polyurethane polymer and a polyamide polymer.

26. The element of claim 10 wherein the nylon comprises a nylon homopolymer, a nylon copolymer or mixtures thereof.

27. The element of claim 9 wherein the condensation polymer comprises an aromatic polyamide.

28. A filter element arrangement according to claim 1 wherein said media pack and said frame construction have a circular cross-section.

29. A filter element arrangement according to claim 1 wherein said media pack and said frame construction have a racetrack shaped cross-section; and said frame construction includes radially supporting cross braces.

30. A filter element arrangement according to claim 1 further including a panel structure; said media pack being mounted within said panel structure.

31. A filter element arrangement according to claim 1 further including a sleeve member secured to and circumscribing said media pack said sleeve member being oriented relative said media pack to extend at least 30% of said axial length of said media pack; and a seal member pressure flange at least partially circumscribing said media pack said seal member pressure flange extending radially from said sleeve member and fully circumscribing said sleeve member.

* * * * *